US012570007B2

(12) United States Patent
Kizilkan et al.

(10) Patent No.: US 12,570,007 B2
(45) Date of Patent: Mar. 10, 2026

(54) MAGNETIC COUPLING DEVICE WITH MOVABLE WORKPIECE INTERFACES

(71) Applicant: Magswitch Automation Company, Superior, CO (US)

(72) Inventors: Cengiz Kizilkan, Ingolstadt (DE); Paul J. Karp, Thornton, CO (US); David H. Morton, Boulder, CO (US); Ethan Pemberton, Auburn Hills, MI (US)

(73) Assignee: Magswitch Automation Company, Superior, CO (US)

( * ) Notice: Subject to any disclaimer, the term of this patent is extended or adjusted under 35 U.S.C. 154(b) by 0 days.

(21) Appl. No.: 18/851,812

(22) PCT Filed: Mar. 29, 2023

(86) PCT No.: PCT/US2023/000011
§ 371 (c)(1),
(2) Date: Sep. 27, 2024

(87) PCT Pub. No.: WO2023/191914
PCT Pub. Date: Oct. 5, 2023

(65) Prior Publication Data
US 2025/0214260 A1 Jul. 3, 2025

Related U.S. Application Data

(60) Provisional application No. 63/400,296, filed on Aug. 23, 2022, provisional application No. 63/325,111, filed on Mar. 29, 2022.

(51) Int. Cl.
B25J 15/06 (2006.01)
B25J 9/16 (2006.01)
(Continued)

(52) U.S. Cl.
CPC ......... B25J 15/0608 (2013.01); B25J 9/1653 (2013.01); B25J 13/086 (2013.01);
(Continued)

(58) Field of Classification Search
CPC .... B25J 15/0608; B25J 9/1653; B25J 13/086; H01F 7/04; H01F 7/064; H01F 7/206; H01F 2007/208; B25B 11/002; G01R 33/02
See application file for complete search history.

(56) References Cited

U.S. PATENT DOCUMENTS 3,121,193 A 2/1964 Engelsted et al.
5,630,634 A 5/1997 Stowe et al.
(Continued)

FOREIGN PATENT DOCUMENTS

DE 202016006696 U1 12/2016
GB 1471025 A 4/1977
(Continued)

OTHER PUBLICATIONS

HSMAG; Pole Extension for Electro-Permanent Magnetic Chuck; http://www.hsmagnets.com/product/pole-extension-for-electro-permanent-magnetic-chuck/; 11 pages; Aug. 1, 2016.
(Continued)

*Primary Examiner* — Stephen A Vu
(74) *Attorney, Agent, or Firm* — Faegre Drinker Biddle & Reath LLP

(57) ABSTRACT

Magnetic coupling devices may include movable pole portions. The movable pole portions may be retractable along a first direction and may be locked into place. In an exemplary embodiment of the present disclosure magnetic coupling device for magnetically coupling to a ferromagnetic workpiece is provided. The magnetic coupling device comprising: a housing; a switchable magnetic flux source supported (Continued)

by the housing; and a plurality of pole portions. The switchable magnetic flux source being switchable between at least an OFF state and at least one of a partial ON state and an ON state. Each including at least one workpiece interface having a workpiece engagement surface. The plurality of pole portions including a first pole portion including a first workpiece interface having a first workpiece engagement surface and a second pole portion including a second workpiece interface having a second workpiece engagement surface.

33 Claims, 35 Drawing Sheets

(51) Int. Cl.
   *B25J 13/08*     (2006.01)
   *H01F 7/04*     (2006.01)
   *H01F 7/06*     (2006.01)
   *H01F 7/20*     (2006.01)

(52) U.S. Cl.
   CPC .............. *H01F 7/04* (2013.01); *H01F 7/064* (2013.01); *H01F 7/206* (2013.01); *H01F 2007/208* (2013.01)

(56)                References Cited

U.S. PATENT DOCUMENTS

| | | | |
|---|---|---|---|
| 7,012,495 B2 | 3/2006 | Underwood et al. | |
| 7,161,451 B2 | 1/2007 | Shen | |
| 8,878,639 B2 | 11/2014 | Kocijan | |
| 10,903,030 B2 | 1/2021 | Morton et al. | |
| 11,031,166 B2 | 6/2021 | Morton et al. | |
| 11,097,401 B2* | 8/2021 | Morton | ................. G01R 33/02 |
| 11,511,396 B2* | 11/2022 | Morton | ............... B23Q 3/1546 |
| 2017/0232605 A1 | 8/2017 | Morton | |
| 2018/0311795 A1 | 11/2018 | Morton et al. | |
| 2021/0031317 A1 | 2/2021 | Morton et al. | |
| 2021/0031335 A1 | 2/2021 | Morton et al. | |

FOREIGN PATENT DOCUMENTS

| | | | |
|---|---|---|---|
| JP | H0977450 A | 3/1997 | |
| JP | H10297867 A | 11/1998 | |
| KR | 100779749 B1 | 11/2007 | |
| KR | 100785662 B1 | 12/2007 | |
| KR | 101032723 B1 | 5/2011 | |
| KR | 20130013636 A | 2/2013 | |
| WO | 2023143830 A1 | 8/2023 | |

OTHER PUBLICATIONS

United States Patent and Trademark Office; International Search Report and Written Opinion; International Application No. PCT/US2023/000011; 16 pages; dated Aug. 25, 2023.

Whitt, Thomas R. et al.; U.S. Appl. No. 62/248,804; 61 pages, filed Oct. 30, 2015.

MAGSWITCH; MagYoke Summary; 3 pages; available at least as early as Mar. 28, 2022.

* cited by examiner

200

MAGNETIC COUPLING DEVICE WITH MOVABLE WORKPIECE INTERFACES

RELATED APPLICATIONS

The present application is a national stage entry of International (PCT) Patent Application Number PCT/US2023/000011, filed Mar. 29, 2023, which claims priority to U.S. Provisional Application No. 63/325,111, filed Mar. 29, 2022, titled MAGNETIC COUPLING DEVICE WITH MOVABLE WORKPIECE INTERFACES, and U.S. Provisional Application No. 63/400,296, filed Aug. 23, 2022, titled FLEXIBLE POLE SHOES FOR A MAGNETIC COUPLING DEVICE, the entire disclosures of which are expressly incorporated by reference herein.

TECHNICAL FIELD

The present disclosure is related to magnetic coupling devices and in particular to magnetic coupling devices having multiple movable workpiece interfaces.

BACKGROUND

Magnetic coupling devices are known. Exemplary coupling devices are disclosed in U.S. Pat. Nos. 7,012,495, 8,878,639, and US Published patent application No. 20180311795.

SUMMARY

In an exemplary embodiment of the present disclosure magnetic coupling device for magnetically coupling to a ferromagnetic workpiece is provided. The magnetic coupling device comprising: a housing; a switchable magnetic flux source supported by the housing; and a plurality of pole portions. The switchable magnetic flux source being switchable between at least an OFF state and at least one of a partial ON state and an ON state. Each including at least one workpiece interface having a workpiece engagement surface. The plurality of pole portions including a first pole portion including a first workpiece interface having a first workpiece engagement surface and a second pole portion including a second workpiece interface having a second workpiece engagement surface. Each of the first pole portion and the second pole portion are moveable relative to the housing when the switchable magnetic flux source is in the OFF state and are held relative to the housing when the switchable magnetic flux source is in the at least one of the partial ON state and the ON state. The first engagement surface of the first pole portion maintains a first position relative to the housing when the switchable magnetic flux source is in the OFF state independent of an orientation of the housing and in the absence of contact with the ferromagnetic workpiece and the second engagement surface of the second pole portion maintains a second position relative to the housing when the switchable magnetic flux source is in the OFF state independent of the orientation of the housing and in the absence of contact with the ferromagnetic workpiece.

In an example thereof, each of the first pole portion and the second pole portion are constrained to be movable relative to the housing in a single degree of freedom.

In another example thereof, the first pole portion is translatable relative to the housing when the switchable magnetic flux source is in the OFF state.

In a further example thereof, the second pole portion is translatable relative to the housing when the switchable magnetic flux source is in the OFF state.

In still another example thereof, the magnetic coupling device further comprising: a first biaser coupled the housing and a second biaser coupled the housing. The first biaser maintains the first engagement surface of the first pole portion in the first position relative to the housing when the switchable magnetic flux source is in the OFF state independent of the orientation of the housing and in the absence of contact with the ferromagnetic workpiece. The second biaser maintains the second engagement surface of the second pole portion in the second position relative to the housing when the switchable magnetic flux source is in the OFF state independent of the orientation of the housing and in the absence of contact with the ferromagnetic workpiece. In a variation thereof, the first biaser is a first spring and the second biaser is a second spring.

In yet still another example thereof, the magnetic coupling device further comprising: a first support coupled to the housing and supporting the first pole portion and a second support coupled to the housing and supporting the second pole portion. The first support including a first lock portion at least partially defining a first channel to receive the first pole portion. The first lock portion being movable relative to the housing between an unlocked position wherein the first pole portion is movable relative to the housing and a locked position wherein the first pole portion is held relative to the housing. The second support including a second lock portion at least partially defining a second channel to receive the second pole portion. The second lock portion being movable relative to the housing between an unlocked position wherein the second pole portion is movable relative to the housing and a locked position wherein the second pole portion is held relative to the housing. In a variation thereof, the first pole portion is translatable relative to the housing in a first direction and the first lock portion of the first support is translatable from the unlocked position to the locked position along a second direction, the second direction being angled relative to the first direction. In another variation thereof, the first lock portion is moved from the unlocked position to the locked position when the switchable magnetic flux source is transitioned from the OFF state to the at least one of the partial ON state and the ON state. In a further variation thereof, the magnetic coupling device further comprising a first biaser supported by the first support and a second biaser supported by the second support. The first biaser maintains the first engagement surface of the first pole portion in the first position relative to the housing when the switchable magnetic flux source is in the OFF state independent of the orientation of the housing and in the absence of contact with the ferromagnetic workpiece. The second biaser maintains the second engagement surface of the second pole portion in the second position relative to the housing when the switchable magnetic flux source is in the OFF state independent of the orientation of the housing and in the absence of contact with the ferromagnetic workpiece. In yet a further variation thereof, the first biaser is a first spring and the second biaser is a second spring. In still another variation thereof, the first pole portion is retractable relative to a lower surface of the first support when the switchable magnetic flux source is in the OFF state and the second pole portion is retractable relative to a lower surface of the second support when the switchable magnetic flux source is in the OFF state. In yet still another variation thereof, a first limiter defines a maximum retraction distance of the first pole portion relative to a lower surface of the first support and a second limiter defines a maximum retraction distance of the second pole portion relative to a lower surface of the second support. In yet still a further variation thereof, the first limiter includes a first portion carried by the first pole portion and a first stop surface on the first support and the second limiter includes a second portion carried by the second pole portion and a second stop surface on the second support.

In still yet another example thereof, the switchable magnetic flux source is positioned between the first pole portion and the second pole portion.

In a further example thereof, the switchable magnetic flux source is positioned vertically in line with the first pole portion and the second pole portion.

In still a further example thereof, the switchable magnetic flux source includes at least one permanent magnet. In a variation thereof, the at least one permanent magnet includes an electro-permanent magnet. In another variation thereof, the at least one permanent magnet further includes a rare earth permanent magnet.

In yet still a further example thereof, the switchable magnetic flux source includes an electromagnet.

In another still example thereof, the switchable magnetic flux source includes a platter having a plurality of permanent magnets and a plurality of pole portions interleaved therebetween. In a variation thereof, the plurality of permanent magnets and the plurality of pole portions form a linear array. In another variation thereof, the plurality of permanent magnets and the plurality of pole portions form a circular array.

In yet a further example thereof, the switchable magnetic flux source includes a plurality of permanent magnets. In a variation thereof, at least first one of the plurality of permanent magnets is an electro-permanent magnet. In another variation thereof, at least a second one of the plurality of permanent magnets is a rare earth magnet. In still another variation thereof, the plurality of permanent magnets including a first permanent magnet and a second permanent magnet movable relative to the first permanent magnet. In still a further variation thereof, the second permanent magnet is rotatable relative to the first permanent magnet. In yet still a further variation thereof, each of the first permanent magnet and the second permanent magnet are positioned between the first pole portion and the second pole portion. In yet another still variation thereof, in the ON state of the switchable magnetic flux source a north pole of the second permanent magnet is generally aligned with a north pole of the first permanent magnet and in the OFF state of the switchable magnetic flux source a south pole of the second permanent magnet is generally aligned with the north pole of the first permanent magnet.

In yet still a further example thereof, each of the first pole portion and the second pole portion are positioned to a first side of the switchable magnetic flux source and in the at least one of the partial ON state and the ON state of the switchable magnetic flux source are each one of north pole portions of the magnetic coupling device and south pole portions of the magnetic coupling device.

In still yet a further example thereof, the first pole portion is positioned on a first side of the switchable magnetic flux source and the second pole portion is positioned to a second side of the switchable magnetic flux source and in the at least one of the partial ON state and the ON state of the switchable magnetic flux source the first pole portion is a north pole portion of the magnetic coupling device and the second pole portion is a south pole portion of the magnetic coupling device.

In a further still example thereof, the first pole portion is a first cylindrical pin having a first rounded end and the second pole portion is a second cylindrical pin having a second rounded end.

In yet a further still example thereof, the magnetic coupling device further comprising at least one sensor to provide a characteristic of one or more of the plurality of movable pole portions. In a variation thereof, the characteristic is a position of one or more of the plurality of movable pole portions. In another variation thereof, the characteristic is a magnetic flux associated with one or more of the plurality of movable pole portions.

In another example thereof, the magnetic coupling device further comprising a controller operably coupled to the switchable magnetic flux source and the at least one sensor, wherein based on the characteristic of one or more of the plurality of movable pole portions the controller is configured to determine if the one or more of the plurality of movable pole portions is spaced apart from the ferromagnetic workpiece and if the one or more of the plurality of movable pole portions is contacting the ferromagnetic workpiece. In a variation thereof, the controller is configured to determine a movement characteristic of the one or more of the plurality of movable pole portions. In another variation thereof, the movement characteristic of the one or more of the plurality of movable pole portions is a position of the one or more of the plurality of movable pole portions relative to the housing. In still another variation thereof, the first pole portion is retractable relative to the housing and the movement characteristic is when the first pole portion is fully retracted relative to the housing, an end of the first pole portion remaining extended from the housing when fully retracted.

In yet another example thereof, the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing.

In yet still another example thereof, the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller monitors a magnetic flux while the switchable magnetic flux source is in the second partial ON state to determine if the one or more of the plurality of movable pole portions is spaced apart from the ferromagnetic workpiece.

In a further still example thereof, the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller monitors a magnetic flux while the switchable magnetic flux source is in the second partial ON state to determine if the one or more of the plurality of movable pole portions is contacting the ferromagnetic workpiece.

In a yet further still example thereof, the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller monitors a magnetic flux while the switchable magnetic flux source is in the second partial ON state to determine the movement characteristic.

In another exemplary embodiment of the present disclosure, a magnetic coupling device for magnetically coupling to a ferromagnetic workpiece is provided. The magnetic coupling device comprising: a housing; a switchable magnetic flux source supported by the housing; a plurality of pole portions; a plurality of biasers; and a plurality of lock portions. The switchable magnetic flux source being switchable between at least an OFF state and at least one of a partial ON state and an ON state. The plurality of pole portions each include at least one workpiece interface having a workpiece engagement surface. The plurality of biasers bias the plurality of pole portions into an extended position relative to a lower surface of the housing. The plurality of lock portions fix the plurality of pole portions relative to the housing when the switchable magnetic flux source is in the at least one of the partial ON state and the ON state. The plurality of pole portions including a plurality of north pole portions which form a north pole of the magnetic coupling device when the switchable magnetic flux source is in the at least one of the partial ON state and the ON state and a plurality of south pole portions which form a south pole of the magnetic coupling device when the switchable magnetic flux source is in the at least one of the partial ON state and the ON state. Each of the plurality of pole portions are translatable relative to the housing along respective axes when the switchable magnetic flux source is in the OFF state and each includes a respective workpiece interface having a respective workpiece engagement surface.

In an example thereof, the magnetic coupling device further comprising at least one sensor to provide a characteristic of one or more of the plurality of pole portions. In a variation thereof, the characteristic is a position of one or more of the plurality of pole portions. In another variation thereof, the characteristic is a magnetic flux associated with one or more of the plurality of pole portions.

In another example thereof, the magnetic coupling device further comprising a controller operably coupled to the switchable magnetic flux source and the at least one sensor, wherein based on the characteristic of one or more of the plurality of pole portions the controller is configured to determine if the one or more of the plurality of pole portions is spaced apart from the ferromagnetic workpiece and if the one or more of the plurality of pole portions is contacting the ferromagnetic workpiece. In a variation thereof, the controller is configured to determine a movement characteristic of the one or more of the plurality of pole portions. In another variation thereof, the movement characteristic of the one or more of the plurality of pole portions is a position of the one or more of the plurality of pole portions relative to the housing. In a further variation thereof, the movement characteristic is when a first pole portion of the one or more of the plurality of pole portions is fully retracted relative to the housing, an end of the first pole portion remaining extended from the housing when fully retracted.

In a further example thereof, the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source.

In a further still example thereof, the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine if the one or more of the plurality of movable pole portions is spaced apart from the ferromagnetic workpiece.

In yet a further example thereof, the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine if the one or more of the plurality of movable pole portions is contacting the ferromagnetic workpiece.

In yet still a further example thereof, the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine the movement characteristic.

In yet still another example thereof, the magnetic coupling device includes a proximity sensor supported by the housing and separate from the plurality of pole portions.

In still another exemplary embodiment of the present disclosure, a magnetic coupling device for magnetically coupling to a ferromagnetic workpiece is provided. The magnetic coupling device comprising: a housing; a switchable magnetic flux source supported by the housing; and a plurality of pole portions movably coupled to the housing. The switchable magnetic flux source being switchable between at least an OFF state and at least one of a partial ON state and an ON state. Each of the plurality of pole portions including at least one workpiece interface having a work- piece engagement surface. The plurality of pole portions including a first pole portion including a first workpiece interface having a first plurality of spaced apart projections which are movable as a group relative to the housing when the switchable magnetic flux source is in the OFF state and are held relative to the housing when the switchable mag- netic flux source is in the at least one of the partial ON state and the ON state and a second pole portion including a second workpiece interface having a second plurality of spaced apart projections which are movable as a group relative to the housing when the switchable magnetic flux source is in the OFF state and are held relative to the housing when the switchable magnetic flux source is in the at least one of the partial ON state and the ON state.

In an example thereof, the first pole portion is movable relative to a lower surface of the housing in a first direction.

In another example thereof, the first pole portion is movable relative to a lower surface of the housing in only a first direction.

In a further example thereof, the first pole portion includes a plurality of elongated slots having a major axis along the first direction and the magnetic coupling device further comprises a plurality of couplers which couple the first pole portion to the housing and cooperate with the plurality of elongated slots to permit movement of the first pole portion in the first direction.

In a further still example thereof, the first plurality of projections includes a first projection, a second projection, and a third projection. A first spacing between the first projection and the second projection is equal to a second spacing between the second projection and the third projec- tion.

In still another example thereof, the first plurality of projections includes a first projection, a second projection, and a third projection, a first spacing between the first projection and the second projection is unequal to a second spacing between the second projection and the third projec- tion.

In yet another exemplary embodiment of the present disclosure, a magnetic coupling device for magnetically coupling to a ferromagnetic workpiece is provided. The magnetic coupling device comprising: a housing; a switch- able magnetic flux source supported by the housing; a plurality of pole portions; and at least one coupler. The switchable magnetic flux source being switchable between at least an OFF state and at least one of a partial ON state and an ON state. The plurality of pole portions including a first pole portion being movably coupled to the housing. The first pole portion including at least one workpiece interface having a workpiece engagement surface. The first pole portion including at least one elongated slot having a major axis along a first direction. The at least one coupler couples the first pole portion to the housing and cooperates with the at least one elongated slot to constrain movement of the first pole portion in the first direction relative to the housing. The first pole portion is movable relative to the housing when the switchable magnetic flux source is in the OFF state and is held relative to the housing when the switchable magnetic flux source is in the at least one of the partial ON state and the ON state.

In an example thereof, the at least one elongated slot of the first pole portion includes a first elongated slot and a second elongated slot. The at least one coupler cooperates with both the first elongated slot and the second elongated slot to constrain movement of the first pole portion in the first direction relative to the housing.

In another example thereof, the at least one coupler includes a first coupler received in the first elongated slot of the at least one elongated slot and a second coupler received in the second elongated slot of the at least one elongated slot.

In yet still another exemplary embodiment of the present disclosure, a magnetic coupling device for magnetically coupling to a ferromagnetic workpiece is provided. The magnetic coupling device comprising: a housing; a switch- able magnetic flux source supported by the housing, the switchable magnetic flux source being switchable between an OFF state, at least one of a first partial ON state and an ON state, and a second partial ON state; a plurality of pole portions, each including at least one workpiece interface having a workpiece engagement surface, the plurality of pole portions including a first pole portion including a first workpiece interface having a first workpiece engagement surface and a second pole portion including a second work- piece interface having a second workpiece engagement surface, each of the first pole portion and the second pole portion are moveable relative to the housing when the switchable magnetic flux source is in one of the OFF state and the second partial ON state and are held relative to the housing when the switchable magnetic flux source is in the at least one of the partial ON state and the ON state; at least one sensor to provide a characteristic of one or more of the plurality of movable pole portions; and a controller operably coupled to the switchable magnetic flux source and the at least one sensor, wherein based on the characteristic of one or more of the plurality of movable pole portions the controller is configured to determine if the one or more of the plurality of movable pole portions is spaced apart from the ferromagnetic workpiece and if the one or more of the plurality of movable pole portions is contacting the ferro- magnetic workpiece.

In an example thereof, the characteristic is a position of one or more of the plurality of movable pole portions.

In another example thereof, the characteristic is a mag- netic flux associated with one or more of the plurality of movable pole portions.

In still another example thereof, the controller is config- ured to determine a movement characteristic of the one or more of the plurality of movable pole portions. In a variation thereof, the movement characteristic of the one or more of the plurality of movable pole portions is a position of the one or more of the plurality of movable pole portions relative to the housing. In another variation thereof, the first pole portion is retractable relative to the housing and the move- ment characteristic is when the first pole portion is fully retracted relative to the housing, the workpiece engagement surface of the first pole portion remaining extended from the housing when fully retracted.

In a further example thereof, the controller monitors a magnetic flux while the switchable magnetic flux source is in the second partial ON state to determine the movement characteristic.

In yet a further example thereof, the controller monitors a magnetic flux while the switchable magnetic flux source is in the second partial ON state to determine if the one or more of the plurality of movable pole portions is spaced apart from the ferromagnetic workpiece.

In yet still a further example thereof, the controller monitors a magnetic flux while the switchable magnetic flux source is in the second partial ON state to determine if the one or more of the plurality of movable pole portions is contacting the ferromagnetic workpiece.

In a further still example thereof, the first engagement surface of the first pole portion maintains a first position relative to the housing when the switchable magnetic flux source is in one of the OFF state and the second partial ON state independent of an orientation of the housing and in the absence of contact with the ferromagnetic workpiece and the second engagement surface of the second pole portion maintains a second position relative to the housing when the switchable magnetic flux source is in one of the OFF state and the second partial ON state independent of the orientation of the housing and in the absence of contact with the ferromagnetic workpiece.

In yet a further still example thereof, each of the first pole portion and the second pole portion are constrained to be movable relative to the housing in a single degree of freedom. In a variation thereof, the first pole portion is translatable relative to the housing when the switchable magnetic flux source is in one of the OFF state and the second partial ON state. In another variation thereof, the second pole portion is translatable relative to the housing when the switchable magnetic flux source is in one of the OFF state and the second partial ON state.

In another still example thereof, the magnetic coupling device further comprising: a first biaser coupled the housing, the first biaser maintains the first engagement surface of the first pole portion in the first position relative to the housing when the switchable magnetic flux source is in one of the OFF state and the second partial ON state independent of the orientation of the housing and in the absence of contact with the ferromagnetic workpiece; and a second biaser coupled the housing, the second biaser maintains the second engagement surface of the second pole portion in the second position relative to the housing when the switchable magnetic flux source is in one of the OFF state and the second partial ON state independent of the orientation of the housing and in the absence of contact with the ferromagnetic workpiece. In a variation thereof, the first biaser is a first spring and the second biaser is a second spring.

In yet another still example thereof, the magnetic coupling device further comprising: a first support coupled to the housing and supporting the first pole portion, the first support including a first lock portion at least partially defining a first channel to receive the first pole portion, the first lock portion being movable relative to the housing between an unlocked position wherein the first pole portion is movable relative to the housing and a locked position wherein the first pole portion is held relative to the housing; and a second support coupled to the housing and supporting the second pole portion, the second support including a second lock portion at least partially defining a second channel to receive the second pole portion, the second lock portion being movable relative to the housing between an unlocked position wherein the second pole portion is movable relative to the housing and a locked position wherein the second pole portion is held relative to the housing. In a variation thereof, the first pole portion is translatable relative to the housing in a first direction and the first lock portion of the first support is translatable from the unlocked position to the locked position along a second direction, the second direction being angled relative to the first direction.

In still yet another example thereof, the switchable magnetic flux source is positioned between the first pole portion and the second pole portion.

In a further still example thereof, the switchable magnetic flux source includes a plurality of permanent magnets. In a variation thereof, at least first one of the plurality of permanent magnets is an electro-permanent magnet. In another variation thereof, at least a second one of the plurality of permanent magnets is a rare earth magnet. In a further variation thereof, the plurality of permanent magnets including a first permanent magnet and a second permanent magnet movable relative to the first permanent magnet. In still a further variation thereof, the second permanent magnet is rotatable relative to the first permanent magnet. In yet still a further variation thereof, in the ON state of the switchable magnetic flux source a north pole of the second permanent magnet is generally aligned with a north pole of the first permanent magnet and in the OFF state of the switchable magnetic flux source a south pole of the second permanent magnet is generally aligned with the north pole of the first permanent magnet.

In yet a further still example thereof, the first pole portion is a first cylindrical pin having a first rounded end and the second pole portion is a second cylindrical pin having a second rounded end.

In a further exemplary embodiment of the present disclosure, a method of coupling a magnetic coupling device to a ferromagnetic workpiece is provided. The method comprising: providing a housing of the magnetic coupling device, a switchable magnetic flux source supported by the housing and being switchable between an OFF state, at least one of a first partial ON state and an ON state, and a second partial ON state, and a plurality of pole portions, each of the plurality of pole portions including at least one workpiece interface having a workpiece engagement surface, the plurality of pole portions including a first pole portion including a first workpiece interface having a first workpiece engagement surface and a second pole portion including a second workpiece interface having a second workpiece engagement surface, each of the first pole portion and the second pole portion are moveable relative to the housing when the switchable magnetic flux source is in one of the OFF state and the second partial ON state and are held relative to the housing when the switchable magnetic flux source is in the at least one of the partial ON state and the ON state; while the magnetic coupling device is spaced apart from the ferromagnetic workpiece configuring the switchable magnetic flux source in the second partial ON state; determining when at least one of the plurality of moveable pole portions contacts the ferromagnetic workpiece; subsequent to determining when at least one of the plurality of moveable pole portions contacts the ferromagnetic workpiece configuring the switchable magnetic flux source in one the first partial ON state and the ON state; and lifting the ferromagnetic workpiece with the magnetic coupling device.

In an example thereof, the step of configuring the switchable magnetic flux source in one the first partial ON state and the ON state includes the step of configuring the switchable magnetic flux source in the first partial ON state. The method further comprising the step of subsequent to lifting the ferromagnetic workpiece with the magnetic coupling device configuring the switchable magnetic coupling device in one of a third partial ON state and an ON state, the third partial ON state increasing the magnetic flux through the ferromagnetic workpiece relative to the first partial ON state and the second partial ON state.

In yet another exemplary embodiment of the present disclosure, a method of coupling a magnetic coupling device to a ferromagnetic workpiece is provided. The method comprising: monitoring a position of at least one moveable pole portion of the magnetic coupling device relative to a housing of the magnetic coupling device; and when the movable pole portion moves from a first position to a second position securing the moveable pole portion relative to the housing and magnetically coupling magnetic coupling device to the ferromagnetic workpiece with a magnetic circuit sufficient to lift the ferromagnetic workpiece with the magnetic coupling device.

In still yet another exemplary embodiment, a method of coupling a magnetic coupling device to a ferromagnetic workpiece is provided. The method comprising: moving the magnetic coupling device towards the ferromagnetic workpiece at a speed above a first speed, the magnetic coupling device having a plurality of moveable pole portions relative to a housing; detecting a closest one of a plurality of moveable pole portions of the magnetic coupling device is at a first separation from the ferromagnetic workpiece; and slowing the speed of the magnetic coupling device towards the ferromagnetic workpiece to a second speed, the second speed being the first speed or less.

In an example thereof, the method further comprises the steps of: detecting when the plurality of moveable pole portions are contacting the ferromagnetic workpiece; securing the moveable pole portion relative to a housing; and magnetically the coupling magnetic coupling device to the ferromagnetic workpiece with a magnetic circuit sufficient to lift the ferromagnetic workpiece with the magnetic coupling device.

In still a further exemplary embodiment of present disclosure, a magnetic coupling device for magnetically coupling to a ferromagnetic workpiece is provided. The magnetic coupling device comprising: a housing; a switchable magnetic flux source supported by the housing; a plurality of pole portions; at least one sensor supported by the housing; and a controller operably coupled to the switchable magnetic flux source and the at least one sensor. The switchable magnetic flux source being switchable between an OFF state, at least one of a first partial ON state and an ON state, and a second partial ON state. Each of the plurality of pole portions including at least one workpiece interface having a workpiece engagement surface. The plurality of pole portions including a first pole portion including a first workpiece interface having a first workpiece engagement surface and a second pole portion including a second workpiece interface having a second workpiece engagement surface. Each of the first pole portion and the second pole portion are moveable relative to the housing when the switchable magnetic flux source is in one of the OFF state and the second partial ON state and are held relative to the housing when the switchable magnetic flux source is in the at least one of the partial ON state and the ON state. Based on the at least one sensor the controller is configured to determine a separation of the plurality of movable pole portions relative to the ferromagnetic workpiece.

In still a further exemplary embodiment of present disclosure, a robotic system is provided. The robotic system including a robotic arm having a magnetic coupling device according to one or more features of the present disclosure attached to an end of the robotic arm.

Other aspects and optional and/or preferred embodiments will become apparent from the following description provided below with reference to the accompanying drawings.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

DETAILED DESCRIPTION OF THE DRAWINGS

Figure 1:
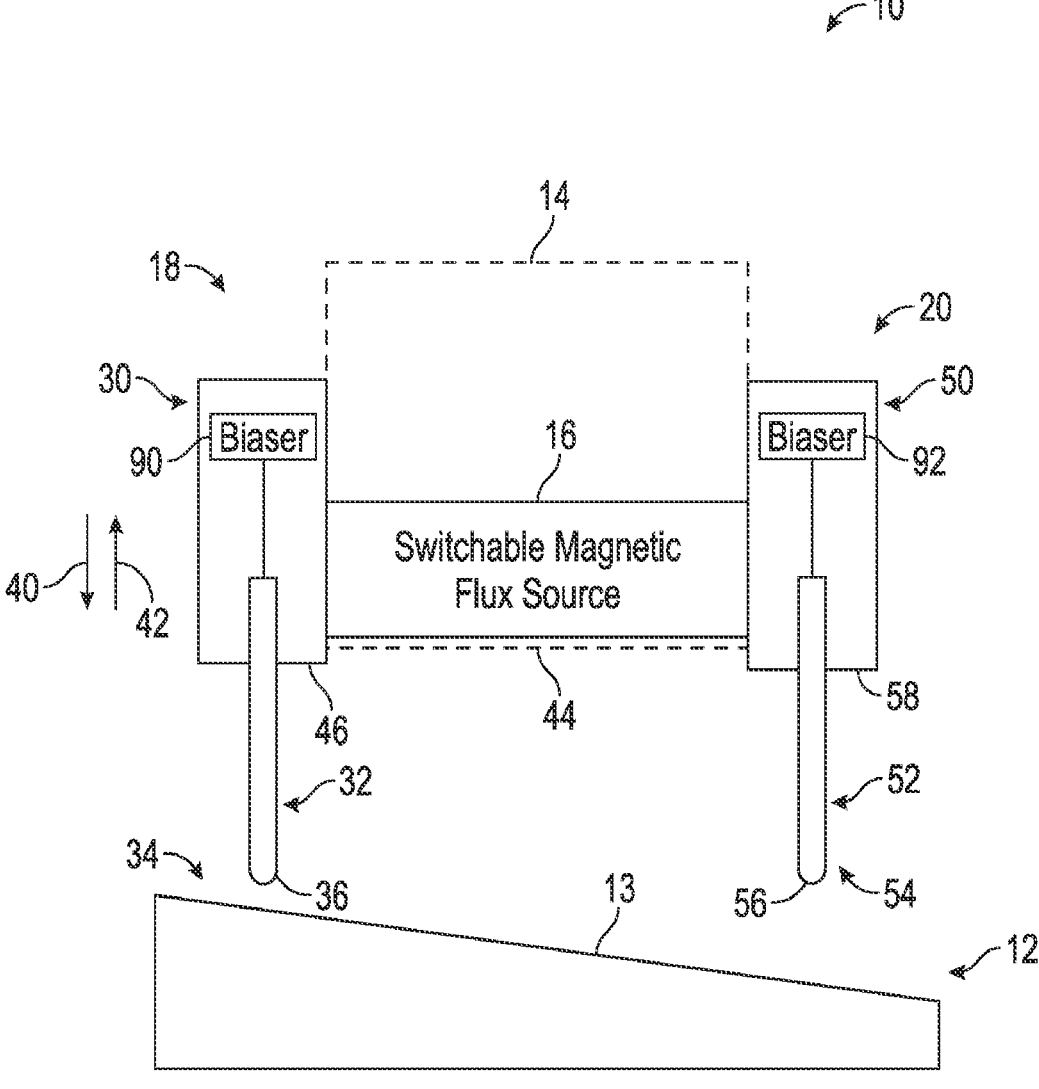
FIG. 1 illustrates a representative view of an exemplary magnetic coupling device having movable pole portions each having a respective workpiece contact interface and the magnetic coupling device being spaced apart from a ferromagnetic workpiece.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an exemplary magnetic coupling device 10 is shown. Magnetic coupling device 10 is configured to magnetically couple a ferromagnetic workpiece 12 having a contact side 13. Magnetic coupling device 10 includes a housing 14, a switchable magnetic flux source 16, a north pole portion 18, and a south pole portion 20.

North pole portion 18 includes a support 30 and a first movable pole portion 32. Support 30 may be coupled to housing 14 or integrally formed with housing 14. Support 30 may be a single component or multiple components assembled together. First movable pole portion 32 includes a workpiece interface 34 having a workpiece engagement surface 36. In embodiments, first movable pole portion 32 is movable relative to support 30 and hence housing 14 in a single degree of freedom. In the illustrated embodiment, first movable pole portion 32 is translatable in direction 40 and direction 42 relative to a lower surface 44 of housing 14 and a lower surface 46 of north pole portion 18. In embodiments, first movable pole portion 32 is rotatable relative to support 30 or housing 14. In embodiments, first movable pole portion 32 is movable relative to support 30 in multiple degrees of freedom.

In the illustrated embodiment, first movable pole portion 32 is illustrated as a cylindrical pin and workpiece engagement surface 36 as a spherical end surface of the cylindrical pin. First movable pole portion 32 and workpiece engagement surface 36 may have other suitable shapes. Workpiece engagement surface 36 may each be planar, curved, contoured, have a plurality of spaced apart projections, or any other suitable shape for contacting contact side 13 of ferromagnetic workpiece 12. First movable pole portion 32 and hence workpiece engagement surface 36 are made of a ferromagnetic material to complete a magnetic circuit from switchable magnetic flux source 16 through ferromagnetic workpiece 12. Referring to FIG. 2A, an exemplary workpiece engagement surface 36 of first movable pole portion 32 (also an exemplary shape for workpiece engagement surface 56 of first movable pole portion 52) is shown. In FIG. 2A, workpiece engagement surface 36 has a spherical shape. Referring to FIG. 2B, another exemplary workpiece engagement surface 36 of first movable pole portion 32 (also an exemplary shape for workpiece engagement surface 56 of first movable pole portion 52) is shown having a central flat region 37 and rounded corners 38. In embodiments, first movable pole portion 32 may include a compliance unit 60 (see FIG. 2C) which includes a support 62 and a spherical ball 64 rotatable within support 62. Spherical ball 64 includes an engagement surface 66 for contact with ferromagnetic workpiece 12. The engagement surface 66, like workpiece engagement surface 36, may be planar, curved, contoured, have a plurality of spaced apart projections, or any other suitable shape for contacting contact side 13 of ferromagnetic workpiece 12. An advantage, among others, of including the compliance unit 60 is the ball 64 may swivel provide a larger surface area contact compared to a point contact of a cylindrical pin with a spherical end. In embodiments, support 62 is cylindrical and may be received by support 30 and be movable relative to housing 14 in the same manner as first movable pole portion 32. Further, in embodiments, first movable pole portion 32 or support 62 may be other shapes, such as hexagonal, square, triangular, and other suitable shapes. By having a polygonal shape, first movable pole portion 32 or support 62 may be received in a similarly sized polygonal opening and by held in a known rotational orientation relative to housing 14.

South pole portion 20 includes a support 50 and a first movable pole portion 52. Support 50 may be coupled to housing 14 or integrally formed with housing 14. Support 50 may be a single component or multiple components assembled together. First movable pole portion 52 includes a workpiece interface 54 having a workpiece engagement surface 56. In embodiments, first movable pole portion 52 is movable relative to support 50 and hence housing 14 in a single degree of freedom. In the illustrated embodiment, first movable pole portion 52 is translatable in direction 40 and direction 42 relative to a lower surface 44 of housing 14 and a lower surface 58 of south pole portion 20. In embodiments, first movable pole portion 52 is rotatable relative to support

50 or housing 14. In embodiments, first movable pole portion 52 is movable relative to support 50 in multiple degrees of freedom.

In the illustrated embodiment, first movable pole portion 52 is illustrated as a cylindrical pin and workpiece engagement surface 56 as a spherical end surface of the cylindrical pin. First movable pole portion 52 and workpiece engagement surface 56 may have other suitable shapes. First movable pole portion 52 and hence workpiece engagement surface 56 are made of a ferromagnetic material to complete a magnetic circuit from switchable magnetic flux source 16 through ferromagnetic workpiece 12.

Switchable magnetic flux source 16 of magnetic coupling tool 10 is switchable between an OFF state wherein a magnetic circuit is formed within housing 14 and an ON state wherein a magnetic circuit is formed from switchable magnetic flux source 16 through workpiece interface 34 of magnetic coupling tool 10, through ferromagnetic workpiece 12, through workpiece interface 54 of magnetic coupling tool 10, and back to switchable magnetic flux source 16. In embodiments, switchable magnetic flux source 16 may be placed in at least one partial ON state wherein the strength of the magnetic circuit formed through ferromagnetic workpiece 12 is more than the OFF state and less than the ON state.

Switchable magnetic flux source 16 may include multiple permanent magnets and is configurable to have at least one overall north pole portion and at least one overall south pole portion when in the ON state. In embodiments, switchable magnetic flux source 16 includes at least one electropermanent magnet which is switchable between an ON state (having a north pole and a south pole) and an OFF state (not magnetized relative to external objects). Further, the at least one electro-permanent magnet may be configured to have its poles be N-S orientation or S-N orientation to permit switchable magnetic flux source 16 to be configured in an ON state and an OFF state. Additionally, the at least one electropermanent magnet may be configured to have varying magnetic strengths which allow the device to be configured in a partial ON state having a magnetic strength at workpiece interfaces 34 and 54 less than the ON state and greater than an OFF state.

Figure 8A:
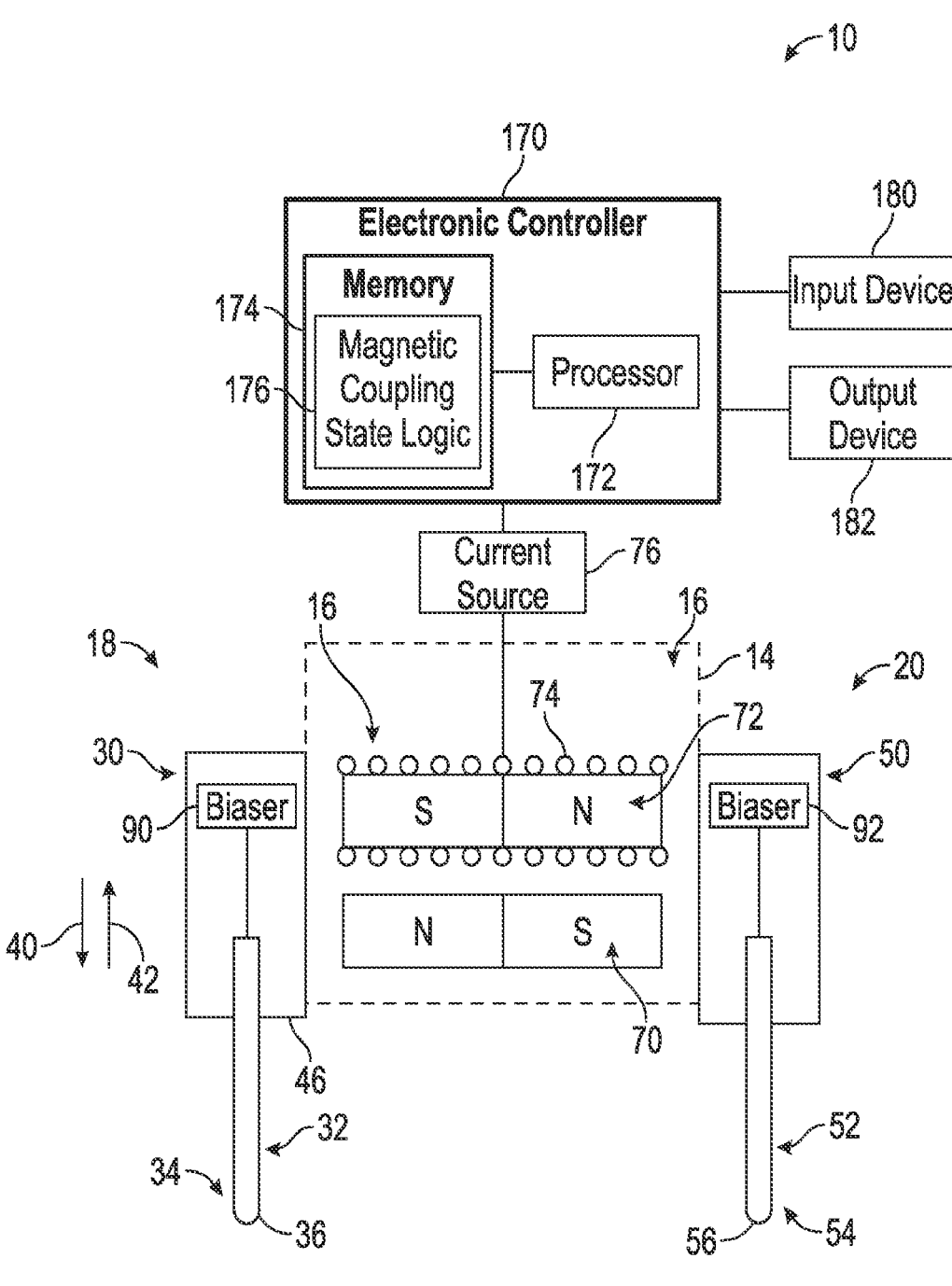
FIG. 8A illustrates a representative view of an exemplary magnetic coupling device including a second exemplary magnetic flux source having a stack of permanent magnets with a first electro-permanent magnet and associated coil and a second permanent magnet.

Referring to FIG. 8A, in embodiments, switchable magnetic flux source 16 includes at least one rare earth permanent magnet 70 and at least one electro-permanent magnet 72, the combination of which is switchable between an ON state (N pole of electro-permanent magnet 72 aligned with N pole of rare earth permanent magnet 70) having a magnetic strength at workpiece interfaces 34 and 54 and an OFF state (as shown in FIG. 8) wherein a magnetic circuit is formed internally to housing 14. Further, the combination may be configured to have varying magnetic strengths which allow the device to be configured in a partial ON state having a magnetic strength at workpiece interfaces 34 and 54 less than the ON state and greater than an OFF state. As shown in FIG. 8A, a plurality of coils 74 are wound around electro-permanent magnet 72 and connected to a current source 76. By applying different currents to coils 74 the pole orientation of electro-permanent magnet 72 may be reversed and maintained without the application of current. Therefore, switchable magnetic flux source 16 may be switched between an OFF state and an ON state without physically moving electro-permanent magnet 72 relative to rare earth permanent magnet 70.

Figure 4:
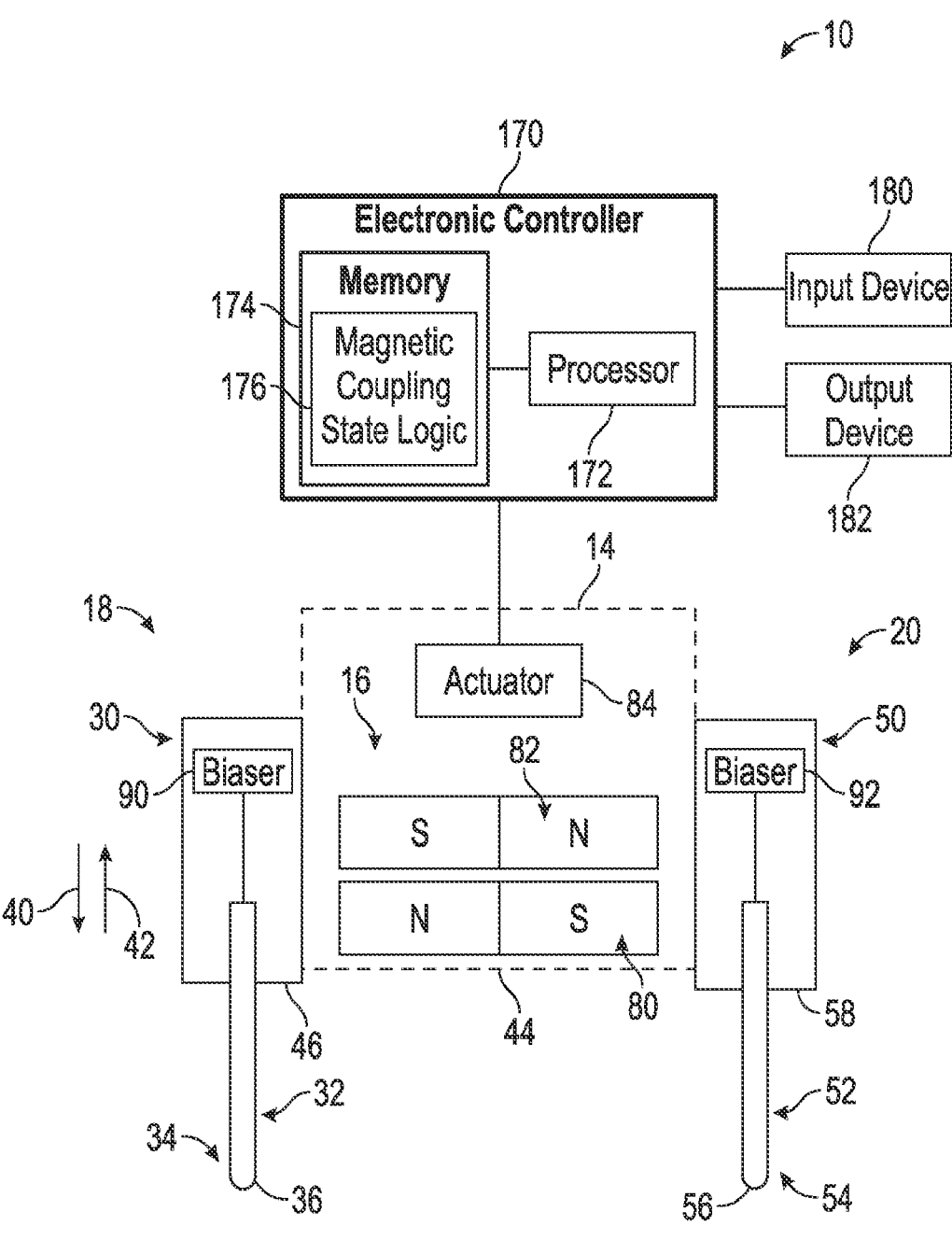
FIG. 4 illustrates a representative view of an exemplary magnetic coupling device including a first exemplary switchable magnetic flux source with an actuator and an electronic controller operatively coupled to the actuator.
Figures 5, 6, 7:
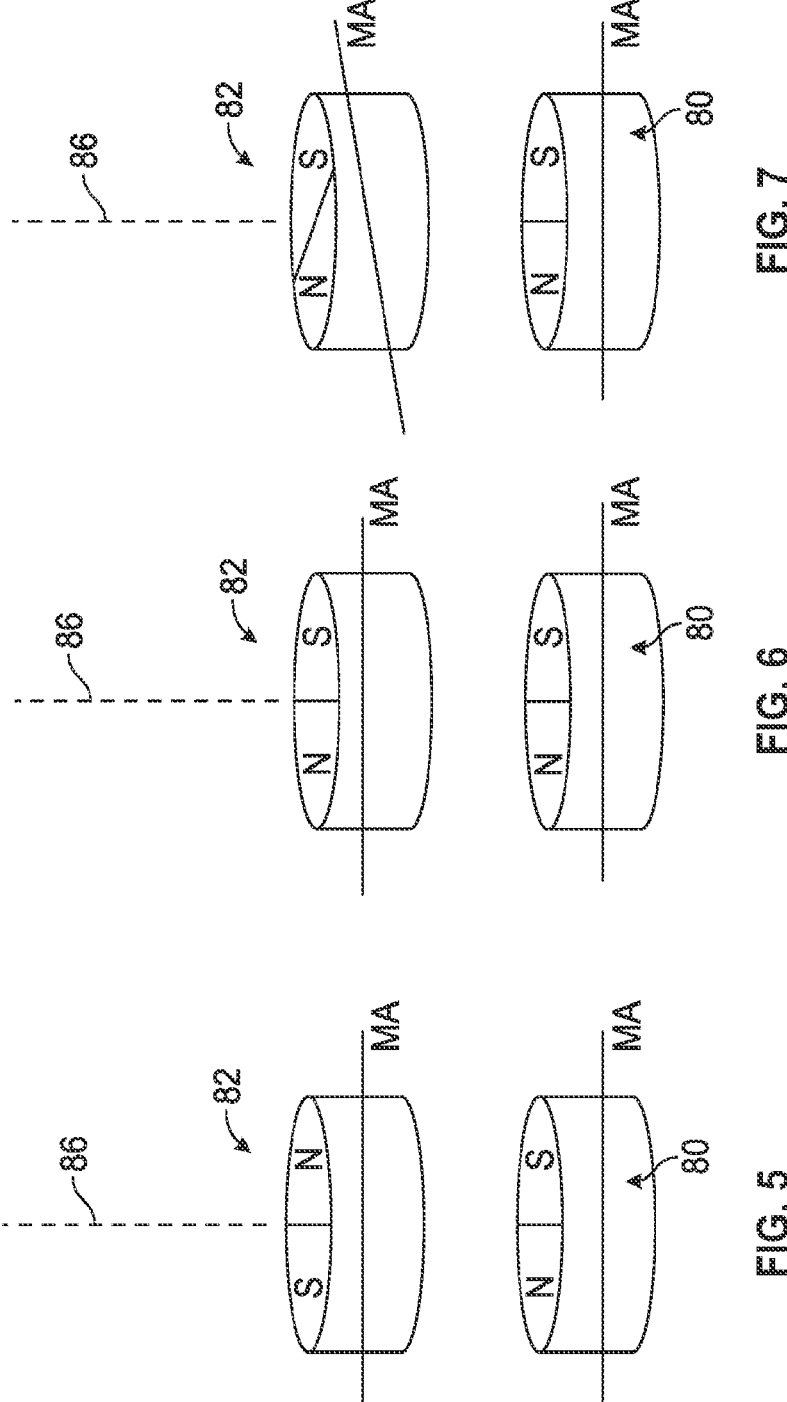
FIG. 5 illustrates a stack of permanent magnets of the first exemplary switchable magnetic flux source with a first permanent magnet movable relative to a second permanent magnet, the stack of permanent magnets being oriented in an OFF state for the magnetic coupling device of FIG. 4.
FIG. 6 illustrates the stack of permanent magnets being oriented in a first ON state for the magnetic coupling device of FIG. 4 wherein the north poles of the two permanent magnets are aligned.
FIG. 7 illustrates the stack of permanent magnets being oriented in a second ON state for the magnetic coupling device of FIG. 4, the second ON state being a partial ON state having a reduced magnetic flux available at the workpiece contact interfaces than the first ON state of FIG. 6.

Referring to FIG. 4, in embodiments, switchable magnetic flux source 16 includes a plurality of rare earth permanent magnets, illustratively rare earth permanent magnet 80 and rare earth permanent magnet 82, the combination of which is switchable between an ON state (N pole of rare earth permanent magnet 82 aligned with N pole of rare earth permanent magnet 80, see FIG. 5) having a magnetic strength at workpiece interfaces 34 and 54 and an OFF state (as shown in FIGS. 4 and 6) wherein a magnetic circuit is formed internally to housing 14. As shown in FIG. 4, an actuator 84 is coupled to rare earth permanent magnet 82 to rotate rare earth permanent magnet 82 relative to rare earth permanent magnet 80 about an axis 86 (see FIGS. 5-7). Further, the combination may be configured to have varying magnetic strengths which allow the device to be configured in a partial ON state having a magnetic strength at workpiece interfaces 34 and 54 less than the ON state and greater than an OFF state (see FIG. 7). In embodiments, actuator 84 may be an electrical actuator, such as a coil placed around rare earth permanent magnet 82; an electro/mechanical, such as an electrical motor and linkage or gear set, or mechanical actuator; a pneumatic actuator; a hydraulic actuator; a manual actuator, or combinations thereof. Exemplary systems including coils to impart rotation of a magnet are disclosed in U.S. Pat. No. 11,031,166, titled ELECTRO-MAGNET-SWITCHABLE PERMANENT MAGNET DEVICE, the entire disclosure of which is expressly incorporated by reference herein. Exemplary actuation systems are disclosed in U.S. Pat. No. 11,097,401, titled MAGNETIC COUPLING DEVICE WITH AT LEAST ONE OF A SENSOR ARRANGEMENT AND A DEGAUSS CAPABILITY and in U.S. Pat. No. 10,903,030 titled VARIABLE FIELD MAGNETIC COUPLERS AND METHODS FOR ENGAGING A FERROMAGNETIC WORKPIECE, the entire disclosures of which are expressly incorporated by reference herein.

Returning to FIG. 1, magnetic coupling device 10 further includes a first biaser 90 coupled to first movable pole portion 32 to bias first movable pole portion 32 in direction 40 to a fully extended position, represented in FIG. 1. A second biaser 92 is coupled to first movable pole portion 52 to bias first movable pole portion 52 in direction 40 to a fully extended position. Exemplary biasers include springs, pressurized fluid chambers, and other suitable devices to bias first movable pole portion 32 and first movable pole portion 52 in direction 40. Exemplary springs include compression springs, torsional springs, gas springs, pneumatic springs, and other suitable types of springs. First movable pole portion 32 and first movable pole portion 52 are biased to the fully extended position independent of an orientation of magnetic coupling device 10. For example, magnetic coupling device 10 is shown in FIG. 1 to be vertically oriented with first movable pole portion 32 and f52 extending below housing 14. First movable pole portion 32 and first movable pole portion 52 would remain fully extended relative to housing 14 even if magnetic coupling device 10 is rotated 90° to the left or right or oriented upside down due to the action of first biaser 90 and second biaser 92.

In embodiments, in the fully extended positions of first movable pole portion 32 and first movable pole portion 52, the apexes of workpiece engagement surface 36 of first movable pole portion 32 and workpiece engagement surface 56 of first movable pole portion 52 define a line which is parallel to lower surface 44 of housing 14. In embodiments, in the fully extended positions of first movable pole portion 32 and first movable pole portion 52, the apexes of workpiece engagement surface 36 of first movable pole portion 32 and workpiece engagement surface 56 of first movable pole portion 52 define a line which is angled relative to lower surface 44 of housing 14. Although only a single first movable pole portion 32 and first movable pole portion 52 are shown in FIG. 1, in embodiments, one or both of north pole portion 18 and south pole portion 20 includes multiple first movable pole portion 32 and first movable pole portion 52. In the illustrated embodiment of FIGS. 10-21, each of north pole portion 18 and south pole portion 20 includes multiple movable pole portions, illustratively each includes two movable pole portions. In embodiments, a movable pole portion is movable in a single degree of freedom, such as the movable pole portions in the illustrated embodiment of FIGS. 10-21 which are translatable in direction 40 and direction 42. In embodiments, a movable pole portion is movable in multiple degrees of freedom. For example, a movable pole portion may have a first portion which is translatable in direction 40 and direction 42 and a second portion coupled to the end of the first portion which is rotatable relative to the first portion. The second portion may be a rocker that is rotatable relative to the first portion and may include a plurality of spaced apart engagement surfaces to contact the workpiece. In embodiments, a moveable pol portion is both translatable relative to housing 14 and rotatable relative to housing 14.

Figure 4A:
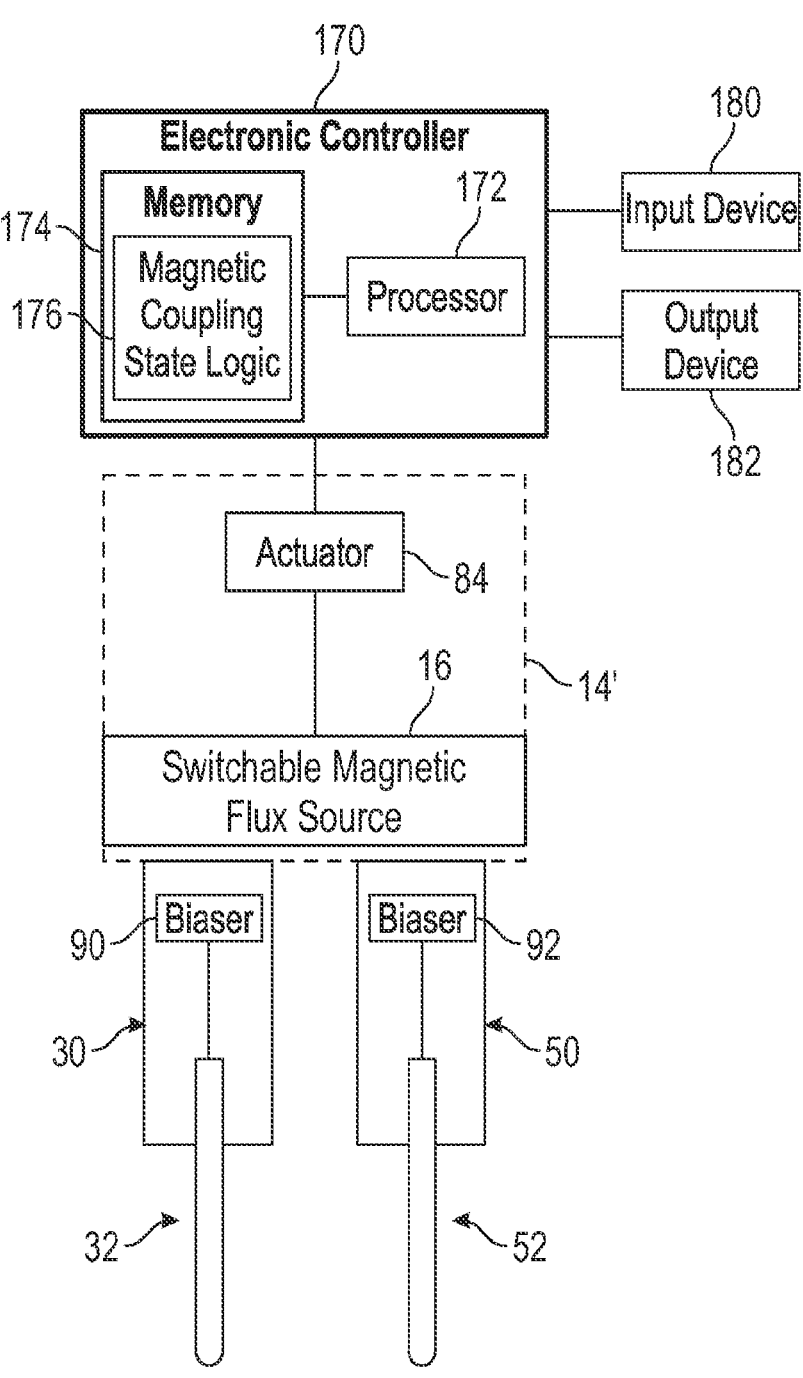
FIG. 4A illustrates a representative view of another exemplary magnetic coupling device including a first exemplary switchable magnetic flux source with an actuator and an electronic controller operatively coupled to the actuator.

As illustrated in FIG. 4, each of first movable pole portion 32 and first movable pole portion 52 are positioned in a non-overlapping vertical arrangement relative to switchable magnetic flux source 16 wherein switchable magnetic flux source 16 is positioned between first movable pole portion 32 and first movable pole portion 52. In embodiments, one or both of first movable pole portion 32 and first movable pole portion 52 may be placed in an overlapping vertical arrangement relative to switchable magnetic flux source 16, such as shown in FIG. 4A, wherein one or both of first movable pole portion 32 and first movable pole portion 52 are within a vertical envelope of switchable magnetic flux source 16. In the arrangement shown in FIG. 4A, a lower portion of housing 14 includes pole portions to allow magnetically coupling of switchable magnetic flux source 16 to first movable pole portion 32 and first movable pole portion 52. In embodiments, the moveable pole portions 32, 52 are removably coupled to housing 14. In examples, the pole portions in the housing include threaded recesses and moveable pole portions include threaded studs that are received in the threaded recesses.

In embodiments, switchable magnetic flux source 16 of magnetic coupling device 10 includes multiple north poles and multiple south poles. In these embodiments, one or more movable pole portions are provided for each of the distinct north pole regions of magnetic coupling device 10 and each of the distinct south pole regions of magnetic coupling device 10. Exemplary switchable magnetic flux source 16 with multiple north poles and multiple south poles include quad pole magnets. Other exemplary switchable magnetic flux source 16 with multiple north poles and multiple south poles include platter arrangements having multiple two-pole magnets. Exemplary platter arrangements are disclosed in U.S. Pat. Nos. 7,161,451; 11,097,401, titled MAGNETIC COUPLING DEVICE WITH AT LEAST ONE OF A SENSOR ARRANGEMENT AND A DEGAUSS CAPABILITY; U.S. Pat. No. 10,903,030 titled VARIABLE FIELD MAGNETIC COUPLERS AND METHODS FOR ENGAGING A FERROMAGNETIC WORKPIECE; U.S. Provisional Patent Application No. 62/248,804, filed Oct. 30, 2015, titled MAGNETIC COUPLING DEVICE WITH A ROTARY ACTUATION SYSTEM; and German Utility Model DE20201600669SU1, the entire disclosures of which are expressly incorporated by reference herein.

Figure 4B:
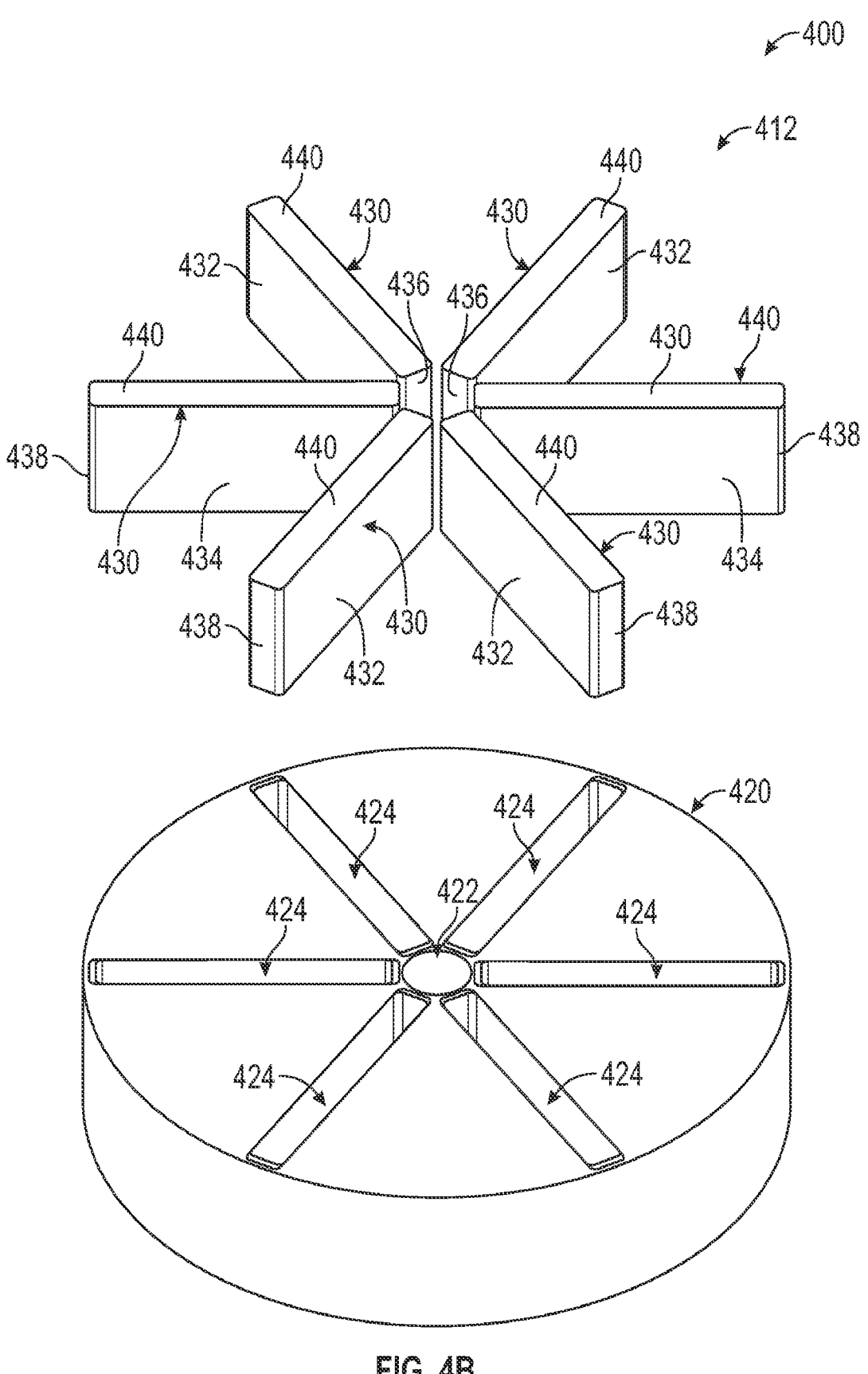
FIG. 4B illustrates an exploded, perspective view of an exemplary platter having a plurality of permanent magnets and pole portions.
Figure 4C:
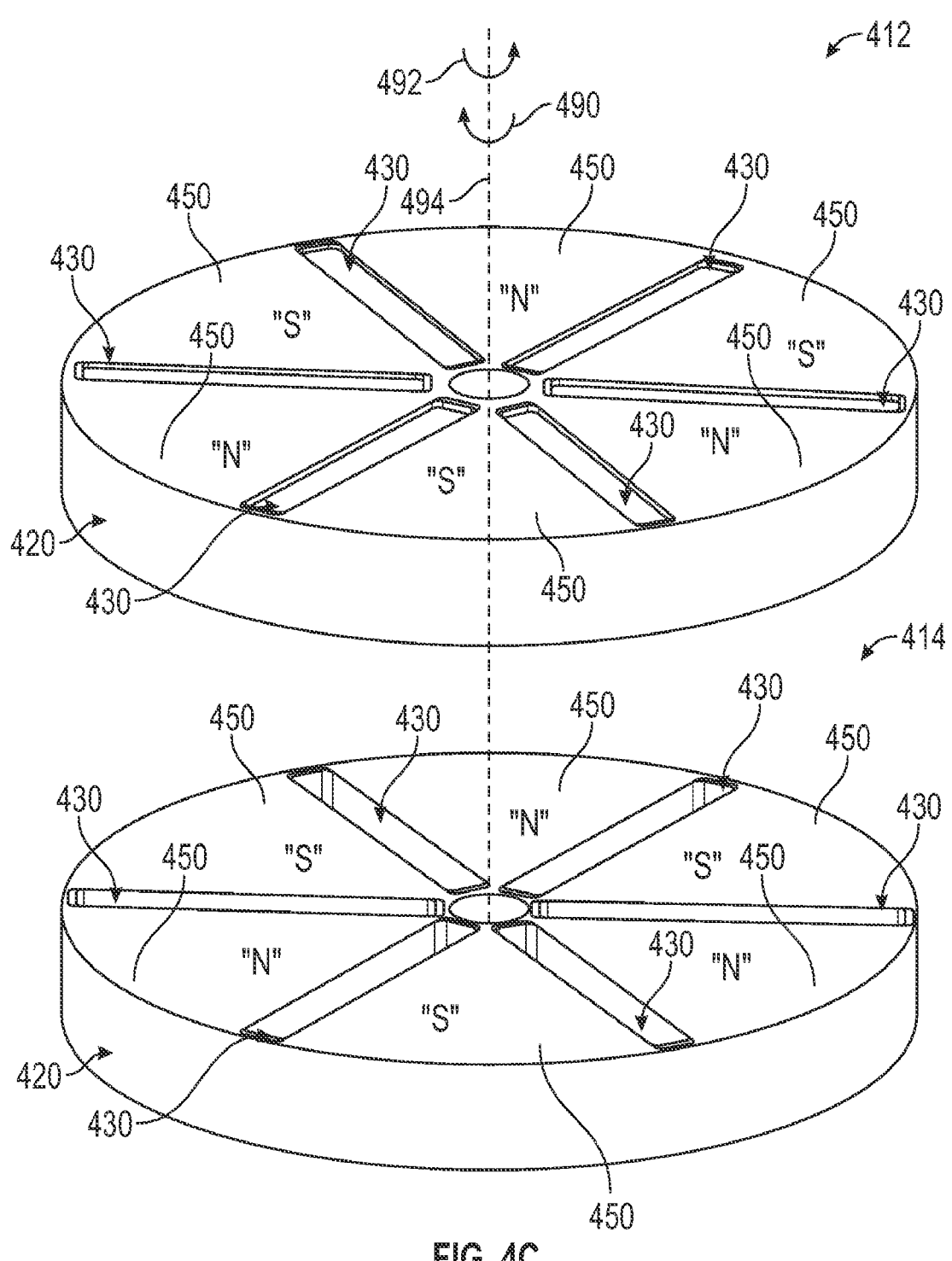
FIG. 4C illustrates a perspective view of the two instances of the platter of FIG. 4B.
Figure 4D:
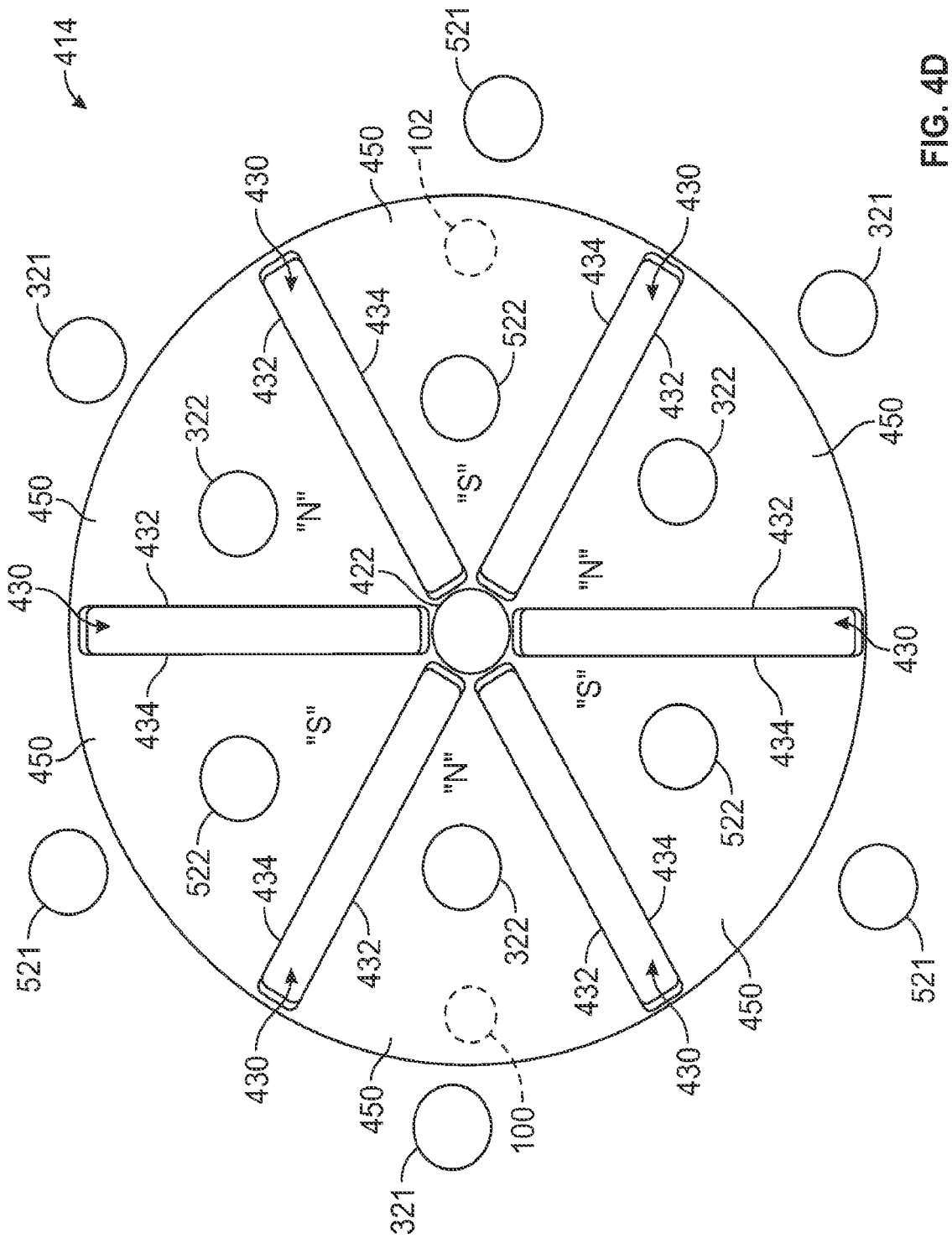
FIG. 4D illustrates a bottom assembled view of the platters of FIG. 4C.

Referring to FIGS. 4B-4D, an exemplary switchable magnetic flux source 400 is shown. Switchable magnetic flux source 400 is placed in a non-ferrous version of housing 14. Pole portions may be provided on a lower surface of housing 14 to contact ferromagnetic workpiece 12. Further, in embodiments, flexible pole shoes 32 and 52 may be magnetically coupled to switchable magnetic flux source 400 as explained herein.

Switchable permanent magnet assembly 400 includes an upper platter 412 and a lower platter 414 to be placed in housing 14. Each of platters 412 and 414 include a plurality of spaced-apart permanent magnets 430 and a plurality of pole portions 450 arranged in a circular array. Each of the plurality of spaced-apart permanent magnets 430 are illustratively shown as a single permanent magnet, but may comprise multiple permanent magnets and/or at least one permanent magnet positioned within a housing. Exemplary platters are provided in U.S. Pat. No. 7,161,451, German Utility Model DE202016006696U1, and U.S. Provisional Patent Application No. 62/248,804, filed Oct. 30, 2015, titled MAGNETIC COUPLING DEVICE WITH A ROTARY ACTUATION SYSTEM, the entire disclosures of which are expressly incorporated by reference herein.

Each permanent magnet 430 has a north pole side 432 and a south pole side 434. The permanent magnets 430 and pole portions 450 of platter 412 and of platter 414 are each arranged to form a closed shape wherein one of pole portions 450 is positioned between two of permanent magnets 430. Further, the permanent magnets 430 are arranged so that each of the two permanent magnets 430 contacting the pole portion 450 therebetween have either their north pole sides or their south pole sides contacting the pole portion 450. When the north pole sides of the adjacent permanent magnets 430 are contacting a pole portion 450, the pole portion 450 is referred to as a north pole portion. When the south pole sides of the adjacent permanent magnets 430 are contacting a pole portion 450, the pole portion 450 is referred to as a south pole portion. Each of upper platter 412 and lower platter 414 includes permanent magnets 430 and pole portions 450 arranged in a circular configuration.

In embodiments, lower platter 414 is held stationary relative to housing 14 containing lower platter 414 and upper platter 412 rotates relative to lower platter 414. Upper platter 412 is rotatable in directions 490, 492 about a central axis 494 relative to lower platter 414 to alter an alignment of the permanent magnets 430 and pole portions 450 of upper platter 412 relative to the permanent magnets 430 and pole portions 450 of lower platter 414.

Switchable permanent magnet assembly 400 is considered to be in an on state when the south pole portions 450 of lower platter 414 are aligned with the south pole portions 450 of upper platter 412 and the north pole portions 450 of lower platter 414 are aligned with the north pole portions 450 of upper platter 412. In the on-state, a workpiece is held by switchable magnetic flux source 400 due to a completion of a magnetic circuit from the aligned north pole portions 450 of upper platter 412 and lower platter 414, through the workpiece, and to the aligned south pole portions 450 of upper platter 412 and 414.

Switchable permanent magnet assembly 400 is considered to be in an off state when the south pole portions 450 of lower platter 414 are aligned with the north pole portions 450 of upper platter 412 and the north pole portions 450 of lower platter 414 are aligned with the south pole portions 450 of upper platter 412. In the off state, a workpiece is not held by switchable magnetic flux source 400 due to a completion of a magnetic circuit within upper platter 412 and lower platter 414 from the aligned north pole portions 450 of upper platter 412 to the south pole portions 450 of lower platter 414 and from the aligned north pole portions of upper platter 412 to the south pole portions 450 of lower platter 414.

Switchable permanent magnet assembly 400 is considered to be in a partial on state when the south pole portions 450 of upper platter 412 are partially overlapping the north pole portions 450 of lower platter 414 and the north pole portions 450 of upper platter 412 are partially overlapping the south pole portions 450 of lower platter 414. When in the partial on state, a workpiece may be held by magnetic flux source due to a completion of a magnetic circuit from the overlapping north pole portions 450 of upper platter 412 and lower platter 414, through the workpiece 27, and to the overlapping south pole portions 450 of upper platter 412 and lower platter 414. The strength of the magnetic circuit increases as the degree of overlap of the overlapping north pole portions 450 of upper platter 412 and lower platter 414 and the overlapping south pole portions 450 of upper platter 412 and lower platter 414 increases.

Referring to FIG. 4B, upper platter 412 is illustrated. Upper platter 412 includes a cylindrical base component 420 having a central aperture 422 and a plurality of radially extending apertures 224. Each of the radially extending apertures 224 is sized and shaped to receive a permanent magnet 430. Each permanent magnet 430 has a north side 432, a south side 434, a radially inward facing side 436, a radially outward facing side 238, a top 440, and a bottom.

As shown in FIG. 4C, cylindrical base component 420 surrounds each of north sides 432, south sides 434, radially inward facing side 136, and radially outward facing side 138 of permanent magnet 430. In one embodiment, apertures 224 are not through apertures, but rather blind depth apertures from the bottom side of cylindrical base component 420 and hence cylindrical base component 420 would also surround top 440 of pole portions 450. In the illustrated embodiment, cylindrical base component 420 is a single integral component. In one embodiment, cylindrical base component 420 is comprised of two or more components joined together. In embodiments, base component 420 and hence pole portions 450 are made of steel. Other suitable ferromagnetic materials may be used for base component 420. Lower platter 414 is generally identical to upper platter 412. Upper platter 412 may be rotated relative to lower platter 414 to place switchable permanent magnet assembly 400 in an on state, a partial on state, or an off state.

Referring to FIG. 4D, upper platter (not visible) and lower platter 414 are arranged in an on-state wherein the south pole portions 450 of upper platter 412 are adjacent the south pole portions 450 of lower platter 414 and the north pole portions 450 of upper platter 412 are adjacent the north pole portions 450 of lower platter 414. Potential arrangements of first movable pole portion 32 and first movable pole portion 52 for switchable magnetic flux source 400 are shown in FIG. 4D. In a first arrangement, first pole portions 321 are placed radially outboard of respective north pole portions 450 and second pole portions 521 are placed radially outboard of respective south pole portions 450. Each of first pole portions 321 and second pole portions 521 are magnetically coupled to switchable magnetic flux source 400 through housing 14 and, in embodiments supports 30, 50. In a second arrangement, first pole portions 322 are placed radially inboard of respective north pole portions 450 and second pole portions 522 are placed radially inboard of respective south pole portions 450. Each of first pole portions 322 and second pole portions 522 are magnetically coupled to switchable magnetic flux source 400 through housing 14 and, in embodiments supports 30, 50. In embodiments, supports 30 and 50 also form the respective pole portions 450 of lower platter 414. In a third arrangement, all of first pole portions 321, first pole portions 322, second pole portions 521, and second pole portions 522 are included. In the on-state, a workpiece 12 being made from a ferromagnetic material is held by switchable magnetic flux source 400 including the upper and lower platters 412, 414 due to a completion of a magnetic circuit from the aligned north pole portions 450 of upper platter 412 and lower platter 414, through one or both of first pole portions 321 and first pole portions 322, through the workpiece through one or both of first pole portions 321 and first pole portions 322, through one or both of second pole portions 521 and second pole portions 522, and to the aligned south pole portions 450 of upper platter 412 and lower platter 414. The lower surfaces of first pole portions 321 and/or first pole portions 322 depending on arrangement and second pole portions 521 and/or second pole portions 522 depending on arrangement form the workpiece contact interfaces. Further, sensors 100, 102 may be positioned adjacent various ones of north pole and south pole portions 450. In embodiments, at least one of the north pole portions 450 and at least one of the south pole portions 450 has a sensor 100, 102 associated therewith to monitor the leakage flux associated with the respective north pole portion and the respective south pole portion. As shown in FIG. 4D, a first sensor 100 may be placed proximate to a north pole portion 450, such as directly over north pole portion 450 or radially outward of north pole portion 450, and a second sensor 102 may be placed proximate to a south pole portion 450, such as directly over south pole portion 450 or radially outward of south pole portion 450. Electronic controller may perform calibration runs for permanent magnet assembly 400 or any of the magnetic coupling devices disclosed herein to store sensor values for determining operating states of the device including switchable magnetic flux source 400.

Figure 2:
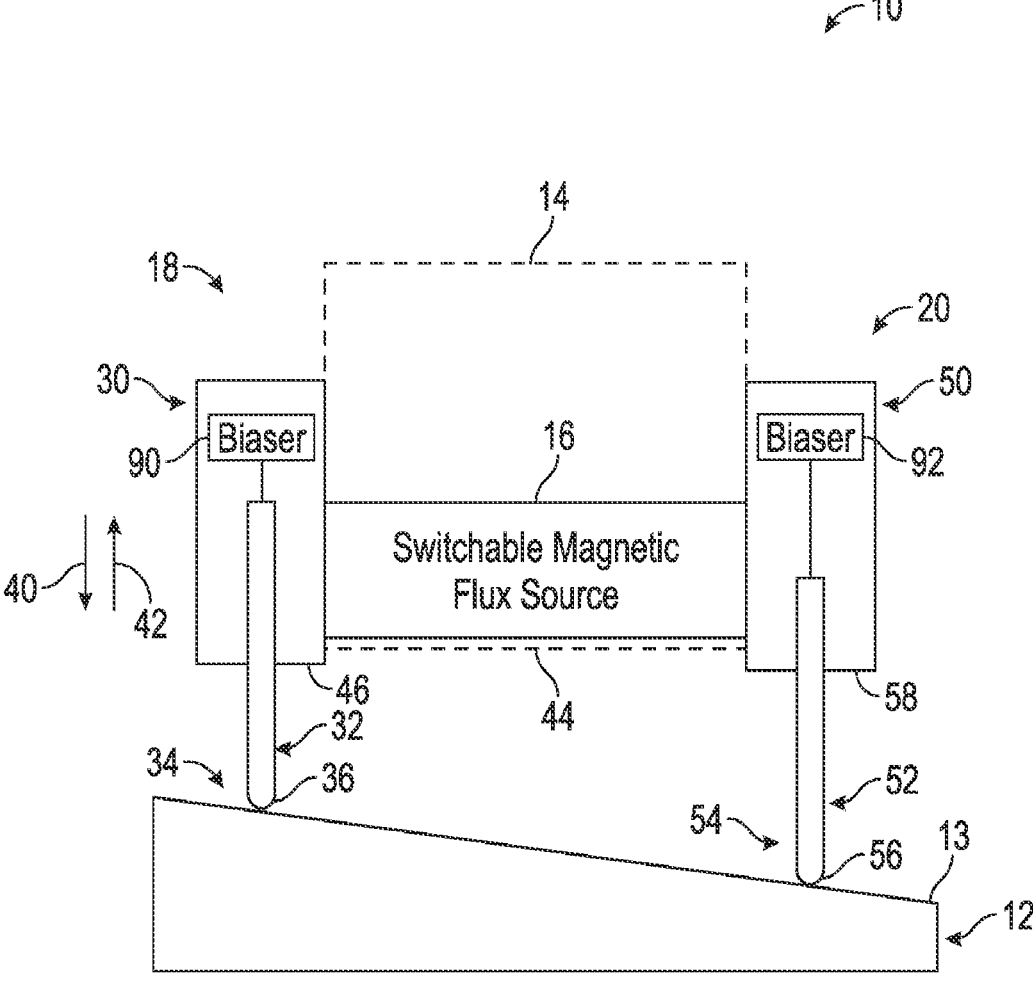
FIG. 2 illustrates the magnetic coupling device of FIG. 1 with the workpiece contact interfaces of the movable pole portions being in contact with the ferromagnetic workpiece and a first pole portion at least partially retracted relative to a lower surface of a housing of the magnetic coupling device.
Figure 2A:
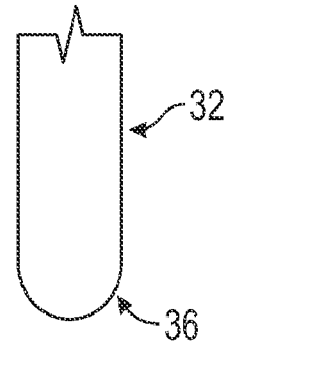
FIG. 2A illustrates an exemplary end of a movable pole portion.
Figure 2B:
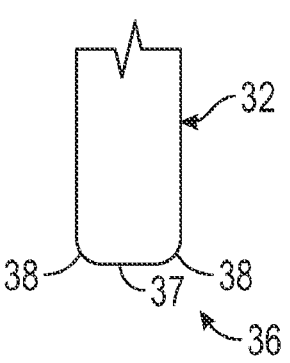
FIG. 2B illustrates another exemplary end of a movable pole portion.
Figure 2C:
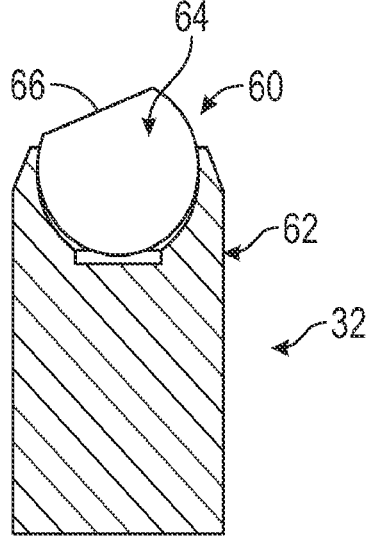
FIG. 2C illustrates a further exemplary end of a movable pole portion including a compliance unit.

Referring to FIG. 2, workpiece engagement surface 36 of first movable pole portion 32 and workpiece engagement surface 56 of first movable pole portion 52 are both in contact with contact side 13 of ferromagnetic workpiece 12. Each of first movable pole portion 32 and first movable pole portion 52 may be retracted within the respective support 30 and support 50. As shown in FIG. 2, first movable pole portion 32 is retracted further relative to support 30 than first movable pole portion 52 is relative to support 50. This independent movement of first movable pole portion 32 and first movable pole portion 52 allows magnetic coupling device 10 to couple to different shaped parts without a need to swap out north pole portion 18 and south pole portion 20.

Figure 3:
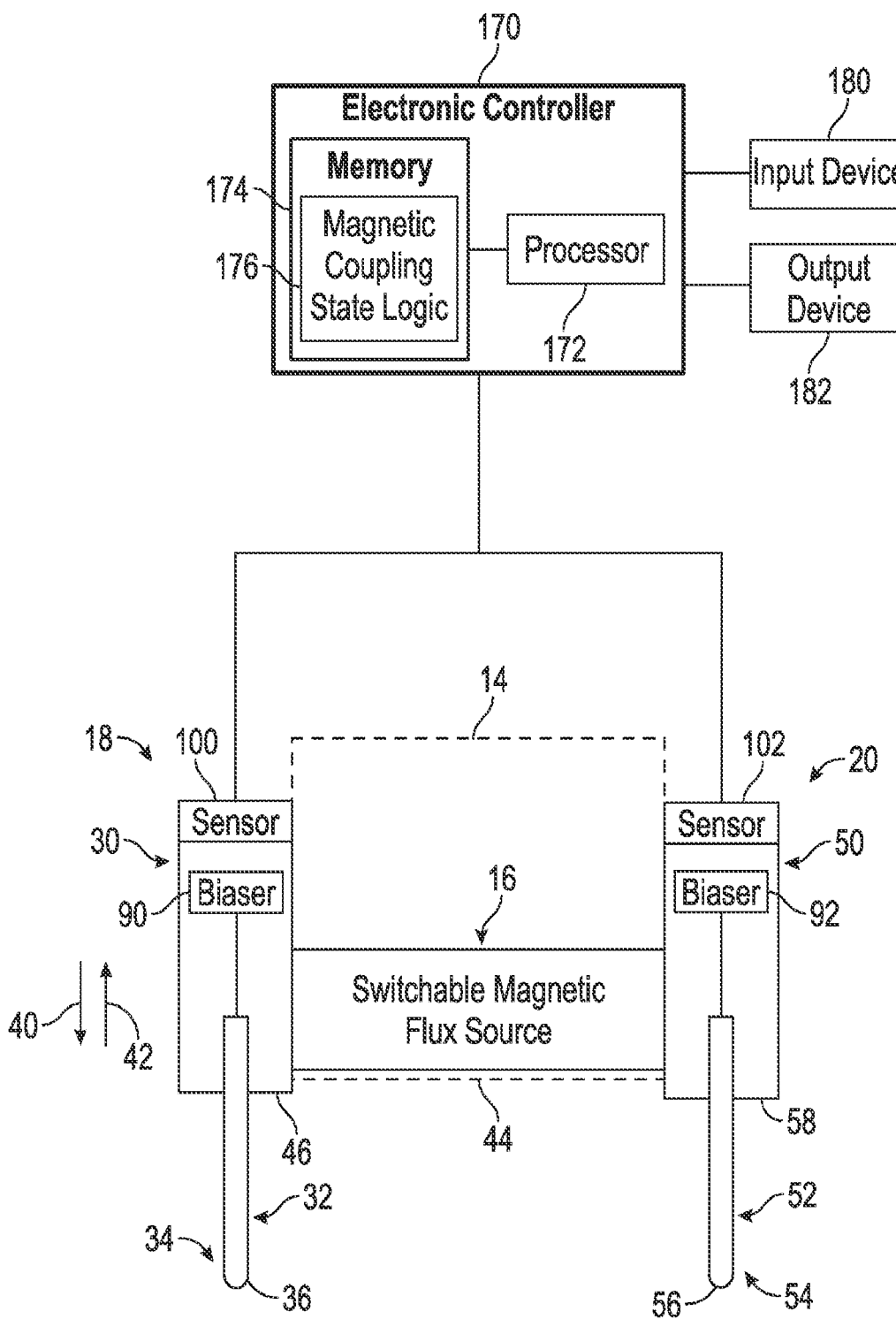
FIG. 3 illustrates the magnetic coupling device of FIG. 1 with a sensing system.

Referring to FIG. 3, in embodiments, magnetic coupling tool 10 further includes a monitoring system 48 including one or more sensors which monitor when workpiece engagement surface 36 of first movable pole portion 32 and workpiece engagement surface 56 of first movable pole portion 52 are in contact with contact side 13 of ferromagnetic workpiece 12. Exemplary monitoring systems include a laser distance sensor mounted on magnetic coupling device 10 stopping magnetic coupling device 10 at a pre taught distance from ferromagnetic workpiece 12. In another monitoring system, each of first movable pole portion 32 and first movable pole portion 52 include a proximity sensor which measures a distance from the sensor to a top of the respective first movable pole portion 32 and first movable pole portion 52 and once all of first movable pole portion 32 and first movable pole portion 52 have moved then further advancement of magnetic coupling device 10 in direction 40 is stopped. In a further monitoring system, a travel distance of each of first movable pole portion 32 and first movable pole portion 52 is measured. In still another monitoring system, a force sensor is used to measure the force required to further advance magnetic coupling device 10 in direction 40. In embodiments, the proximity sensor is supported by housing 14 and separate from moveable pole portions 32, 52. Exemplary proximity sensors include ultrasonic sensors, laser rangefinders, inductive sensors, and other suitable devices for measuring a distance.

Additionally, a characteristic of a magnetic circuit formed between magnetic coupling tool 10 and ferromagnetic workpiece 12 may be used to evaluate the proper placement of magnetic coupling device 10 on contact side 13 of ferromagnetic workpiece 12 when switchable magnetic flux source 16 is in an ON state. As shown in FIG. 3, a first sensor 100 may be positioned proximate north pole portion 18 and a second sensor 102 may be positioned proximate south pole portion 20. Each of first sensor 100 and second sensor 102 may be a magnetic flux sensor. Additional types of sensors include temperature sensors which are used to compensate for temperature dependent drift in the magnetic flux sensors. Additionally, the positions of sensors 100 and 102 are exemplary and one or sensors may be positioned at different locations including closer to or at the lower end of north pole portion 18 and south pole portion 20 and/or centrally located above or below switchable magnetic flux source 16. Exemplary sensing systems are disclosed in U.S. Pat. No. 11,097, 401, titled MAGNETIC COUPLING DEVICE WITH AT LEAST ONE OF A SENSOR ARRANGEMENT AND A DEGAUSS CAPABILITY, the entire disclosure of which is expressly incorporated by reference herein.

Each of sensors 100 and 102 are operatively coupled to an electronic controller 170. Electronic controller 170 includes at least one processor 172 and associated memory 174. Memory 174 includes magnetic coupling state logic 176, which monitors the output of sensors 100 and 102 or other sensors disclosed herein to determine one or more characteristics of magnetic coupling device 10 and/or one or more characteristics of a magnetic circuit formed between magnetic coupling tool 10 and ferromagnetic workpiece 12. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 170 is not microprocessor-based, but rather is configured to control operation of magnetic coupling device 10 based on one or more sets of hardwired instructions. Further, electronic controller 170 may be contained within a single device or be a plurality of devices networked together or otherwise electrically connected to provide the functionality described herein.

Electronic controller 170 may further receive input through one or more input devices 180. Exemplary input devices include buttons, switches, levers, dials, touch displays, soft keys, and a communication module. Electronic controller 170 may further provide output through one or more output devices 182. Exemplary output devices include visual indicators, audio indicators, and a communication module. Exemplary visual indicators include displays, lights, and other visual systems. Exemplary audio indicators include speakers and other suitable audio systems.

Figure 8B:
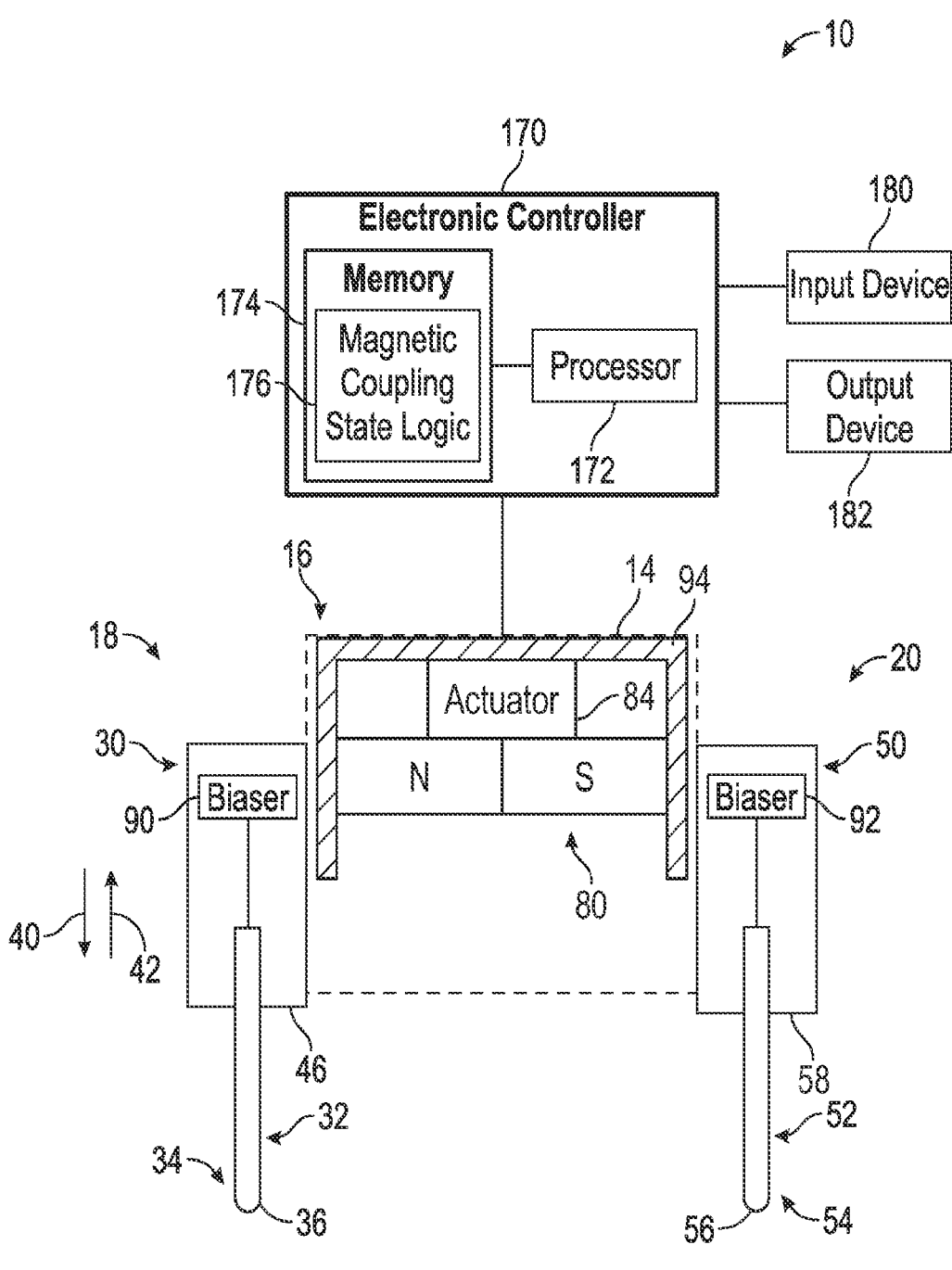
FIG. 8B illustrates a representative view of an exemplary magnetic coupling device including another exemplary magnetic flux source having at least one moveable permanent magnet coupled to an actuator.
Figure 8C:
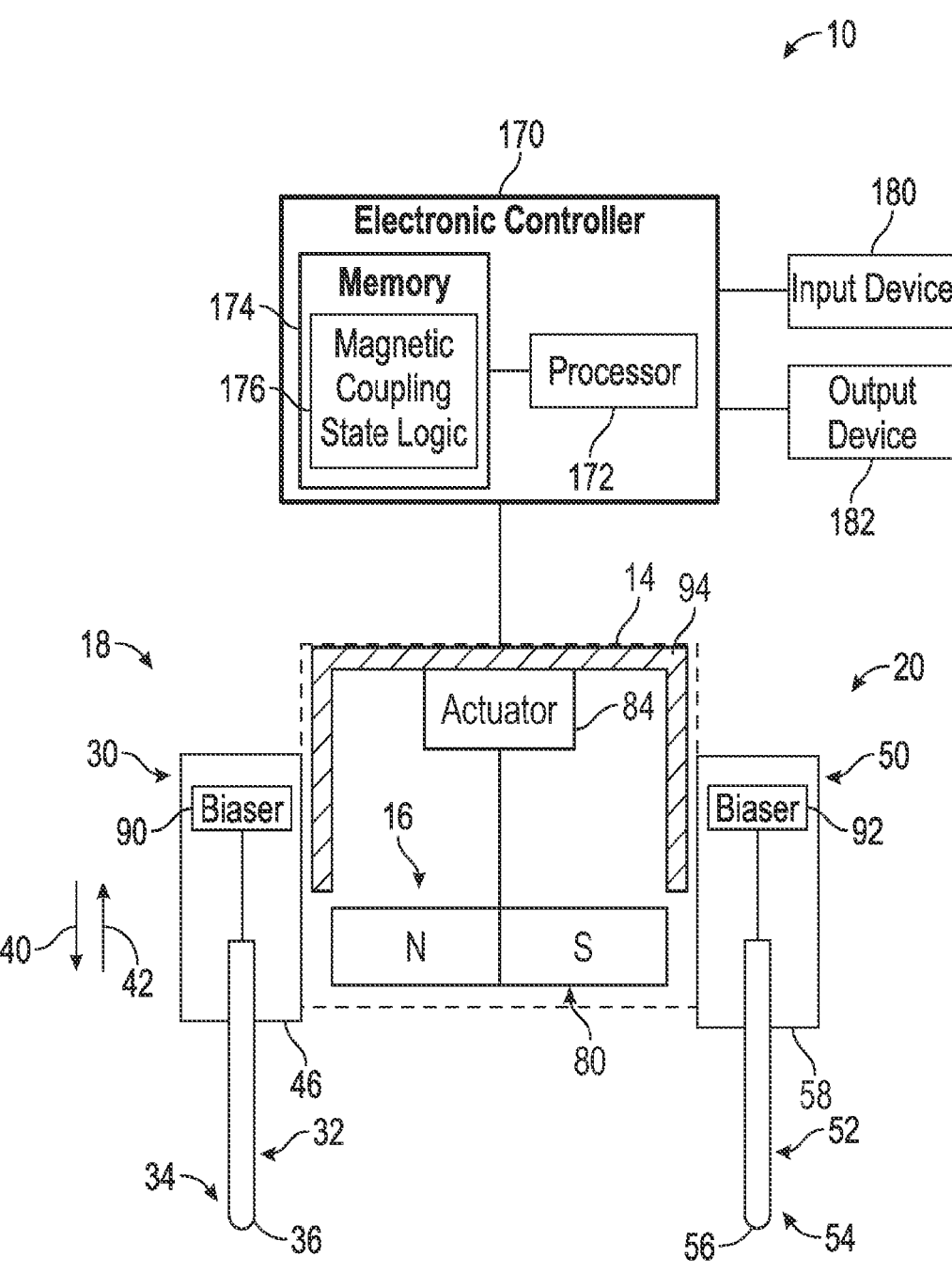
FIG. 8C illustrates the exemplary magnetic coupling device of FIG. 8B with the at least one moveable permanent magnet being in a lowered position.

Referring to FIGS. 8B and 8C, another exemplary magnetic coupling device 600 including a switchable magnetic flux source 16 is shown. Referring to FIG. 8B, a permanent magnet 80 is positioned within an upper portion of housing 14 while in FIG. 8C, rare earth permanent magnet 80 is positioned in a lower portion of housing 14. In the arrangement shown in FIG. 8B, switchable magnetic flux source 16 is in an OFF state. In the arrangement shown in FIG. 8C, switchable magnetic flux source 16 is in an ON state. Permanent magnet 80 is moved between the positions shown in FIGS. 8B and 8C with actuator 84. Actuator 84 may be a mechanical actuator, such as driven by an electric motor; a pneumatic actuator; a hydraulic actuator, or other suitable devices to position rare earth permanent magnet 80. As shown in FIG. 8B, housing 14 may include a ferromagnetic member or shunt 94 which forms a magnetic circuit with rare earth permanent magnet 80 when rare earth permanent magnet 80 is in the raised position to reduce stray magnetic flux reaching first movable pole portion 32 and first movable pole portion 52. In this embodiment, the upper portion of housing 14 is non-ferromagnetic and the lower portion proximate support 30 and support 50 is ferromagnetic.

Figure 4E:
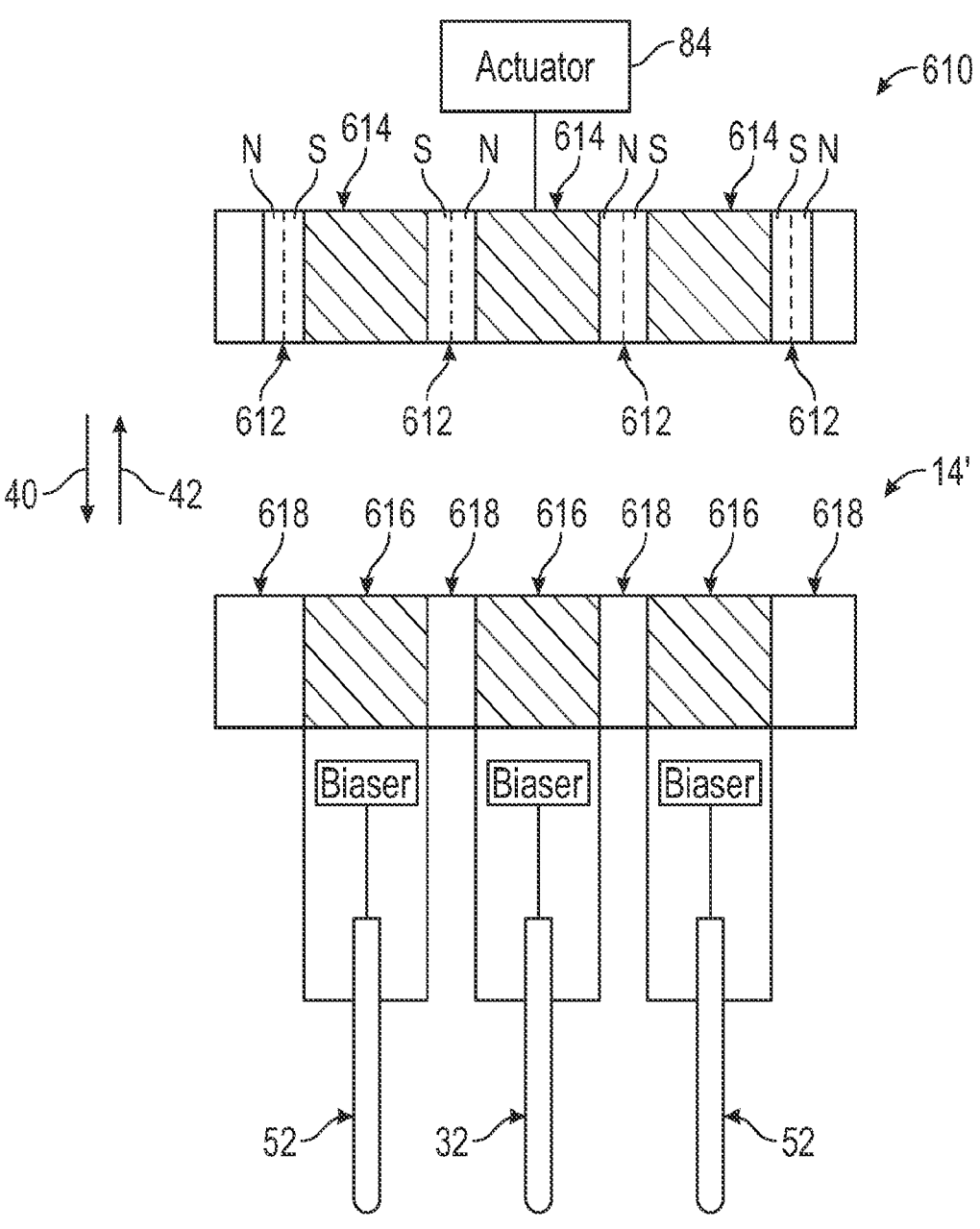
FIG. 4E illustrates an exemplary lower portion of a housing having pole portions and movable pole portions coupled thereto, each of the moveable pole portions having a respective workpiece contact interface, and an exemplary moveable platter having a plurality of permanent magnets and pole portions, the moveable platter being spaced apart from the pole portions of the housing.
Figure 4F:
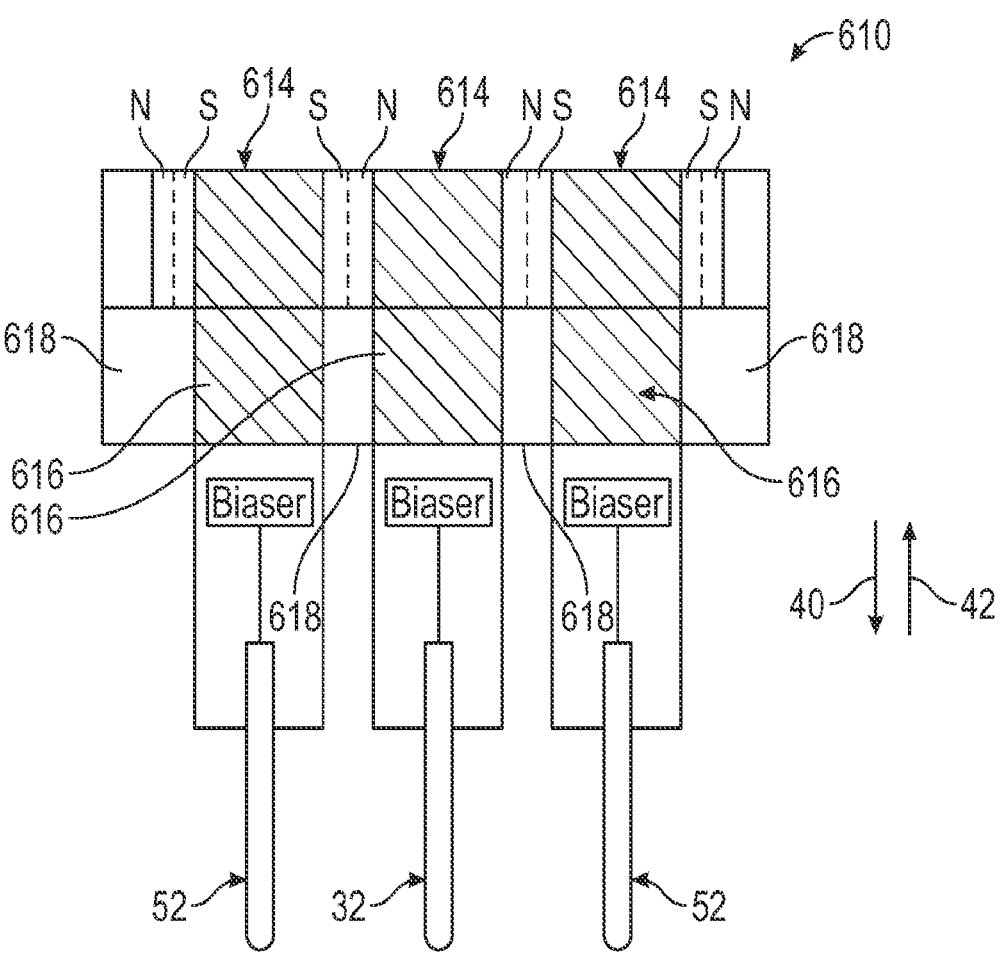
FIG. 4F illustrates the arrangement of FIG. 4E with the moveable platter positioned adjacent the pole portions of the housing.

Referring to FIGS. 4E and 4F, a platter version of magnetic coupling device 600 is shown. FIG. 4E corresponds to FIG. 8B with the device being in an OFF state and FIG. 4F corresponds with FIG. 8C with the device being in an ON state.

Turning to FIG. 4E, rare earth permanent magnet 80 is replaced with a linear platter 610 having a plurality of permanent magnets 612 separated by a plurality of pole portions 614 arranged in a linear array. The magnets are arranged so that the same poles are adjacent each respective pole portion 614 resulting in a first group of the pole portions 614 being south pole portions and a second group of the pole portions 614 being north pole portions. In embodiments, each of permanent magnets 612 and pole portions 614 are rectilinear resulting in linear platter 610 being rectilinear.

A lower portion of housing 14' is also shown. Housing 14' includes a plurality of pole portions 616 and a plurality of non-ferromagnetic portions 618 positioned between the pole portions 616. Pole portions 614 of linear platter 610 are vertically aligned with pole portions 616 of housing 14' and magnets 612 are vertically aligned with non-ferromagnetic portions 618.

When actuator 84 moves linear platter 610 downward in direction 40 to the position shown in FIG. 4F, pole portions 614 are magnetically coupled to the respective pole portions 616 they are vertically positioned over. Pole portions 616 are each magnetically coupled to respective moveable pole portions 32, 52 which contact ferromagnetic workpiece 12. Additionally first movable pole portion 32 and first movable pole portion 52 may be included along the length of the respective pole portions 616. Further, although only three pole portions 616 and corresponding moveable pole portions 32, 52 are shown, in embodiments additional pole portions 616 and corresponding moveable pole portions 32, 52 may be included and linear platter 610 may be similarly increased in the number of permanent magnets 612 and pole portions 614.

Figure 8D:
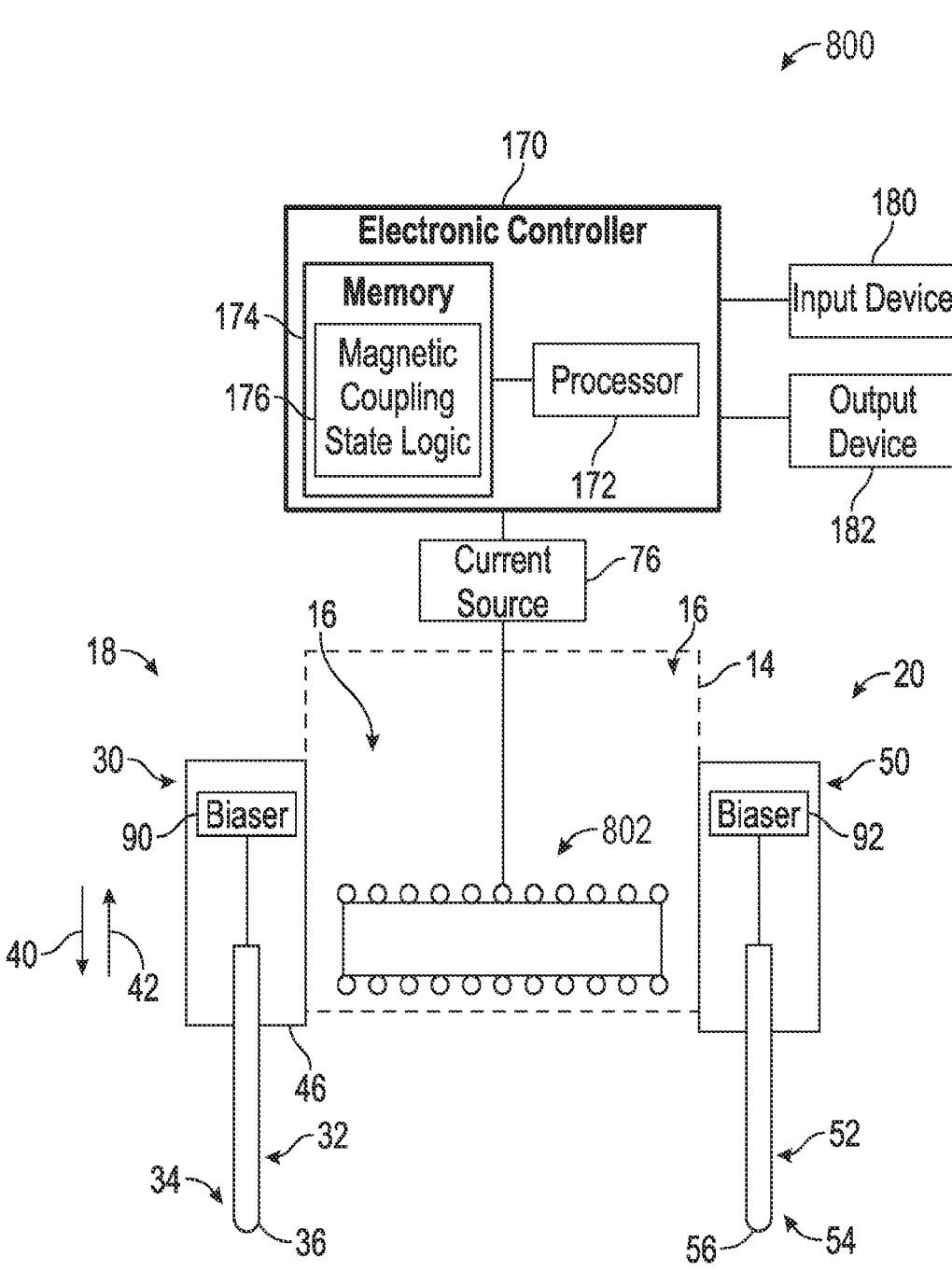
FIG. 8D illustrates a representative view of an exemplary magnetic coupling device including an electromagnet.

Referring to FIG. 8D, another exemplary magnetic coupling device 800 is shown. Magnetic coupling device 800 includes an electro-magnet 802 instead of a permanent magnet, rare-earth or electro-permanent, for the switchable magnetic flux source 16. When current is supplied to electro-magnet 802, exemplary magnetic coupling device 800 is in the ON state and when current is removed, exemplary magnetic coupling device 800 is in the OFF state.

Figure 9:
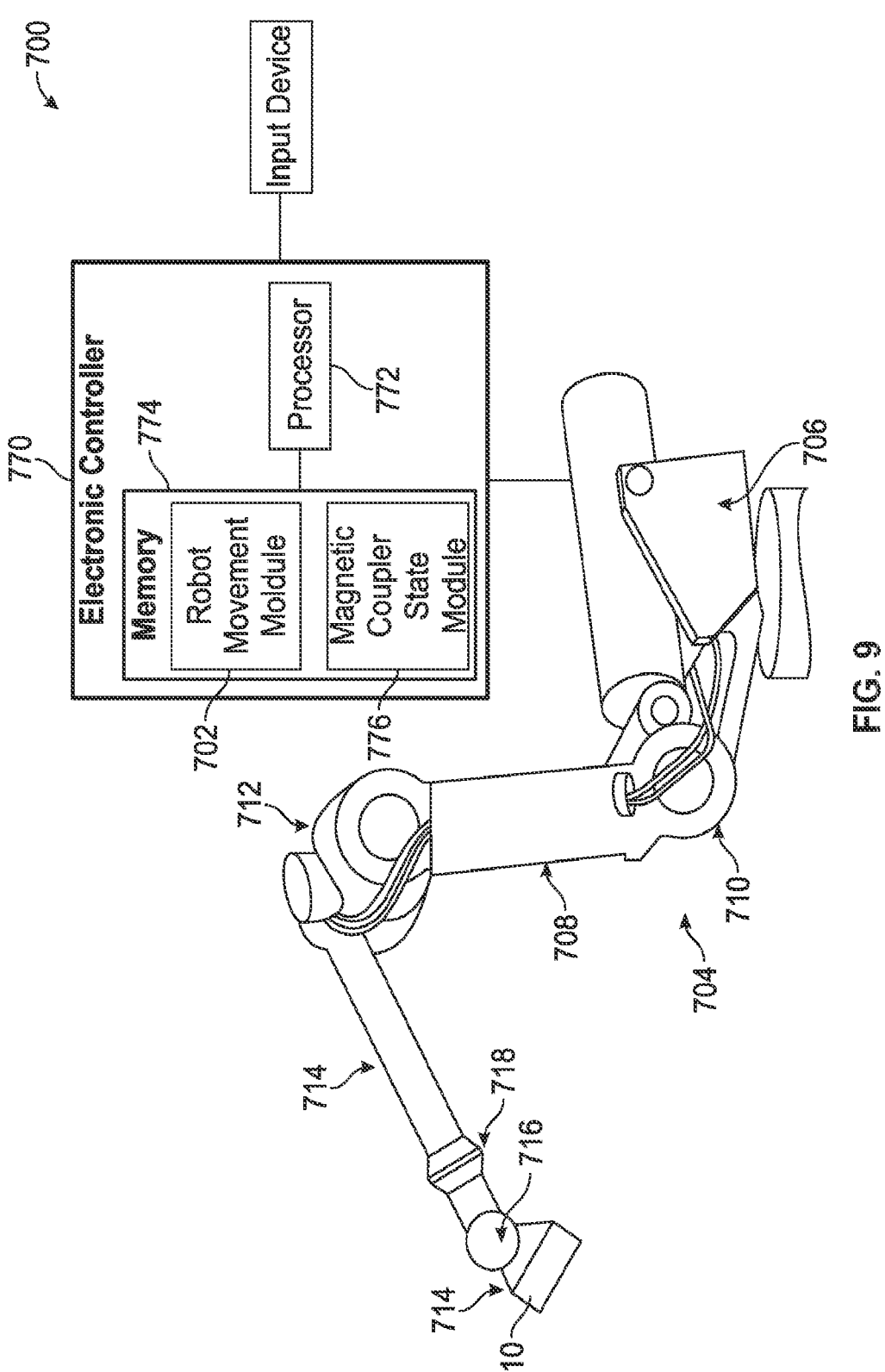
FIG. 9 illustrates an exemplary robot having an exemplary magnetic coupling device attached to an end of an arm of the robot.
Figure 10:
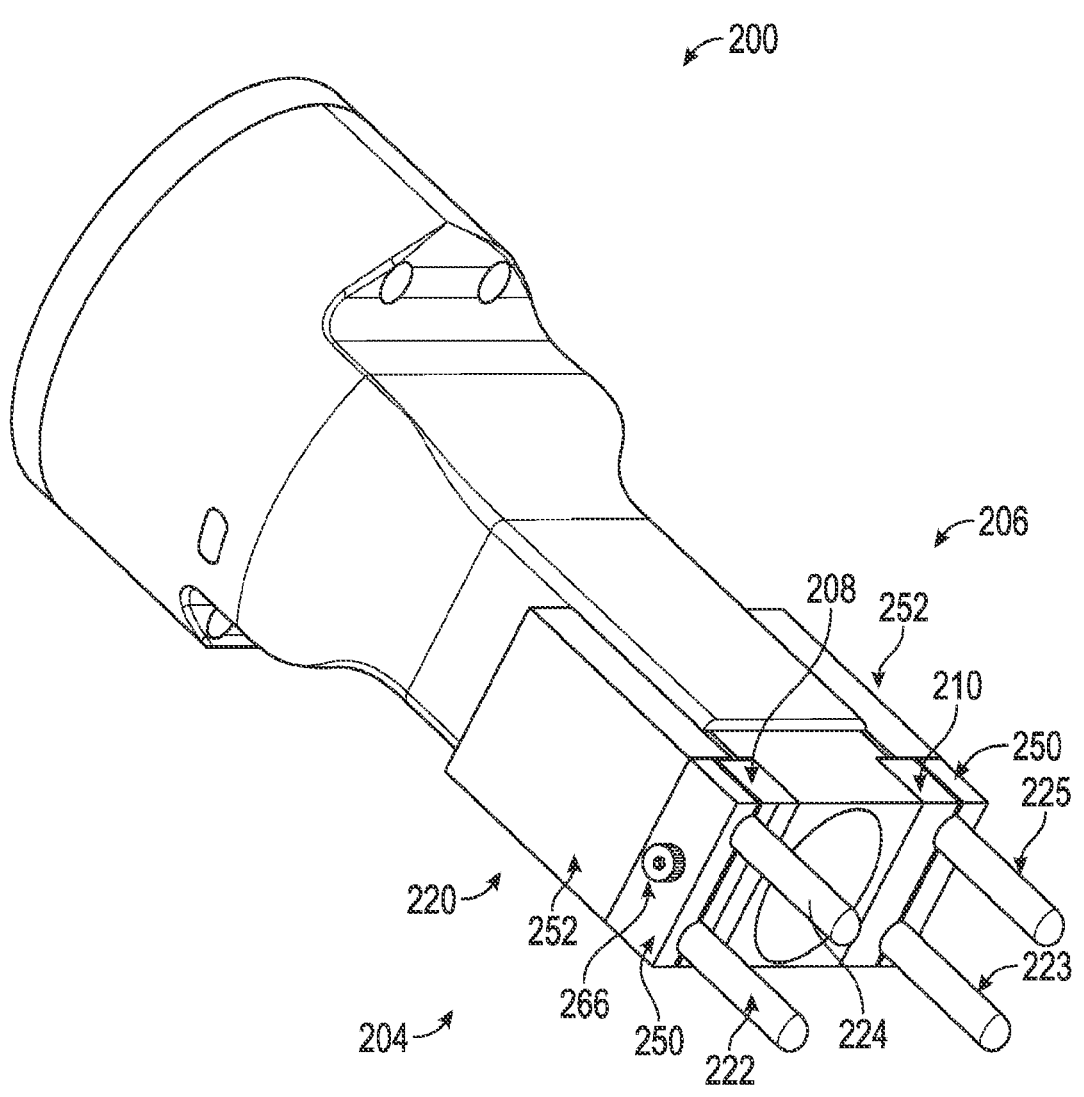
FIG. 10 illustrates a first lower perspective view of an exemplary magnetic coupling device.
Figure 11:
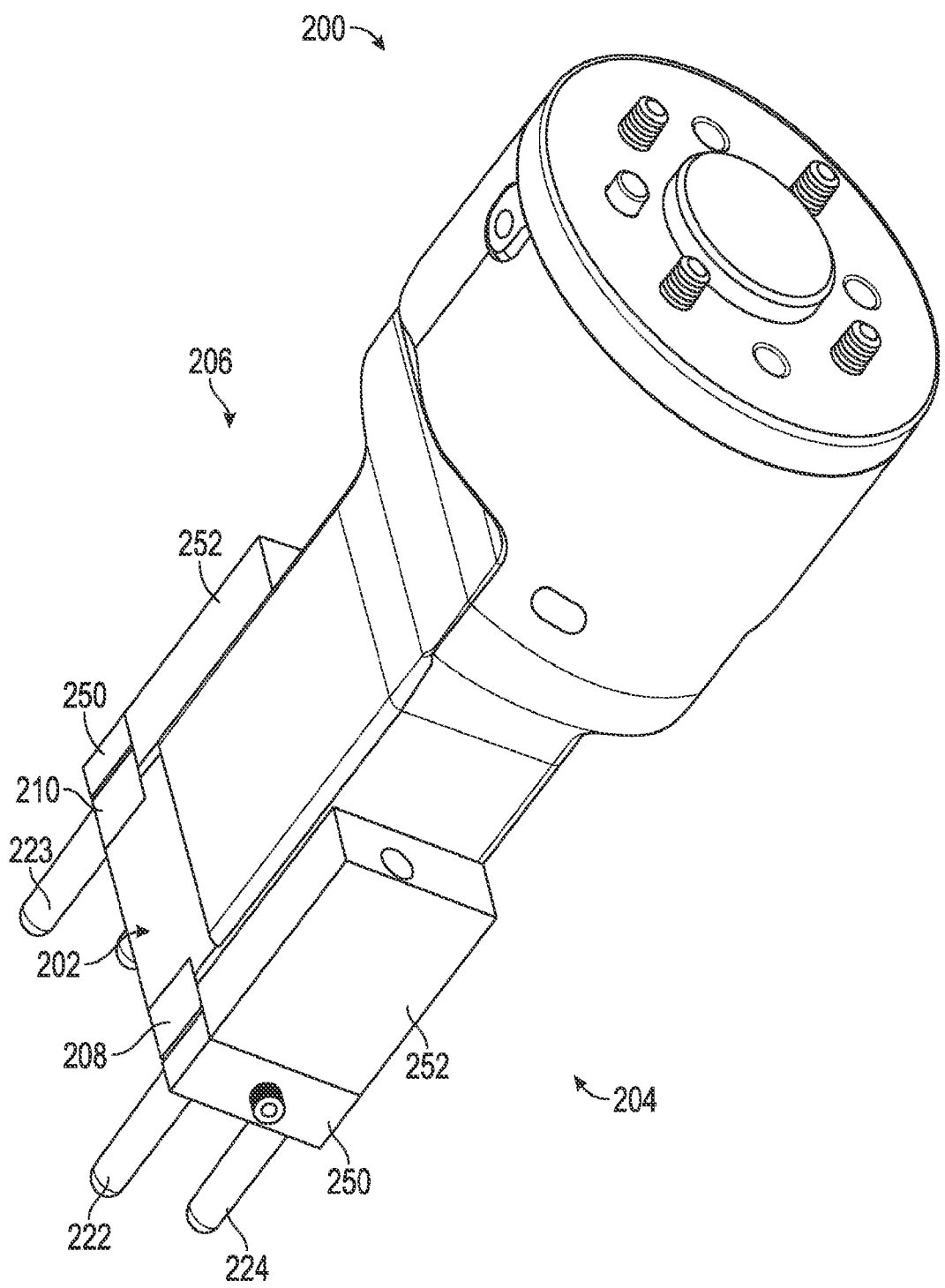
FIG. 11 illustrates a second upper perspective view of the exemplary magnetic coupling device of FIG. 10.

Referring to FIG. 9, an exemplary robotic system 700 is illustrated. While a robotic system 700 is depicted in FIG. 9, the embodiments described in relation thereto may be applied to other types of machines, (e.g., crane hoists, pick and place machines, etc.).

Robotic system 700 includes electronic controller 770. Electronic controller 770 includes additional logic stored in associated memory 774 for execution by processor 772. A robotic movement module 702 is included which controls the movements of a robotic arm 704. In the illustrated embodiment, robotic arm 704 includes a first arm segment 706 which is rotatable relative to a base about a vertical axis. First arm segment 706 is moveably coupled to a second arm segment 708 through a first joint 710 whereat second arm segment 708 may be rotated relative to first arm segment 706 in a first direction. Second arm segment 708 is moveably coupled to a third arm segment 711 through a second joint 712 whereat third arm segment 711 may be rotated relative to second arm segment 708 in a second direction. Third arm segment 711 is moveably coupled to a fourth arm segment 714 through a third joint 716 whereat fourth arm segment 714 may be rotated relative to third arm segment 711 in a third direction and a rotary joint 718 whereby an orientation of fourth arm segment 714 relative to third arm segment 711 may be altered. Magnetic coupling device 10 is illustratively shown secured to the end of robotic arm 704. Magnetic coupling device 10 is used to couple a workpiece 12 to robotic arm 704. Although magnetic coupling device 10 is illustrated, any of the magnetic coupling devices described herein and any number of the magnetic coupling devices described herein may be used with robotic system 700.

In embodiments, electronic controller 770 by processor 772 executing robotic movement module 702 moves robotic arm 704 to a first pose whereat magnetic coupling device 10 contacts the workpiece at a first location. In embodiments, the switchable magnetic flux source 16 of magnetic coupling device 10 is in the OFF state and at least one of magnetic coupling device 10 or robotic system 700 senses or determines that the movable pole shoes of magnetic coupling device 10 are in contact with ferromagnetic workpiece 12. The determination that the movable pole shoes of magnetic coupling device 10 are in contact with ferromagnetic workpiece 12 may be due to readings from sensors of magnetic coupling device 10, sensors of robotic system 700, or a known position of robotic arm 704 of robotic system 700. Electronic controller 770 by processor 772 executing a magnetic coupler state module 776 instructs magnetic device 10 to place magnetic coupling device 10 in one of the ON state or a partial ON state to couple the workpiece 12 to robotic system 700. Electronic controller 770 by processor 772 executing robotic movement module 702 moves the workpiece from the first location to a second, desired, spaced apart location. Once the workpiece is at the desired second position, electronic controller 770 by processor 772 executing magnetic coupler state module 76 instructs magnetic device 10 to place magnetic coupling device 10 in the OFF state to decouple the workpiece from robotic system 700. In one example, electronic controller 770 by processor 772 executing magnetic coupler state module 776 instructs magnetic coupling device 10 to sequentially place the magnetic coupling device 10 in the partially ON state to lift a ferromagnetic workpiece 12, after lifting the ferromagnetic workpiece 12 by moving robotic arm 704 instructs magnetic coupling device 10 to place magnetic coupling device 10 in the ON state or another partial ON state to increase the holding force of magnetic coupling device 10 on ferromagnetic workpiece 12, and after positioning the ferromagnetic workpiece 12 in a desired location by further moving the robotic arm 704 instructs magnetic coupling device 10 to place magnetic coupling device 10 in the OFF state to decouple ferromagnetic workpiece 12 from robotic system 700. In embodiments, electronic controller 770 also monitors the readings from sensors of magnetic coupling device 10 and/or robotic system 700 once ferromagnetic workpiece 12 is moved from the stack to verify proper contact with each of the movable pole portions and ferromagnetic workpiece 12 prior to further movement of ferromagnetic workpiece 12 with robotic system 700. Electronic controller 770 then repeats the process to couple, move, and decouple another workpiece 12.

Figure 12:
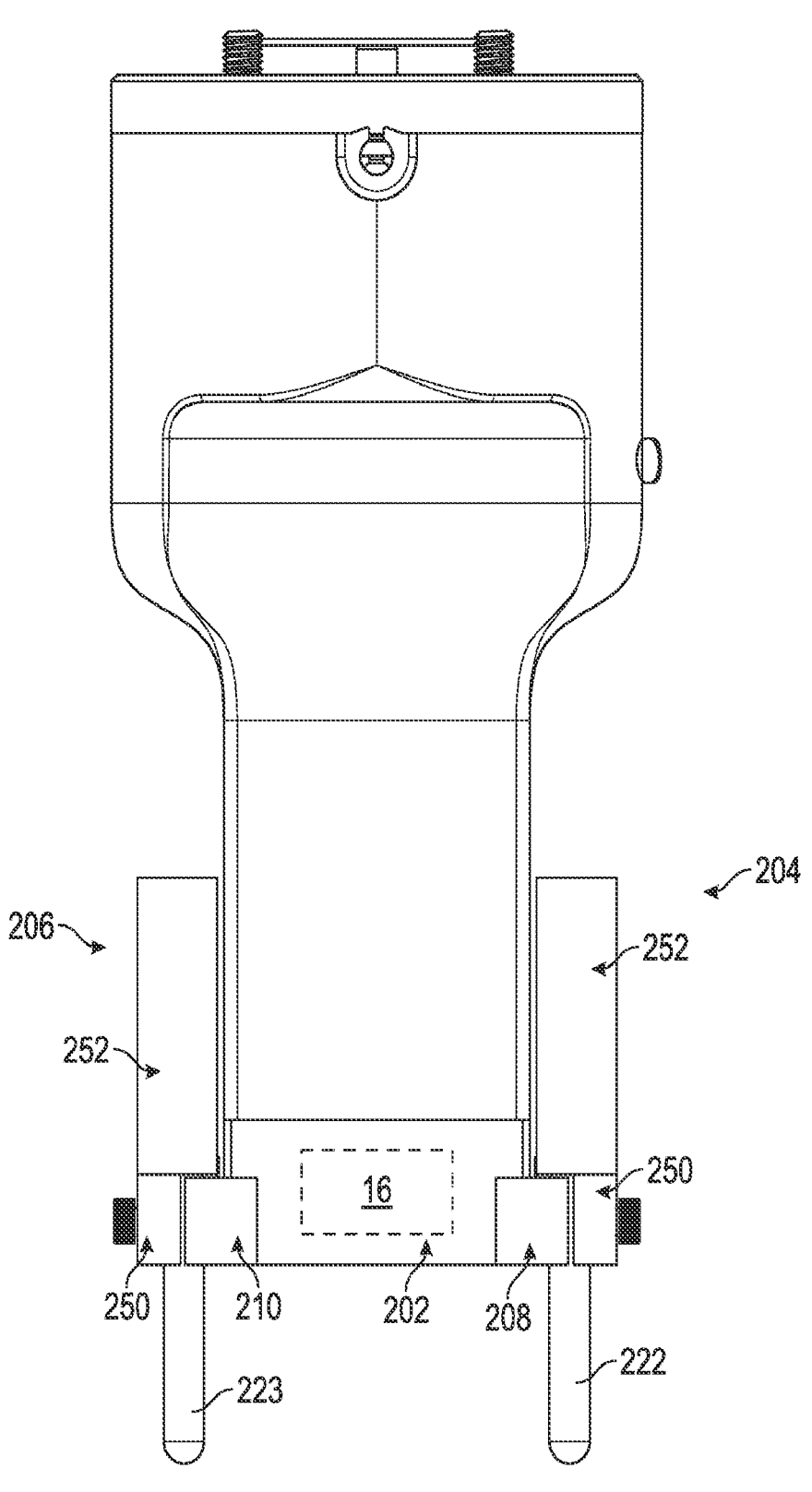
FIG. 12 illustrates a first side view of the exemplary magnetic coupling device of FIG. 10.
Figure 13:
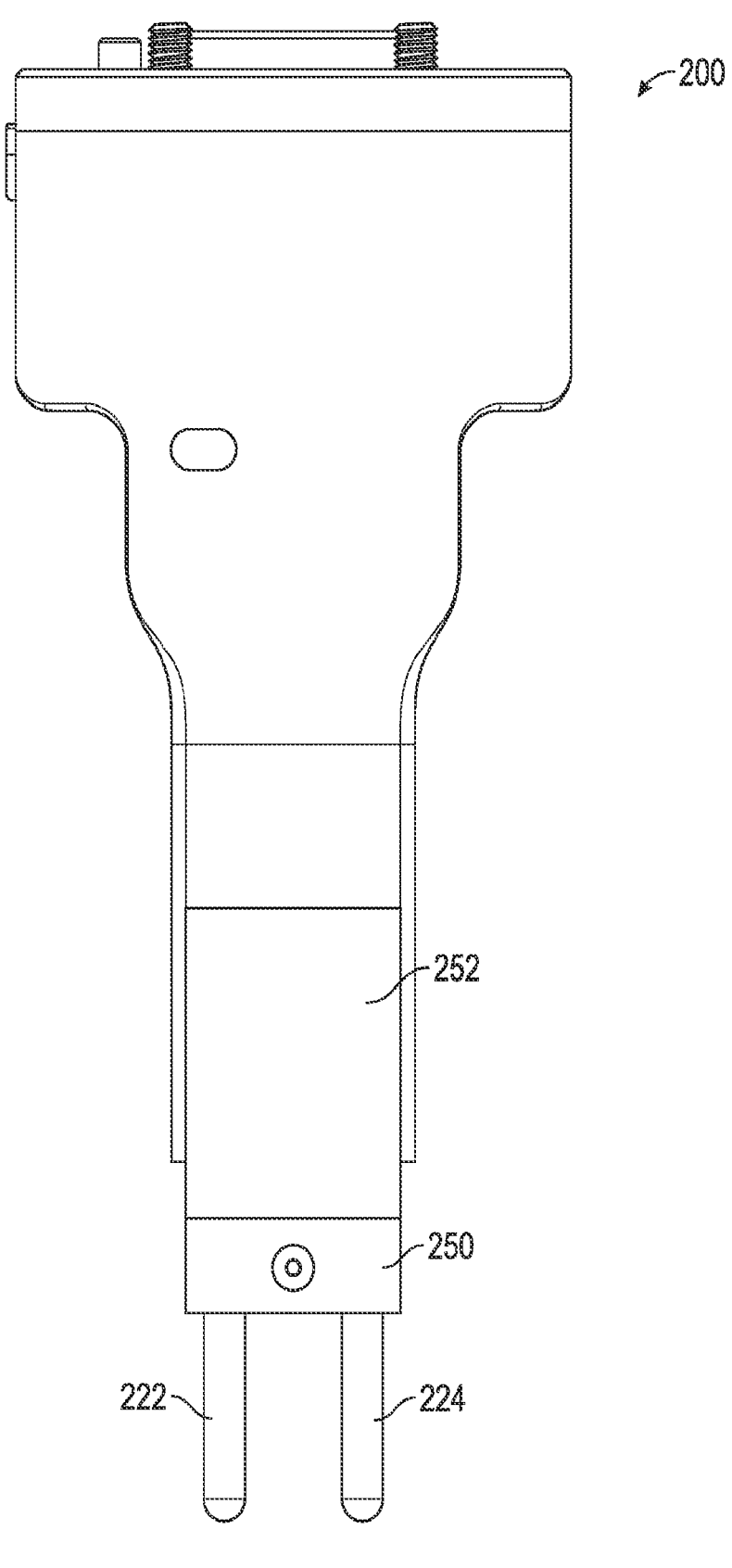
FIG. 13 illustrates a second side view of the exemplary magnetic coupling device of FIG. 10.
Figure 14:
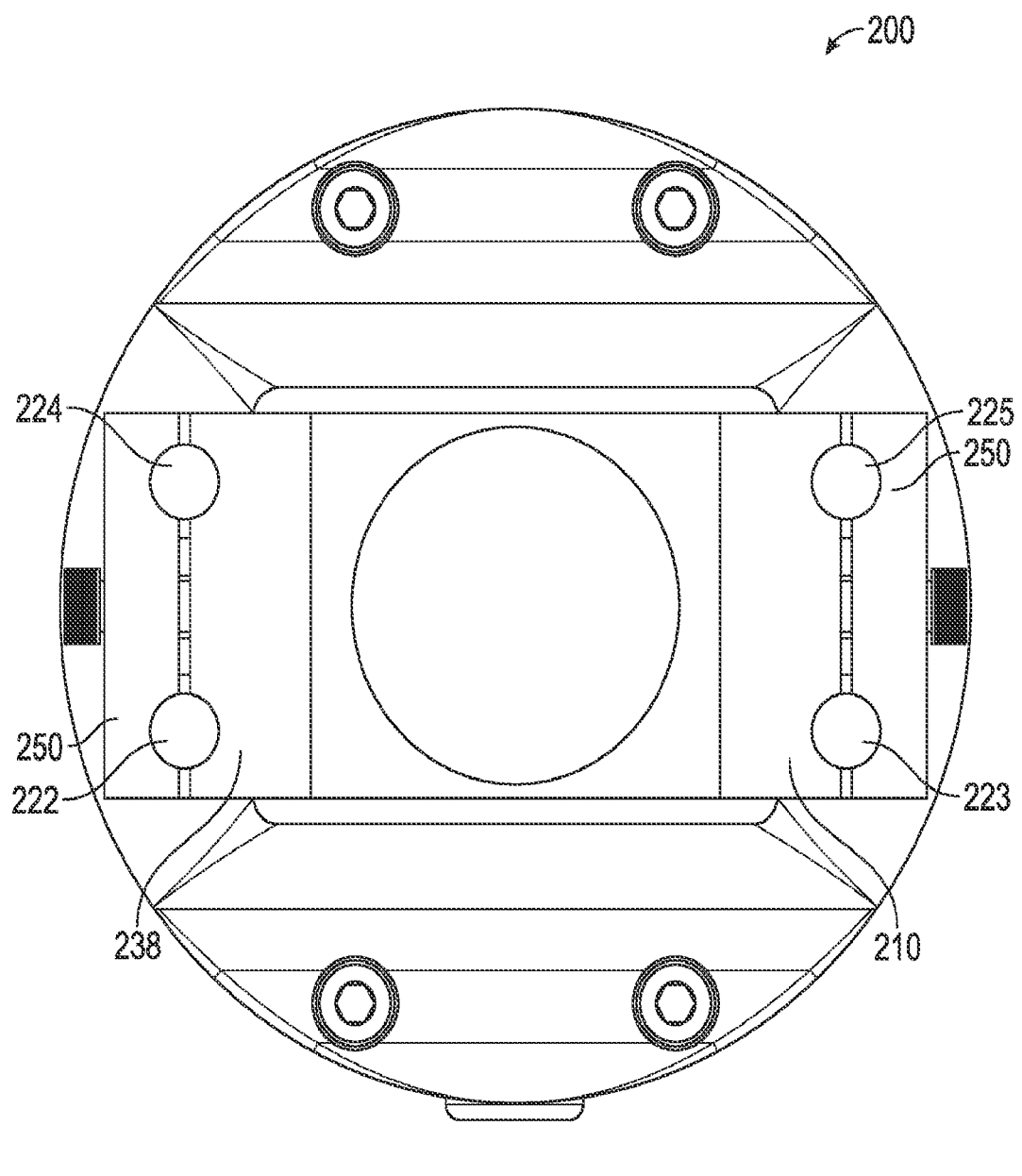
FIG. 14 illustrates a bottom view of the exemplary magnetic coupling device of FIG. 10.

Referring to FIGS. 10-21, an exemplary magnetic coupling device 200 is shown. Referring to FIG. 12, magnetic coupling device 200 includes a housing 202, a switchable magnetic flux source 16 positioned in housing 202, a north pole portion 204, and a south pole portion 206. Each of housing 202 and north pole portion 204 are identical. Each of housing 202 and north pole portion 204 are coupled to respective bases, base 208 and base 210, which are in turn coupled to housing 202. In embodiments, one or both of base 208 and base 210 are integrally formed with south pole portion 206.

Figure 15:
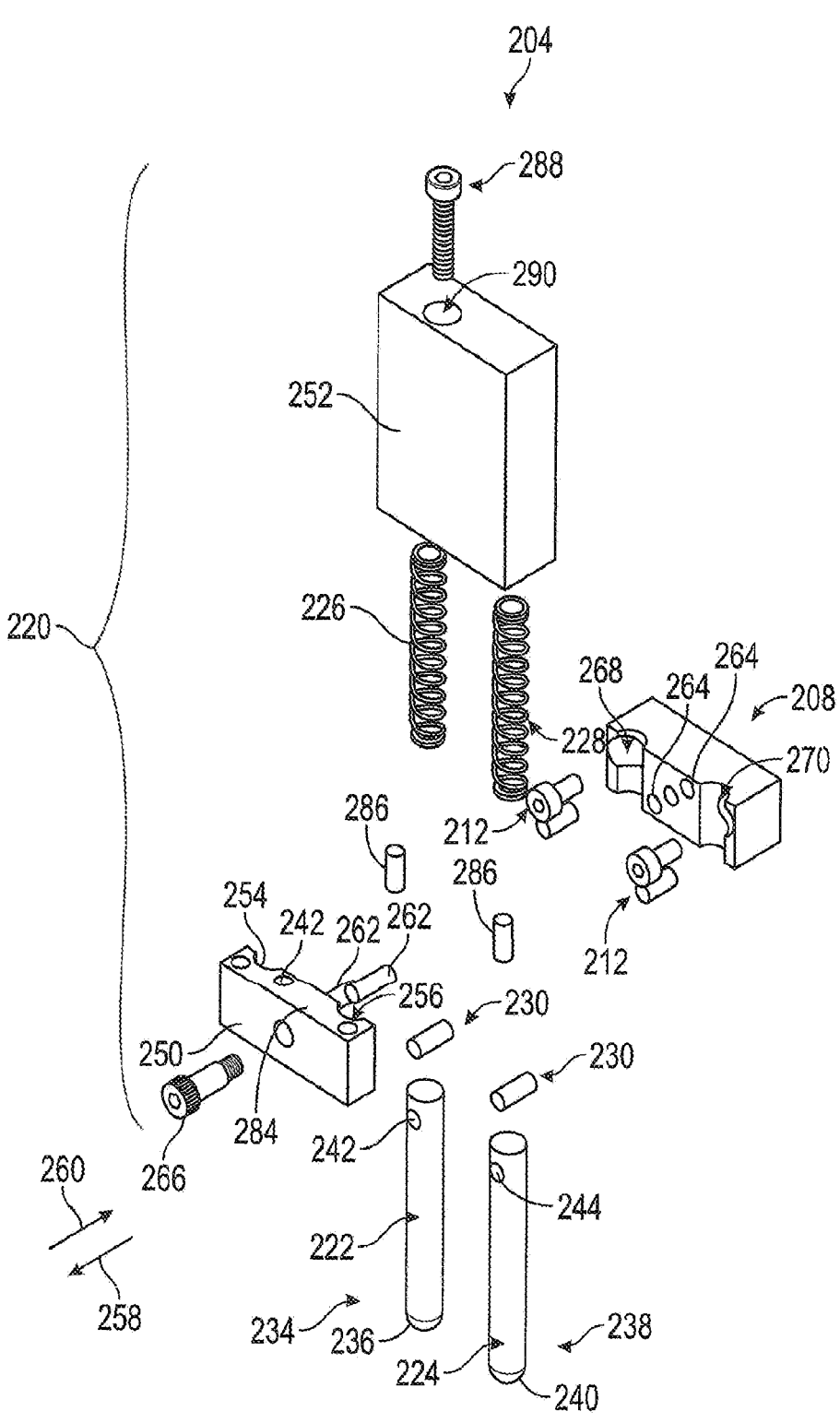
FIG. 15 is an exploded view of a base and a first support for a first movable pole portion and a second movable pole portion of the exemplary magnetic coupling device of FIG. 10.
Figure 16:
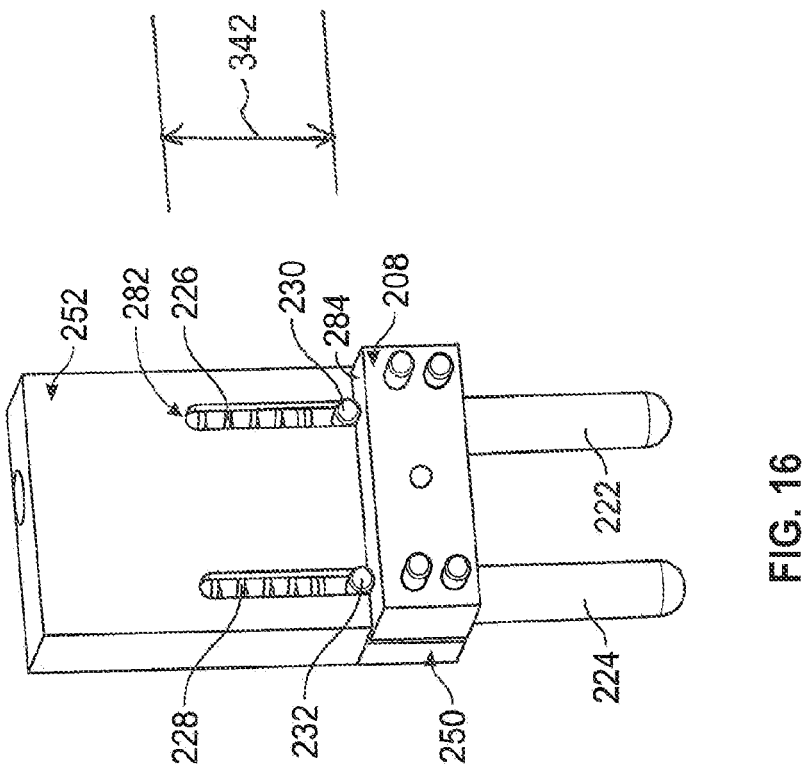
FIG. 16 is an assembled view of the base, the first support, and the first movable pole portion and a second movable pole portion of FIG. 15 of the exemplary magnetic coupling device of FIG. 10 removed from the housing of the exemplary magnetic coupling device of FIG. 10.

Referring to FIG. 15, an exploded view of north pole portion 204 and base 208 is shown. Base 208 is coupled to housing 202 with two fasteners 212 which are received in apertures of base 208 and threaded into threaded apertures of housing 202.

North pole portion 204 includes a support 220; a first pole portion 222 (the first pole portion of south pole portion 206 is noted in the drawings as first pole portion 223); a second pole portion 224 (the second pole portion of south pole portion 206 is noted in the drawings as second pole portion 225); a first biaser, illustratively a first spring 226; a second biaser, illustratively a second spring 228; a first limiter 230, and a second limiter 232. First pole portion 222 includes a workpiece interface 234 having a workpiece engagement surface 236. Second pole portion 224 includes a workpiece interface 238 having a workpiece engagement surface 240. First pole portion 222 further includes an aperture 242 which receives first limiter 230 and second pole portion 224 further includes an aperture 244 which receives second limiter 232. Exemplary limiters are dowel pins.

Support 220 includes a lock portion 250 and a housing 252. Lock portion 250 includes a first channel portion 254 and a second channel portion 256. Lock portion 250 is coupled to base 208, but is movable relative to base 208 in direction 258 and direction 260. Two dowel pins 262 are received in openings 264 in base 208 and in similar openings (not shown) in lock portion 250. The dowel pins are made of ferromagnetic material to attract lock portion 250 towards base 208 or base 210 (see FIG. 12) for south pole portion 206. A shoulder bolt 266 couples lock portion 250 to base 208 and permits the movement of lock portion 250 relative to base 208 in direction 258 and direction 260. Base 208 also includes a first channel portion 268 and a second channel portion 270. When lock portion 250 is coupled to base 208, first channel portion 254 of lock portion 250 and first channel portion 268 of base 208 cooperate to define a channel for first pole portion 222 and second channel portion 256 of lock portion 250 and second channel portion 270 of base 208 cooperate to define a channel for second pole portion 224.

Figure 15A:
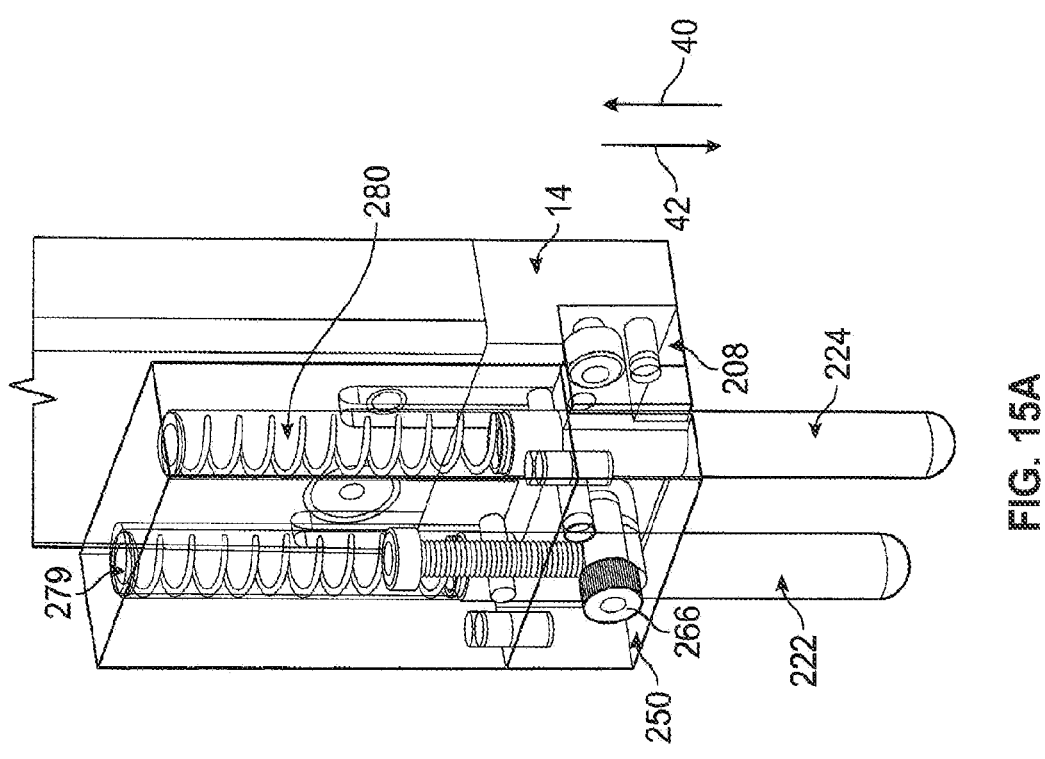
FIG. 15A is an assembled view of the base, the first support, and the first movable pole portion and a second movable pole portion of FIG. 15 of the exemplary magnetic coupling device of FIG. 10.

Housing 252 of support 220 is coupled to lock portion 250 and moves with lock portion 250 in direction 258 and direction 260 relative to base 208. Housing 252 includes a first recess 279 (see FIG. 15A) which receives first pole portion 222, first limiter 230, and first spring 226 and a second recess 280 (see FIG. 15A) which receives second pole portion 224, second limiter 232, and second spring 228. As shown in FIG. 15A, second pole portion 224 is able to translate within second recess 280 in direction 40 and direction 42. First limiter 230 limits travel in direction 42 when first limiter 230 contacts stop surface 282 in second recess 280 and limits travel in direction 40 when first limiter 230 contacts a stop surface 284 (see FIGS. 15 and 16) which corresponds to a top of lock portion 250. Housing 252 is coupled to lock portion 250 through a pair of dowel pins 286 and a fastener 288 which is received in opening 290 and threaded into threaded opening 292 of lock portion 250.

Figure 17:
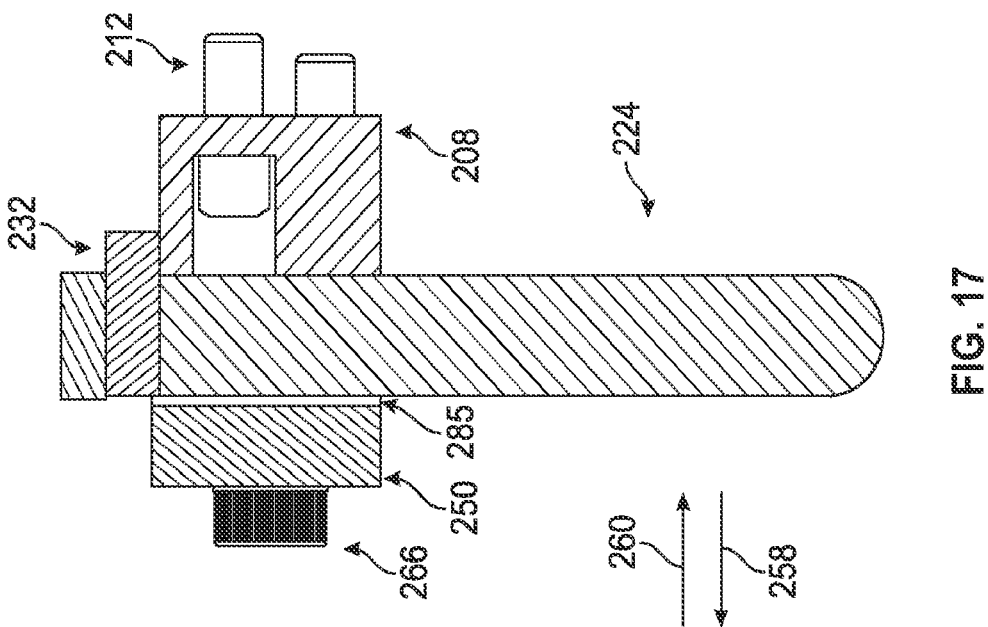
FIG. 17 is a side partial sectional view of the base, movable pole portion, and lock portion of the first support of the exemplary magnetic coupling device of FIG. 10 through a center of the first pole portion of FIG. 15 with the switchable magnetic flux source in an OFF state and the first pole portion being capable of moving relative to a lower surface of a housing of the exemplary magnetic coupling device in a first direction.

Referring to FIG. 17, when switchable magnetic flux source 16 is in an OFF state, lock portion 250 of north pole portion 204 is able to move in direction 258 and lock portion 250 of south pole portion 206 is able to move in direction 260, respectively. This provides a gap 285 (see FIG. 17) or at minimum a loose hold on the respective first pole portion 222 and second pole portion 224 of north pole portion 204 and first pole portion 223 and second pole portion 225 of south pole portion 206 to permit each of first pole portion 222, first pole portion 223, second pole portion 224, and second pole portion 225 to move in direction 40 and direction 42 independently of each other and relative to a lower surface 203 of housing 202.

Figure 18:
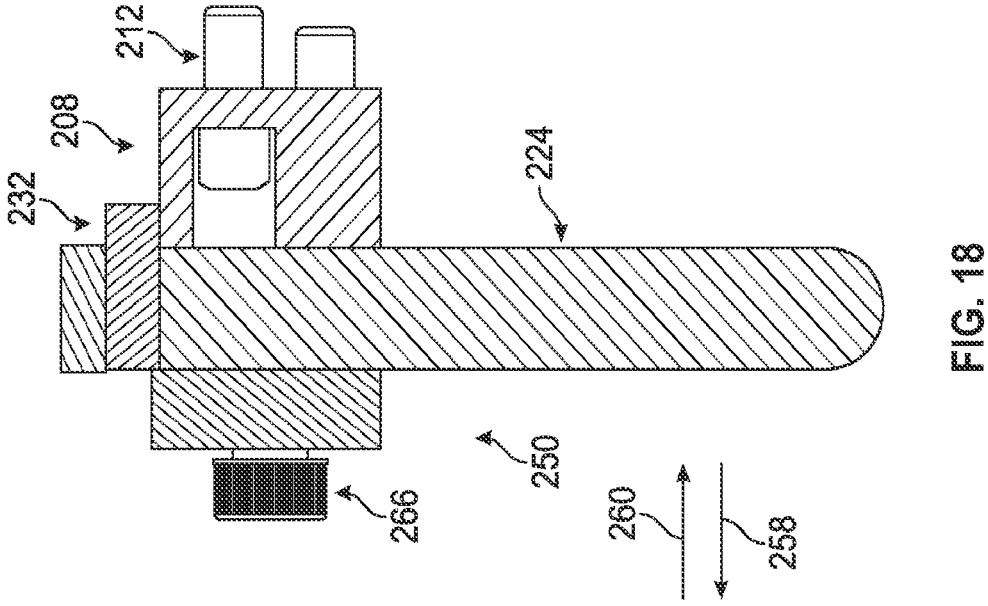
FIG. 18 is a side partial sectional view of the base, movable pole portion, and lock portion of the first support of the exemplary magnetic coupling device of FIG. 10 through a center of the first pole portion of FIG. 15 with the switchable magnetic flux source in an ON state and the first pole portion being incapable of moving relative to a lower surface of a housing of the exemplary magnetic coupling device in the first direction due to a movement of a lock portion in a second direction.

Referring to FIG. 18, when switchable magnetic flux source 16 is in an ON state, lock portion 250 of north pole portion 204 is moved in direction 260 towards base 208 due to lock portion 250 and base 208 being made of a ferromagnetic material and lock portion 250 being magnetically attracted to switchable magnetic flux source 16. This movement in direction 260 causes lock portion 250 to clamp first pole portion 222 and second pole portion 224 in place (between base 208 and lock portion 250) and prevent, or at least resist, further movement in either of direction 40 and direction 42. Similarly, lock portion 250 of south pole portion 206 is moved in direction 258 towards base 210 due to lock portion 250 and base 210 being made of a ferromagnetic material and lock portion 250 being magnetically attracted to switchable magnetic flux source 16. This movement in direction 258 causes lock portion 250 to clamp first pole portion 223 and second pole portion 225 in place (between base 210 and lock portion 250) and prevent, or at least resist, further movement in either of direction 40 and direction 42. This clamping holds each of first pole portion 222, first pole portion 223, second pole portion 224, and second pole portion 225 relative to lower surface 203 of housing 202. In embodiments, magnetic coupling device 10 includes additional or alternative systems which hold the positions of first pole portion 222, first pole portion 223, second pole portion 224, and second pole portion 225. For example, mechanical actuators or fasteners may be included that hold the respective lock portion 250 relative to base 208 and base 210 to clamp first pole portion 222, first pole portion 223, second pole portion 224, and second pole portion 225 in place. An advantage, among others, of including mechanical actuators is that switchable magnetic flux source 16 may be switched to the OFF state and the positions of first pole portion 222, first pole portion 223, second pole portion 224, and second pole portion 225 are maintained. This allows first pole portion 222, first pole portion 223, second pole portion 224, and second pole portion 225 to remain in a repeatable position for the next one of ferromagnetic workpiece 12 in a stack (see FIGS. 19-21) to be quickly contacted and transported.

Figure 19:
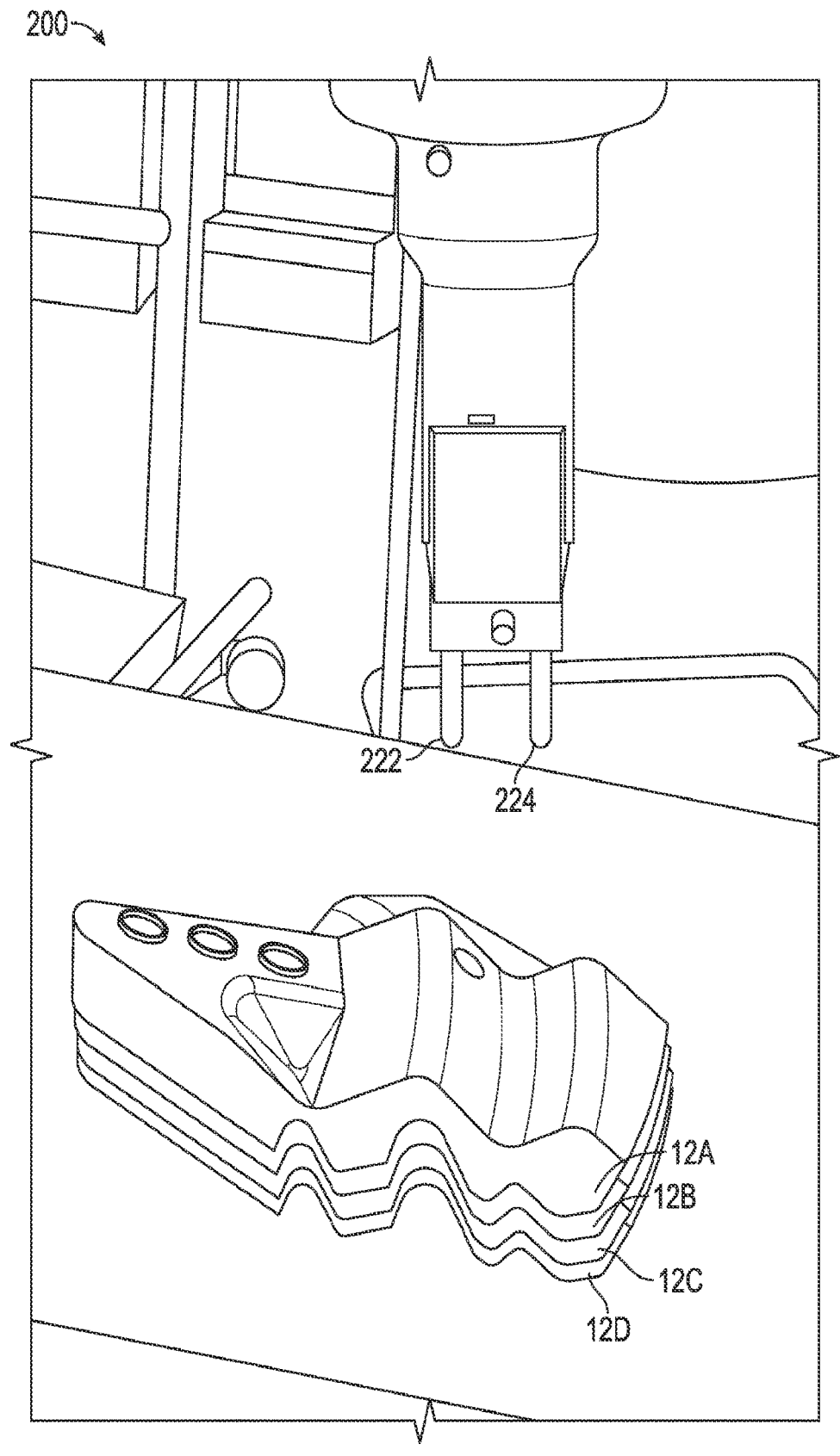
FIG. 19 illustrates the exemplary robot of FIG. 9 with the exemplary magnetic coupling device of FIG. 10 coupled to an end of the arm thereof and positioned relative to a first stack of ferromagnetic parts, the switchable magnetic flux source of the exemplary magnetic coupling device being in an OFF state.
Figure 20:
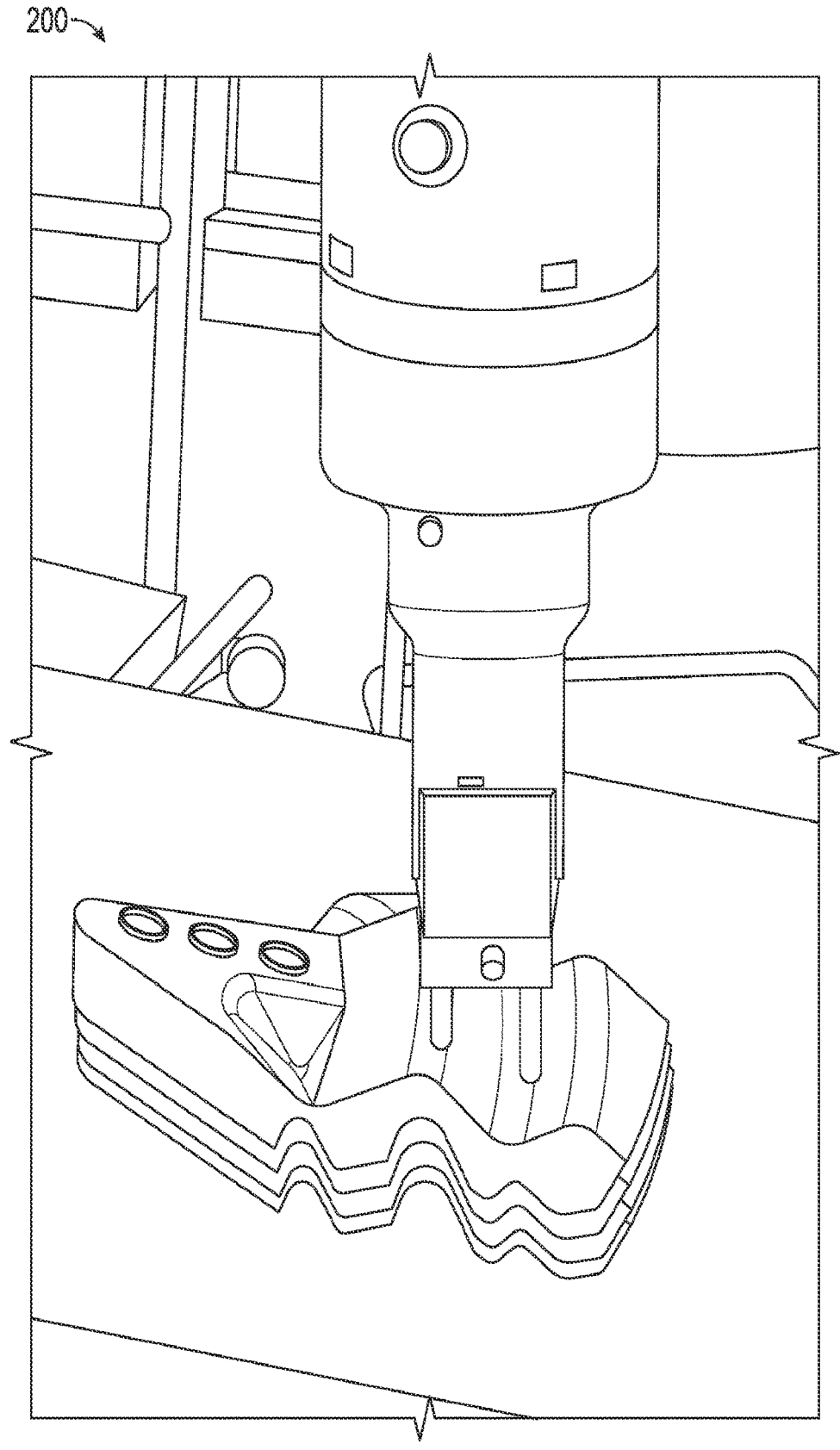
FIG. 20 illustrates the robot and magnetic coupling device of FIG. 19 contacting a first ferromagnetic part of the first stack of ferromagnetic parts, the switchable magnetic flux source of the magnetic coupling device being in an OFF state and at least a portion of the plurality of pole portions are retracted relative to the housing of the magnetic coupling device.
Figure 21:
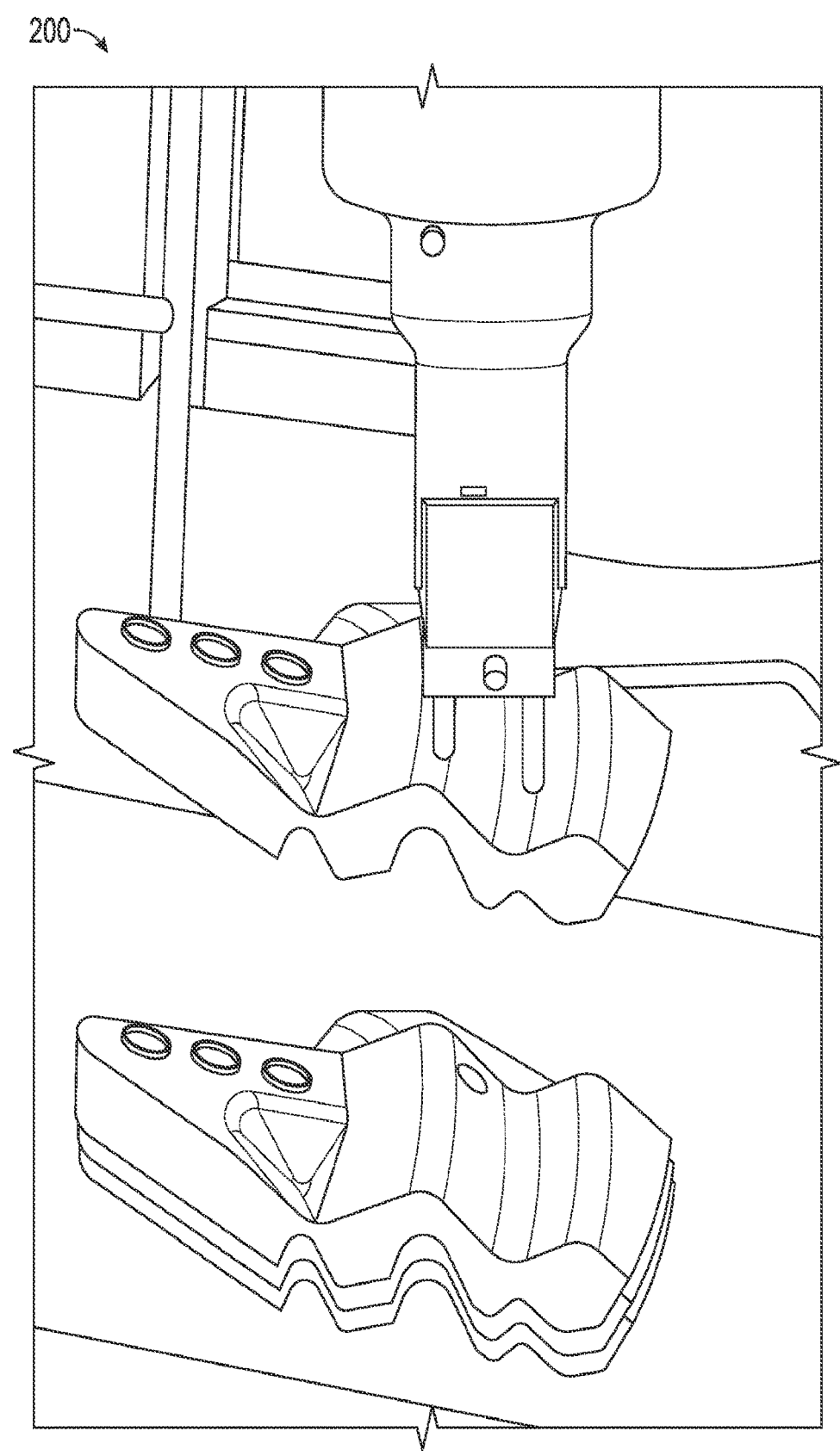
FIG. 21 illustrates robot and magnetic coupling device of FIG. 20 with the switchable magnetic flux source of the magnetic coupling device being in an ON state and the first ferromagnetic part being lifted relative to the remaining first stack of ferromagnetic parts.
Figure 22:
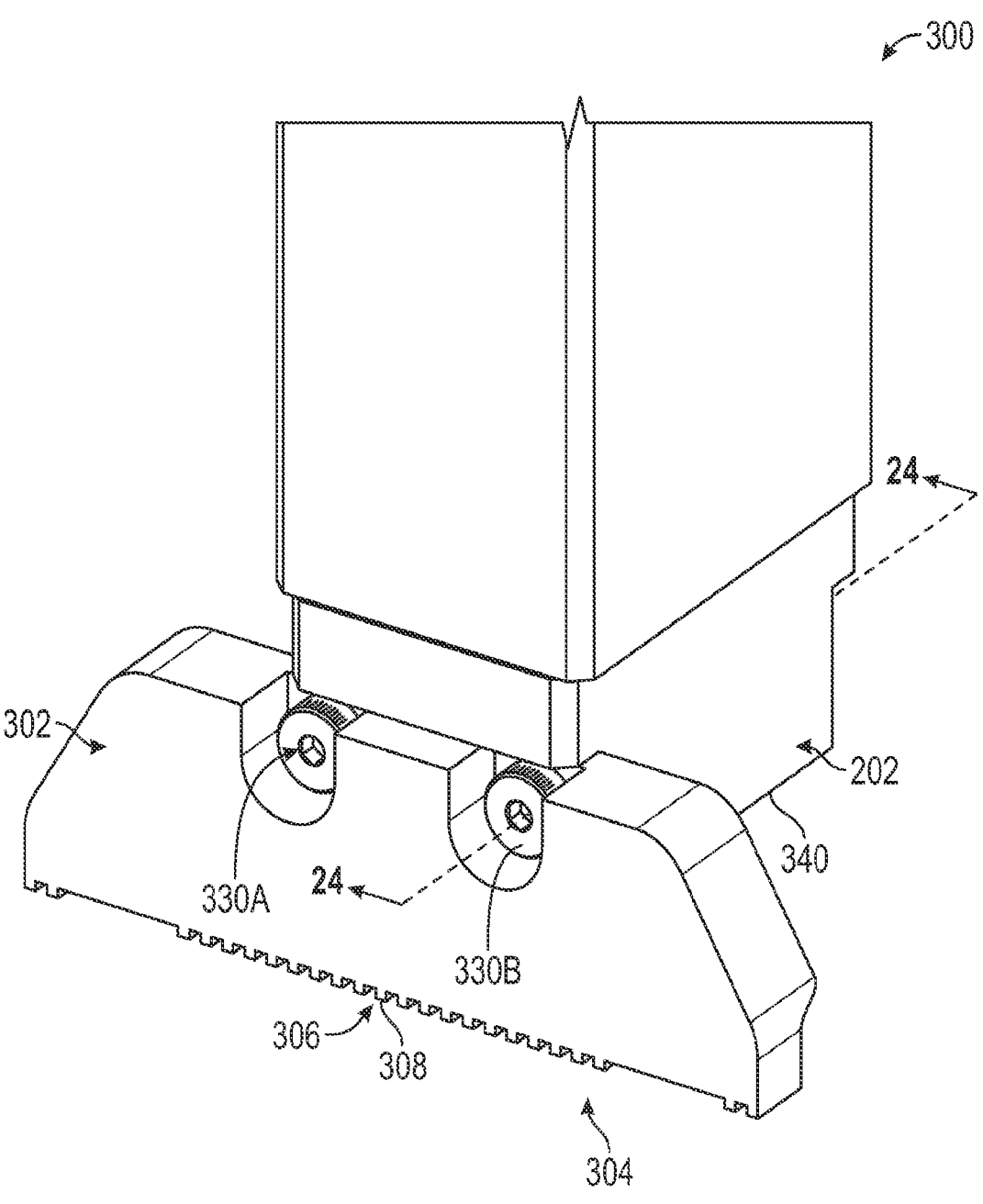
FIG. 22 illustrates a partial side perspective view of another exemplary magnetic coupling device.
Figure 23:
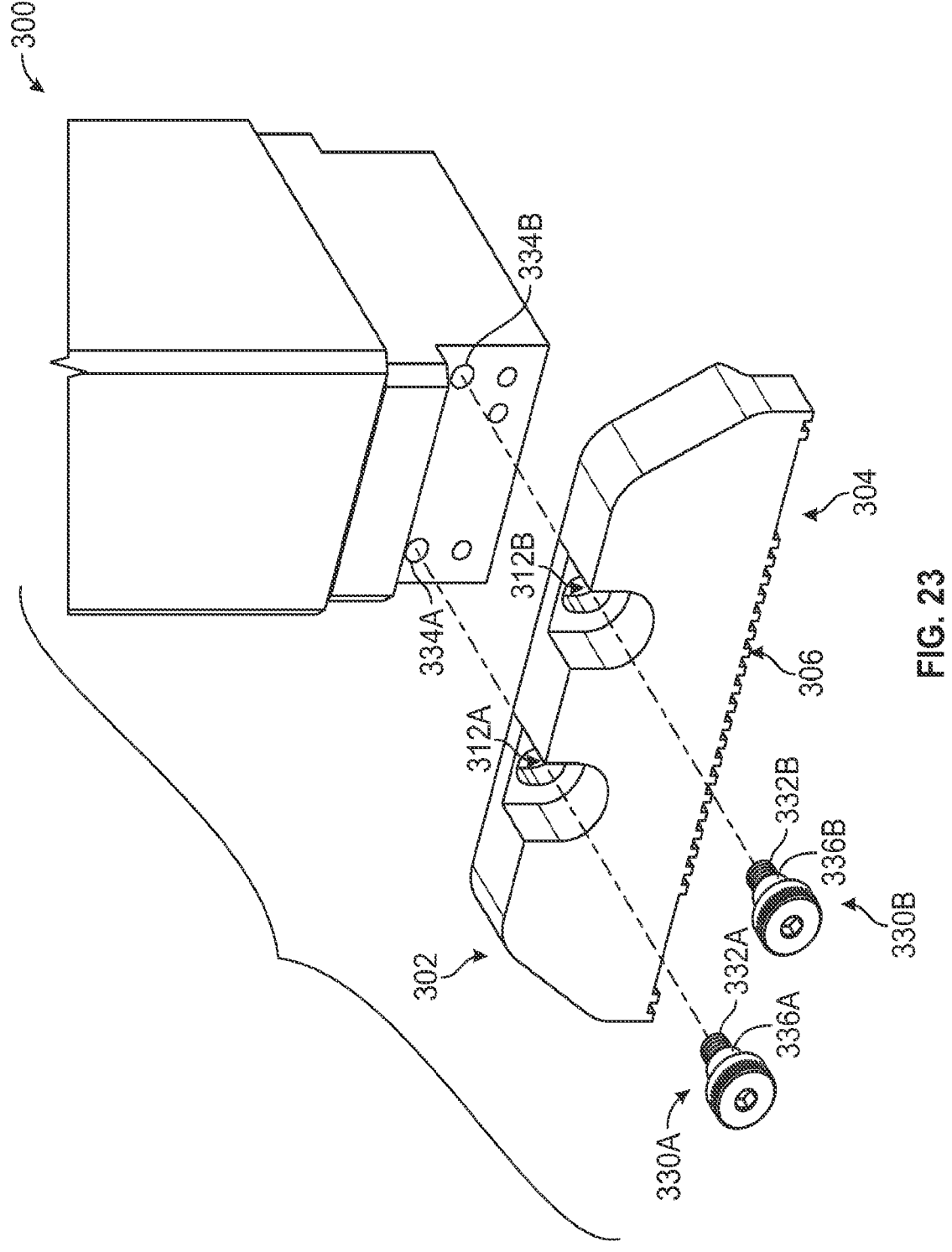
FIG. 23 illustrates an exploded view of the magnetic coupling device of FIG. 22.

Referring to FIGS. 19-21, magnetic coupling device 200 is coupled to robotic arm 704 of exemplary robotic system 700 and an operation of magnetic coupling device 200 is shown. Referring to FIG. 19, magnetic coupling device 200 is positioned above a stack of ferromagnetic workpiece 12, illustratively ferromagnetic workpiece 12A, ferromagnetic workpiece 12B, ferromagnetic workpiece 12C, and ferromagnetic workpiece 12D. The switchable magnetic flux source 16 of magnetic coupling device 200 is in an OFF state and as such each of first pole portion 222, first pole portion 223, second pole portion 224, and second pole portion 225 are fully extended relative to lower surface 203 of housing 202 and are capable of moving in direction 42 in the presence of an external force (pushing on ferromagnetic workpiece 12A for example). Referring to FIG. 20, magnetic coupling device 200 is brought into contact with ferromagnetic workpiece 12A and each of first pole portion 222 and second pole portion 224 is illustrated retracted within support 220 respective amounts (first pole portion 223 and second pole portion 225 are also retracted respective amounts). As illustrated first pole portion 222 is positioned on a higher point of ferromagnetic workpiece 12A and thus is retracted more than second pole portion 224. At this point, switchable magnetic flux source 16 is switched to an ON state and the respective lock portion 250 clamp first pole portion 222, first pole portion 223, second pole portion 224, and second pole portion 225 in place and a magnetic circuit is formed between magnetic coupling device 200 and ferromagnetic workpiece 12A through first pole portion 222, first pole portion 223, second pole portion 224, and second pole portion 225. Referring to FIG. 21, ferromagnetic workpiece 12A may now be destacked from the remainder of workpieces (ferromagnetic workpiece 12B, ferromagnetic workpiece 12C, and ferromagnetic workpiece 12D). Robotic system 700 next moves ferromagnetic workpiece 12A to a desired location and returns to pickup of 12B.

In embodiments, one of magnetic coupling device 10 and robotic system 700 determines a position of each of first pole portion 222, first pole portion 223, second pole portion 224, and second pole portion 225 relative to housing 14 or relative to each other. This may be accomplished by sensors which measure the compression of the respective springs, sensors which monitor a separation of a top of the respective first pole portion 222, first pole portion 223, second pole portion 224, and second pole portion 225 from a top of the second recess 280 in housing 252, optical sensors which monitor markings on the exterior of the respective first pole portion 222, first pole portion 223, second pole portion 224, and second pole portion 225, and other suitable sensor systems. By knowing the position of the engagement surface of each of first pole portion 222, first pole portion 223, second pole portion 224, and second pole portion 225 and knowing a shape of the part 12 being coupled, one of magnetic coupling device 10 and robotic system 700 may determine a location of magnetic coupling device 10 on part 12. With this knowledge, the positioning of part 12, such as an orientation of part 12, by robotic system 700 may be determined and robotic arm 704 may be actuated to position part 12 in a desired position. Further, the use of sensors associated with one or more of the movable pole portions 222, 223, 224, and/or 225 will assist in providing consistent force on part 12 or repeatable pick or positioning of part 12 and gripping force of the magnetic circuit from part 12 to part 12.

Referring to FIGS. 22-26, another exemplary magnetic coupling device 300 is shown. Magnetic coupling device 300 includes housing 202 and any one of the exemplary switchable magnetic flux sources disclosed herein.

Magnetic coupling device 300 includes a pair of pole shoes, one pole shoe 302 shown in FIGS. 22-26. Pole shoe 302 functions as a north pole shoe for magnetic coupling device 300 while a second pole shoe (not shown), identical to pole shoe 302, is mounted on an opposite side of housing 202 and hence an opposite side of the switchable magnetic flux source 16 positioned within housing 202. The second pole shoe functions as a south pole for magnetic coupling device 300. The second pole shoe is mounted to housing 202 in the same manner as pole shoe 302.

Figure 26:
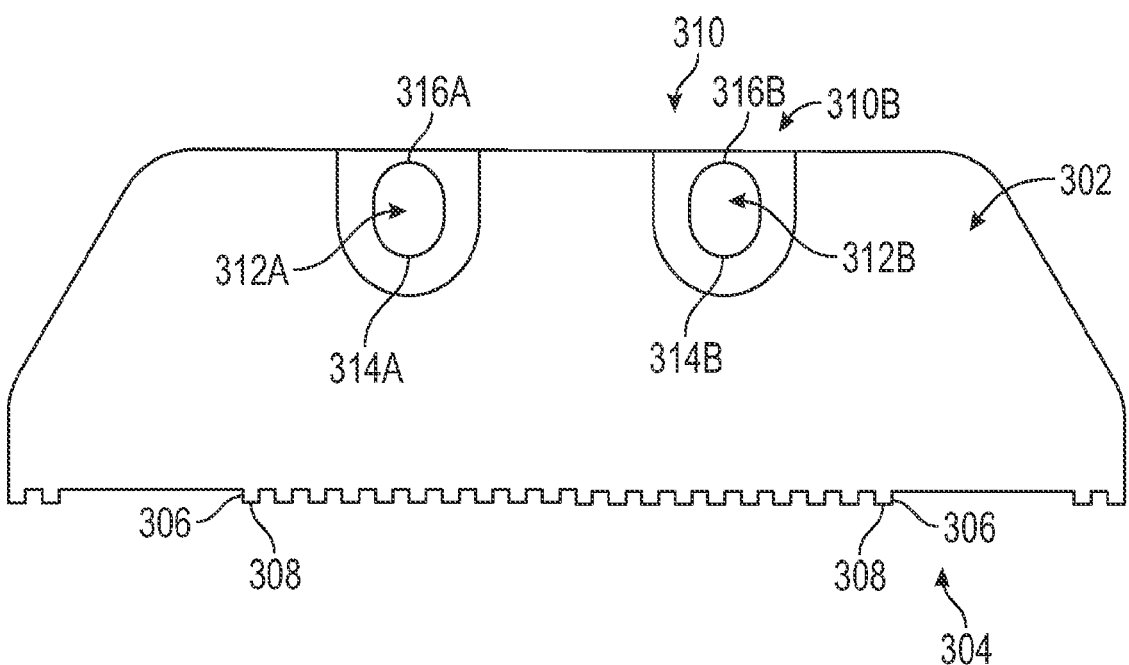
FIG. 26 illustrates a side view of the movable pole shoe of the magnetic coupling device.

Referring to FIG. 26, pole shoe 302 includes a lower portion 304 with a plurality of projections 306 (two marked with reference numbers) each having a workpiece engagement surface 308 which interacts with ferromagnetic workpiece 12. As shown in FIG. 26, a width of each of projections 306 may be uniform across lower portion 304 while a spacing may be variable. In embodiments, the width of each of projections 306 may be variable while the spacing between projections 306 is one of uniform or variable. In embodiments, the width of each of projections 306 may be uniform while the spacing between projections 306 is one of uniform or variable. Additional details regarding exemplary projections and spacing for pole shoe 302 are provided in U.S. patent application Ser. No. 16/964,005, published as US Published Patent Application No. US20210031317A1, titled MAGNETIC LIFTING DEVICE HAVING POLE SHOES WITH SPACED APART PROJECTIONS, the entire disclosure of which is expressly incorporated by reference herein. Further, as disclosed in U.S. patent application Ser. No. 16/964,005, and incorporated by reference herein, an elastic material may be placed in the openings between projections 306 and/or covering workpiece engagement surface 308 to reduce potential scratching of ferromagnetic workpiece 12 when contacted by magnetic coupling device 300.

Further, as illustrated in FIG. 26, each of the projections 306 has a common length. In embodiments, one or more of the projections 306 is longer relative to another one of the projections 306 such that the workpiece engagement surfaces 308 are not coplanar. In embodiments, each of the projections 306 have the same length but the workpiece engagement surfaces 308 are not coplanar due to the pole shoe lower portion 304 being non-linear, such as to match a contour of an intended ferromagnetic workpiece 12. In embodiments, each of the workpiece engagement surfaces 308 of the projections 306 are not coplanar due to the pole shoe lower portion 304 being non-linear, such as to match a contour of an intended ferromagnetic workpiece 12. Exemplary shapes of the lower portion 304 of pole shoe 302 include linear, stepped, V-shaped, curved, and other suitable non-linear surfaces which may or may not contain linear segments.

Although the illustrated embodiment includes pole shoes 302 with lower portions 304 having a plurality of projections 306, in embodiments, the lower portions 304 of the respective pole shoes 302 may be solid to each form a single workpiece engagement surface 308. Exemplary shapes of the lower portion 304 of pole shoe 302 include linear, stepped, V-shaped, curved, and other suitable non-linear surfaces which may or may not contain linear segments.

Pole shoe 302 further includes a plurality of interfaces 310 through which pole shoe 302 is coupled to housing 202. In the illustrated embodiment, two interfaces 310A and 310B are shown, however additional or fewer interfaces may be provided in other embodiments. In the illustrated embodiment, the plurality of interfaces 310 generally restricts a movement of pole shoe 302 relative to housing 202 along a single linear axis 320 (see FIGS. 24 and 25). In other embodiments, the plurality of interfaces 310 restrict movement within a plane and/or provide a rotational motion of pole shoe 302 relative to housing 202. For example, if a single interface 310 is implemented, pole shoe 302 may be able to rotate relative to housing 202, and optionally move along a single linear axis, such as axis 320.

Figures 24, 25:
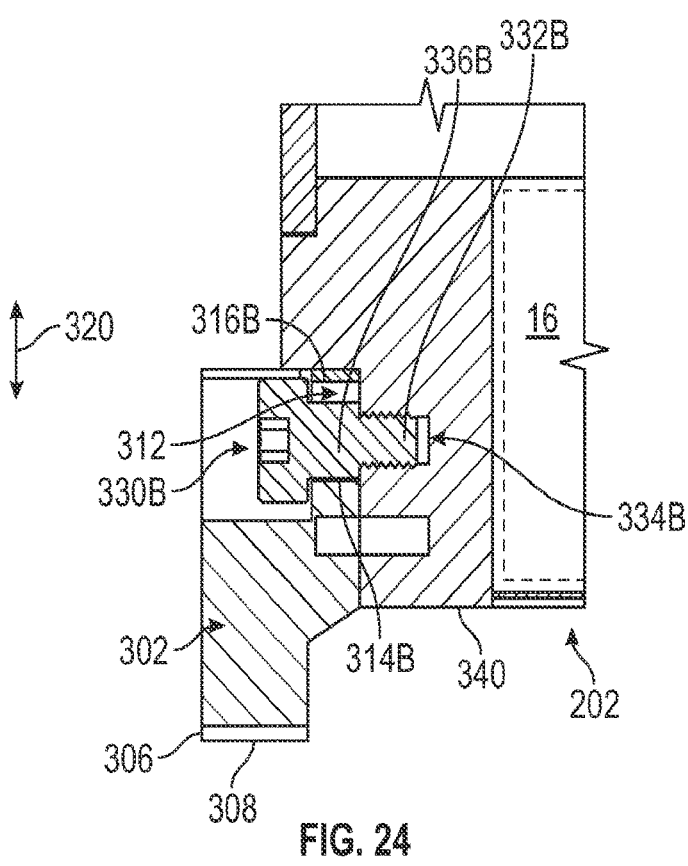
FIG. 24 is a sectional view along lines 24-24 in FIG. 22 with a movable pole shoe in a first, raised position relative to a lower surface of the housing of the magnetic coupling device.
FIG. 25 illustrates the view of FIG. 24 with the movable pole shoe in a second, lowered position relative to the lower surface of the housing of the magnetic coupling device.

The exemplary interfaces 310 shown in FIG. 26 are elongated slots 312 having lower surfaces 314 and upper surfaces 316. Pole shoe 302 is coupled to housing 202 through a pair of couplers, illustratively fasteners, shoulder bolts 330. Shoulder bolts 330 include a threaded portion 332 which is threaded into openings 334 on housing 202 and a shoulder portion 336 which is positioned within the respective elongated slot 312. As shown in FIGS. 24 and 25, elongated slot 312 is larger than a diameter of shoulder portion 336 of shoulder bolts 330 along a major axis of the elongated slot 312. This permits the movement of pole shoe 302 along single linear axis 320 between a first position shown in FIG. 24 and a second position shown in FIG. 25 along a major axis of elongated slot 312. In embodiments, a width of each of elongated slots 312 is slightly larger than the diameter of shoulder portion 336 of shoulder bolts 330 thereby restraining any movement of pole shoe 302 along housing 202 not along single linear axis 320. In embodiments, a single coupler, such as an expanding retainer, may be received in each of elongated slots 312A,B to couple pole shoe 302 to housing 202. In embodiments, one or more of the elongated slots are blind depth and receive a guide, such as a pin, which restrains the movement of pole shoe 302 relative to housing 202 and thus couples pole shoe 302 to housing 202.

In FIG. 25, pole shoe 302 is lowered relative to a lower surface 340 of housing 202. In FIG. 24, pole shoe 302 is raised relative to lower surface 340 of housing 202. In embodiments, pole shoe 302 may move between the positions shown in FIGS. 24 and 25 and positions therebetween while switchable magnetic flux source 16 is in an OFF state. Once switchable magnetic flux source 16 is in an ON state or a partial ON state having sufficient magnetic strength, pole shoe 302 is held relative to housing 202 due to the magnetic attraction and no longer moves in direction 320. In the ON state of switchable magnetic flux source 16 or a partial ON state having sufficient magnetic strength, switchable magnetic flux source 16 is magnetically coupled to ferromagnetic workpiece 12 through housing 202 and the pair of pole shoes 302 (one shown) such that magnetic coupling device 300 can lift and move ferromagnetic workpiece 12 or hold ferromagnetic workpiece 12 in place relative to other objects.

Although not illustrated, in embodiments, magnetic coupling device 300 includes a biaser to bias pole shoe 302 to the position of FIG. 25. Exemplary biasers include springs.

Figure 27:
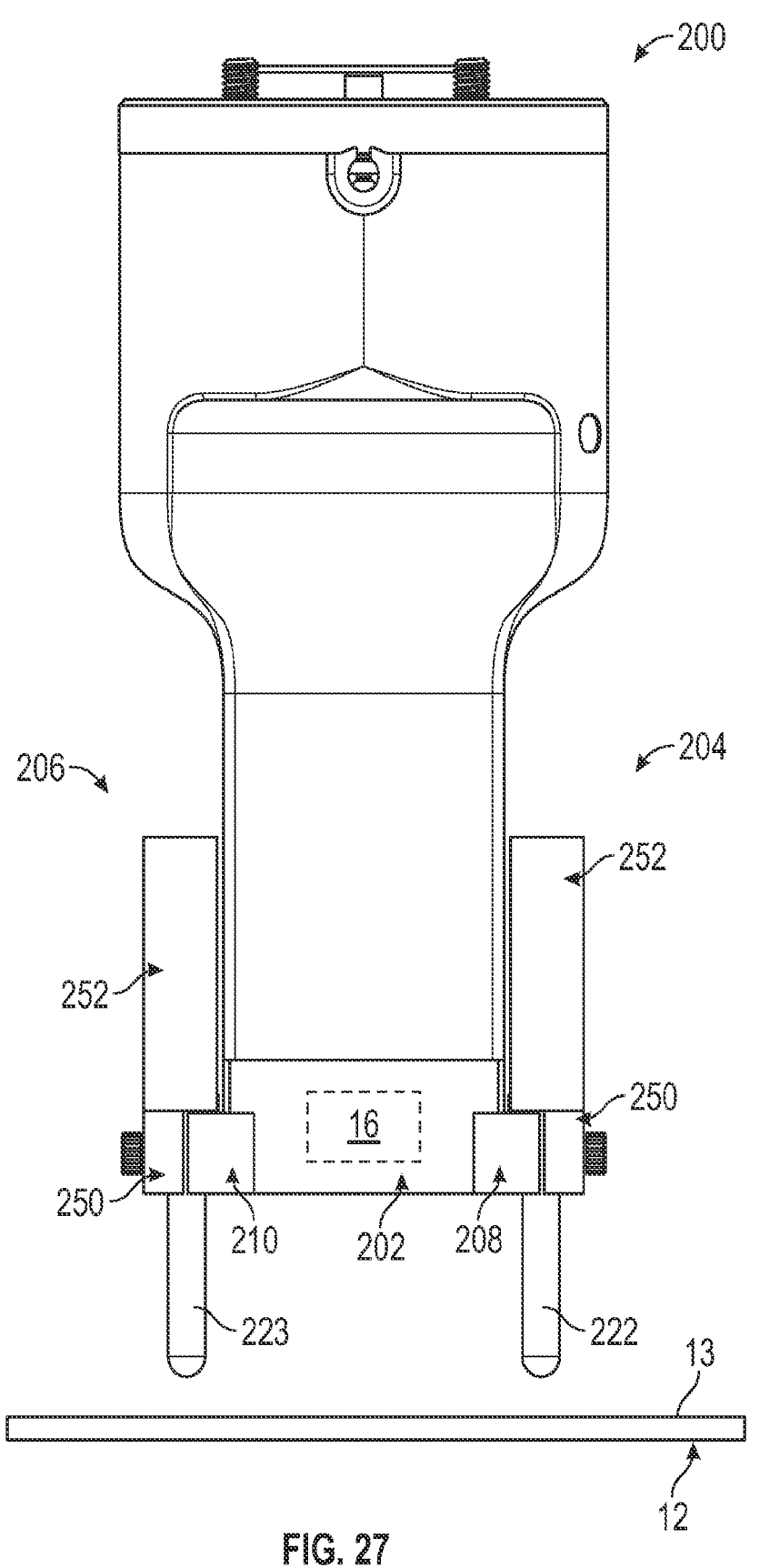
FIG. 27 illustrates a side view of the magnetic coupling device spaced apart from a workpiece.

In embodiments, a magnetic coupling tool 200 is positioned adjacent a ferromagnetic workpiece 12 and each of first pole portion 222, first pole portion 223, second pole portion 224, and second pole portion 225 are extended downwardly at a fully extended position and switchable magnetic flux source 16 is in a partial ON state (FIG. 27). When in a partial ON state, a magnetic circuit may be formed between ferromagnetic workpiece 12 and switchable magnetic flux source 16 through housing 202, base 208, first pole portion 222, second pole portion 224, base 210, first pole portion 223, and second pole portion 225. Further, depending on the magnetic strength of the partial ON state lock portion 250 do not clamp down on first pole portion 222, first pole portion 223, second pole portion 224, and second pole portion 225 thereby allowing first pole portion 222, first pole portion 223, second pole portion 224, and second pole portion 225 to continue to move in direction 40, 42 relative to base 208 and base 210. In embodiments, the partial ON is up to 50% power of the ON state. In embodiments, the partial ON is up to 40% power of the ON state. In embodiments, the partial ON is up to 30% power of the ON state.

At a first time, when pole portions 222, 223, 224, 225 are in a fully extended position and switchable magnetic flux source 16 has a partial ON state and each of first pole portion 222, first pole portion 223, second pole portion 224, and second pole portion 225 are spaced apart from ferromagnetic workpiece 12, electronic controller 170 may receive a first magnetic flux value from at least one of sensors 100, 102. In embodiments wherein electronic controller 170 monitors one of first sensor 100 and second sensor 102, electronic controller 170 may sense a change in the magnetic flux value as an indication that a pole portion has contacted ferromagnetic workpiece 12. In embodiments wherein electronic controller 170 monitors both of first sensor 100 and second sensor 102, electronic controller 170 may sense a change in the magnetic flux value of each of first sensor 100 and second sensor 102 as an indication that one of the north pole portions and one of the south pole portions has contacted ferromagnetic workpiece 12. In embodiments, a sensor, such as a magnetic flux sensor is associated with each of first pole portion 222, first pole portion 223, second pole portion 224, and second pole portion 225, electronic controller 170 may monitor each sensor for a change in the magnetic flux value as an indication that each one of first pole portion 222, first pole portion 223, second pole portion 224, and second pole portion 225 has contacted ferromagnetic workpiece 12. Electronic controller 170 may determine that the monitored sensor value or values indicate contact with ferromagnetic workpiece 12 once a change in the sensor value exceeds a threshold amount. In alternative embodiments, other types of sensors may be used to determine when each of first pole portion 222, first pole portion 223, second pole portion 224, and second pole portion 225 contacts ferromagnetic workpiece 12. Exemplary sensors include strain sensors on the respective biasers, illustratively springs, biasing first pole portion 222, first pole portion 223, second pole portion 224, and second pole portion 225 in direction 42.

Figure 28:
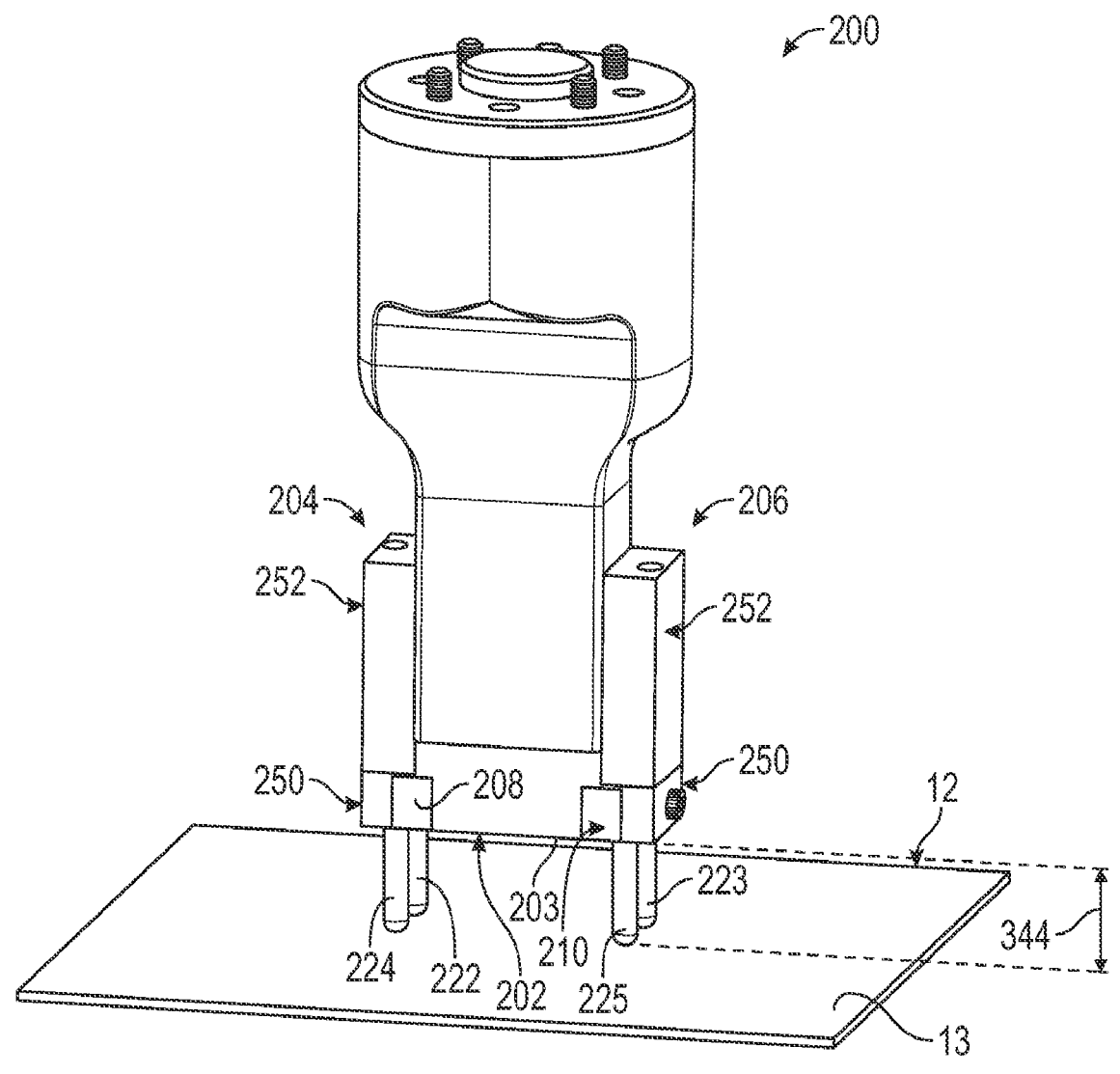
FIG. 28 illustrates a perspective view of the magnetic coupling device engaging a workpiece with the pole portions fully extended.
Figure 29:
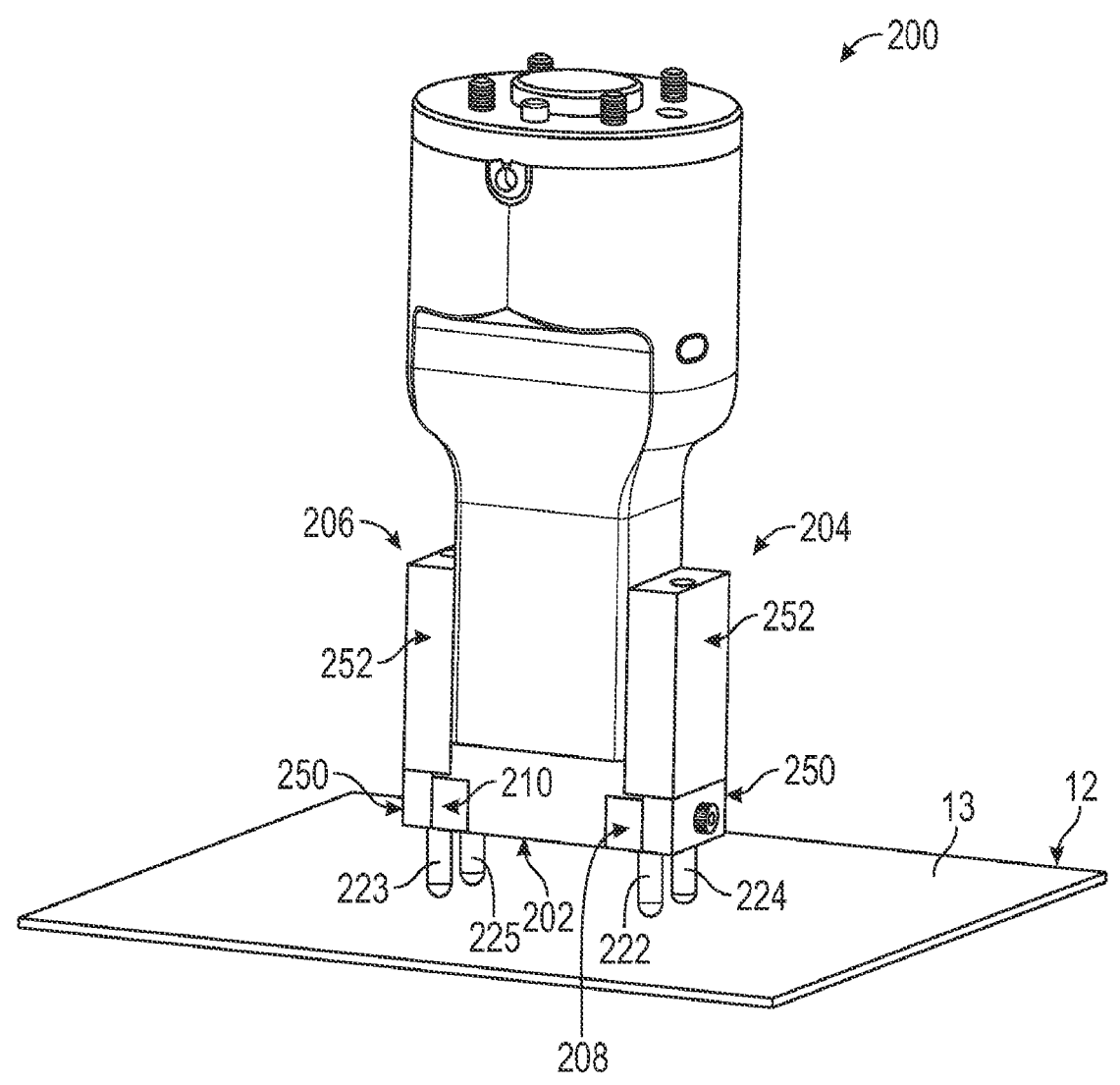
FIG. 29 illustrates a perspective view of the magnetic coupling device engaging a workpiece with the pole portions partially compressed.

As shown in FIG. 28, at a second time subsequent to the first time, magnetic coupling tool 200 is repositioned (i.e., by robotic system 700) so that at least one of first pole portion 222, first pole portion 223, second pole portion 224, and second pole portion 225 come into contact with the contact side 13 of workpiece 12. At the second time, when magnetic coupling device 200 contacts ferromagnetic workpiece 12, the magnetic flux field changes and electronic controller 170 receives a second magnetic flux value from at least one of sensors 100, 102 that is different than the first magnetic flux value.

Once electronic controller 170 detects contact with contact side 13 of ferromagnetic workpiece 12, electronic controller 170 determines a further distance magnetic coupling device 200 may be advanced towards ferromagnetic workpiece 12 before the one or more of first pole portion 222, first pole portion 223, second pole portion 224, and second pole portion 225 are fully retracted. In embodiments, this further distance is determined based on a stored value for each of first pole portion 222, first pole portion 223, second pole portion 224, and second pole portion 225. Thus, robotic system 700 may communicate to electronic controller 770 the further distance magnetic coupling device 200 may be advanced towards ferromagnetic workpiece 12. In examples, the further distance is 20 millimeters. Further, sensors 100, 102 continue to monitor the magnetic flux as the respective first pole portion 222, first pole portion 223, second pole portion 224, and second pole portion 225 continue to retract into housing 252. As the respective first pole portion 222, first pole portion 223, second pole portion 224, and second pole portion 225 retract the length of the respective first pole portion 222, first pole portion 223, second pole portion 224, and second pole portion 225 to ferromagnetic workpiece 12 is shortened and the magnetic circuit with ferromagnetic workpiece 12 is increased. Sensors 100, 102 can detect this change in the magnetic flux which is a decrease in magnetic flux for the placement of sensors 100, 102 in FIG. 3 as more of the magnetic flux is directed through ferromagnetic workpiece 12. In embodiments, electronic controller 170 records the magnetic flux values of the sensor 100, 102 associated with the respective first pole portion 222, first pole portion 223, second pole portion 224, and second pole portion 225 at full extension (contacting ferromagnetic workpiece 12), full retraction (contacting ferromagnetic workpiece 12), and optionally at positions therebetween (contacting ferromagnetic workpiece 12). Based on these stored values and the measured values, electronic controller 170 may determine the retraction of the respective first pole portion 222, first pole portion 223, second pole portion 224, and second pole portion 225. Further, for ferromagnetic workpiece 12 having irregular shapes, such as shown in FIG. 19, electronic controller 170 records a first set of values for sensors 100, 102 when each of first pole portion 222, first pole portion 223, second pole portion 224, and second pole portion 225 are contacting ferromagnetic workpiece 12 (due to the shape of ferromagnetic workpiece 12 these values will be for one or more of first pole portion 222, first pole portion 223, second pole portion 224, and second pole portion 225 being as least partially retracted) and a second set of values for sensors 100, 102 when each of first pole portion 222, first pole portion 223, second pole portion 224, and second pole portion 225 is at the appropriate retraction depth. In examples, the appropriate retraction depth may be when a first one of first pole portion 222, first pole portion 223, second pole portion 224, and second pole portion 225 is fully retracted. By having stored the first set of values and the second set of values, electronic controller 170 may determine with each of first pole portion 222, first pole portion 223, second pole portion 224, and second pole portion 225 has contacted ferromagnetic workpiece 12 and when each of first pole portion 222, first pole portion 223, second pole portion 224, and second pole portion 225 are positioned to lift ferromagnetic workpiece 12. In embodiments, electronic controller 170 has stored values for different thicknesses of ferromagnetic workpiece 12 and an expected thickness of ferromagnetic workpiece 12 is provided to electronic controller 170 through input devices 180.

At a third time, subsequent to the second time at which electronic controller 170 determines the respective first pole portion 222, first pole portion 223, second pole portion 224, and second pole portion 225 have compressed a pre-determined amount based on the stored values, further advancement of magnetic coupling device 200 is stopped and switchable magnetic flux source 16 is configured to increase the magnetic circuit by configuring switchable magnetic flux source 16 into a higher partial ON state or an ON state. This higher partial ON state or ON state causes housing 252 to clamp onto and hold the respective first pole portion 222, first pole portion 223, second pole portion 224, and second pole portion 225. In embodiments, electronic controller 170 first configures switchable magnetic flux source 16 into a first higher partial ON state sufficient to destack ferromagnetic workpiece 12 from a stack of workpieces 12 and once separated electronic controller 170 configures switchable magnetic flux source 16 to a second higher partial ON state, higher than the first partial ON state, or the ON state.

In embodiments, electronic controller 170 may further be able to determine a proximity of the workpiece engagement surfaces of first pole portion 222, first pole portion 223, second pole portion 224, and second pole portion 225 relative to ferromagnetic workpiece 12 by monitoring sensors 100, 102. The magnetic flux detected by sensors 100, 102 for a given partial ON state or ON state of switchable magnetic flux source 16 changes as the workpiece engagement surfaces of first pole portion 222, first pole portion 223, second pole portion 224, and second pole portion 225 approach ferromagnetic workpiece 12. Thus, electronic controller 170 may have stored magnetic flux values for when one or more of first pole portion 222, first pole portion 223, second pole portion 224, and second pole portion 225 contact ferromagnetic workpiece 12 and for when each of first pole portion 222, first pole portion 223, second pole portion 224, and second pole portion 225 are spaced apart from ferromagnetic workpiece 12 with the closest one of first pole portion 222, first pole portion 223, second pole portion 224, and second pole portion 225 being spaced apart by a first distance. When electronic controller 170 determines that the closest one of first pole portion 222, first pole portion 223, second pole portion 224, and second pole portion 225 is separated from ferromagnetic workpiece 12 by a first distance magnetic coupling device 200 may alter a configuration of switchable magnetic flux source 16 or alert electronic controller 770 to alter a speed of travel of magnetic coupling device 200 towards ferromagnetic workpiece 12. In embodiments, electronic controller 770 may control the speed of magnetic coupling device 200 towards ferromagnetic workpiece 12 to be above a first speed when spaced apart from ferromagnetic workpiece 12 by greater than the first distance and to be at the first speed or less when the closest one of first pole portion 222, first pole portion 223, second pole portion 224, and second pole portion 225 is at a first distance from ferromagnetic workpiece 12.

EXAMPLES

Example 1: In an exemplary embodiment of the present disclosure magnetic coupling device for magnetically coupling to a ferromagnetic workpiece is provided. The magnetic coupling device may comprise: a housing; a switchable magnetic flux source supported by the housing; and a plurality of pole portions. The switchable magnetic flux source may be switchable between at least an OFF state and at least one of a partial ON state and an ON state. Each of the plurality of pole portions may include at least one workpiece interface having a workpiece engagement surface. The plurality of pole portions may include a first pole portion including a first workpiece interface having a first workpiece engagement surface and a second pole portion including a second workpiece interface having a second workpiece engagement surface. Each of the first pole portion and the second pole portion may be moveable relative to the housing when the switchable magnetic flux source is in the OFF state and are held relative to the housing when the switchable magnetic flux source is in the at least one of the partial ON state and the ON state. The first engagement surface of the first pole portion may maintain a first position relative to the housing when the switchable magnetic flux source is in the OFF state independent of an orientation of the housing and in the absence of contact with the ferromagnetic workpiece and the second engagement surface of the second pole portion may maintain a second position relative to the housing when the switchable magnetic flux source is in the OFF state independent of the orientation of the housing and in the absence of contact with the ferromagnetic workpiece.

Example 2: The magnetic coupling device of Example 1 wherein each of the first pole portion and the second pole portion may be constrained to be movable relative to the housing in a single degree of freedom.

Example 3: The magnetic coupling device any of one of Example 1 and Example 2 wherein the first pole portion may be translatable relative to the housing when the switchable magnetic flux source is in the OFF state.

Example 4: The magnetic coupling device any of one of Examples 1-3 wherein the second pole portion may be translatable relative to the housing when the switchable magnetic flux source is in the OFF state.

Example 5: The magnetic coupling device any of one of Examples 1-4 may further comprise: a first biaser coupled the housing and a second biaser coupled the housing. The first biaser may maintain the first engagement surface of the first pole portion in the first position relative to the housing when the switchable magnetic flux source is in the OFF state independent of the orientation of the housing and in the absence of contact with the ferromagnetic workpiece. The second biaser may maintain the second engagement surface of the second pole portion in the second position relative to the housing when the switchable magnetic flux source is in the OFF state independent of the orientation of the housing and in the absence of contact with the ferromagnetic workpiece.

Example 6: The magnetic coupling device of Example 5 wherein the first biaser is a first spring and the second biaser may a second spring.

Example 7: The magnetic coupling device any of one of Examples 1-4 may further comprise: a first support coupled to the housing and supporting the first pole portion and a second support coupled to the housing and supporting the second pole portion. The first support may include a first lock portion at least partially defining a first channel to receive the first pole portion. The first lock portion may be movable relative to the housing between an unlocked position wherein the first pole portion is movable relative to the housing and a locked position wherein the first pole portion is held relative to the housing. The second support may include a second lock portion at least partially defining a second channel to receive the second pole portion. The second lock portion may be movable relative to the housing between an unlocked position wherein the second pole portion is movable relative to the housing and a locked position wherein the second pole portion is held relative to the housing.

Example 8: The magnetic coupling device of Example 7 wherein the first pole portion may be translatable relative to the housing in a first direction and the first lock portion of the first support may be translatable from the unlocked position to the locked position along a second direction, the second direction being angled relative to the first direction.

Example 9: The magnetic coupling device of any of Examples 7 and 8 wherein the first lock portion may be moved from the unlocked position to the locked position when the switchable magnetic flux source is transitioned from the OFF state to the at least one of the partial ON state and the ON state.

Example 10: The magnetic coupling device any of one of Examples 7-9 may further comprise: a first biaser supported by the first support and a second biaser supported by the second support. The first biaser may maintain the first engagement surface of the first pole portion in the first position relative to the housing when the switchable magnetic flux source is in the OFF state independent of the orientation of the housing and in the absence of contact with the ferromagnetic workpiece. The second biaser may maintain the second engagement surface of the second pole portion in the second position relative to the housing when the switchable magnetic flux source is in the OFF state independent of the orientation of the housing and in the absence of contact with the ferromagnetic workpiece.

Example 11: The magnetic coupling device of Example 10 wherein the first biaser is a first spring and the second biaser may be a second spring.

Example 12: The magnetic coupling device any of one of Examples 7-11 wherein the first pole portion may be retractable relative to a lower surface of the first support when the switchable magnetic flux source is in the OFF state and the second pole portion may be retractable relative to a lower surface of the second support when the switchable magnetic flux source is in the OFF state.

Example 13: The magnetic coupling device any of one of Examples 7-12 wherein a first limiter may define a maximum retraction distance of the first pole portion relative to a lower surface of the first support and a second limiter may define a maximum retraction distance of the second pole portion relative to a lower surface of the second support.

Example 14: The magnetic coupling device of Example 13 wherein the first limiter may include a first portion carried by the first pole portion and a first stop surface on the first support and the second limiter may include a second portion carried by the second pole portion and a second stop surface on the second support.

Example 15: The magnetic coupling device any of one of Examples 1-14 wherein the switchable magnetic flux source may be positioned between the first pole portion and the second pole portion.

Example 16. The magnetic coupling device of any one of Examples 1-14, wherein the switchable magnetic flux source is positioned vertically in line with the first pole portion and the second pole portion.

Example 17. The magnetic coupling device of any of the preceding Examples, wherein the switchable magnetic flux source includes at least one permanent magnet.

Example 18. The magnetic coupling device of Example 17, wherein the at least one permanent magnet includes an electro-permanent magnet.

Example 19. The magnetic coupling device of any one of Examples 17 and 18, wherein the at least one permanent magnet further includes a rare earth permanent magnet.

Example 20. The magnetic coupling device of any one of Examples 1-16, wherein the switchable magnetic flux source includes an electromagnet.

Example 21. The magnetic coupling device of any one of Examples 1-16, wherein the switchable magnetic flux source includes a platter having a plurality of permanent magnets and a plurality of pole portions interleaved therebetween.

Example 22. The magnetic coupling device of Example 21, wherein the plurality of permanent magnets and the plurality of pole portions form a linear array.

Example 23. The magnetic coupling device of Example 21, wherein the plurality of permanent magnets and the plurality of pole portions form a circular array.

Example 24: The magnetic coupling device any of one of Examples 1-23 wherein the switchable magnetic flux source may include a plurality of permanent magnets.

Example 25: The magnetic coupling device of Example 24 wherein at least first one of the plurality of permanent magnets may be an electro-permanent magnet.

Example 26: The magnetic coupling device of Example 24 wherein at least a second one of the plurality of permanent magnets may be a rare earth magnet.

Example 27: The magnetic coupling device of Example 24 wherein the plurality of permanent magnets may include a first permanent magnet and a second permanent magnet movable relative to the first permanent magnet.

Example 28: The magnetic coupling device of Example 27 wherein the second permanent magnet may be rotatable relative to the first permanent magnet.

Example 29: The magnetic coupling device of Example 28 wherein each of the first permanent magnet and the second permanent magnet may be positioned between the first pole portion and the second pole portion.

Example 30: The magnetic coupling device any of one of Examples 27-29 wherein in the ON state of the switchable magnetic flux source a north pole of the second permanent magnet may be generally aligned with a north pole of the first permanent magnet and in the OFF state of the switchable magnetic flux source a south pole of the second permanent magnet is generally aligned with the north pole of the first permanent magnet.

Example 31: The magnetic coupling device any of one of Examples 1-30 wherein each of the first pole portion and the second pole portion are positioned to a first side of the switchable magnetic flux source and in the at least one of the partial ON state and the ON state of the switchable magnetic flux source are each one of north pole portions of the magnetic coupling device and south pole portions of the magnetic coupling device.

Example 32: The magnetic coupling device any of one of Examples 1-30 wherein the first pole portion may be positioned on a first side of the switchable magnetic flux source and the second pole portion may be positioned to a second side of the switchable magnetic flux source and in the at least one of the partial ON state and the ON state of the switchable magnetic flux source the first pole portion is a north pole portion of the magnetic coupling device and the second pole portion is a south pole portion of the magnetic coupling device.

Example 33: The magnetic coupling device any of one of Examples 1-32 wherein the first pole portion may be a first cylindrical pin which optionally may have a first rounded end and the second pole portion may be a second cylindrical pin which optionally may have a second rounded end.

Example 34: The magnetic coupling device any of one of Examples 1-33 wherein the magnetic coupling device may further comprise at least one sensor to provide a characteristic of one or more of the plurality of movable pole portions.

Example 35: The magnetic coupling device of Example 34 wherein the characteristic is a position of one or more of the plurality of movable pole portions.

Example 36: The magnetic coupling device of Example 34 wherein the characteristic is a magnetic flux associated with one or more of the plurality of movable pole portions.

Example 37: The magnetic coupling device of Example 34, may further comprise a controller operably coupled to the switchable magnetic flux source and the at least one sensor. Based on the characteristic of one or more of the plurality of movable pole portions the controller may be configured to determine if the one or more of the plurality of movable pole portions is spaced apart from the ferromagnetic workpiece and if the one or more of the plurality of movable pole portions is contacting the ferromagnetic workpiece.

Example 38: The magnetic coupling device of Example 37, wherein the controller may configured to determine a movement characteristic of the one or more of the plurality of movable pole portions.

Example 39: The magnetic coupling device of Example 38, wherein the movement characteristic of the one or more of the plurality of movable pole portions may be a position of the one or more of the plurality of movable pole portions relative to the housing.

Example 40: The magnetic coupling device of Example 39, wherein the first pole portion may be retractable relative to the housing and the movement characteristic may be when the first pole portion is fully retracted relative to the housing. An end of the first pole portion may remain extended from the housing when fully retracted.

Example 41: The magnetic coupling device of any of Examples 1-40, wherein the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing.

Example 42: The magnetic coupling device of Example 37, wherein the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller may monitor a magnetic flux while the switchable magnetic flux source is in the second partial ON state to determine if the one or more of the plurality of movable pole portions is spaced apart from the ferromagnetic workpiece.

Example 43: The magnetic coupling device of any one of Examples 37 and 42, wherein the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller may monitor a magnetic flux while the switchable magnetic flux source is in the second partial ON state to determine if the one or more of the plurality of movable pole portions is contacting the ferromagnetic workpiece.

Example 44: The magnetic coupling device of Example 38, wherein the partial ON state is a first partial ON state wherein each of the first pole portion and the second pole portion are held relative to the housing when the switchable magnetic flux source is in the first partial ON state and wherein the switchable magnetic flux source is further switchable to a second partial ON state wherein each of the first pole portion and the second pole portion are moveable relative to the housing, wherein the controller may monitor a magnetic flux while the switchable magnetic flux source is in the second partial ON state to determine the movement characteristic.

Example 45: The magnetic coupling device of any of the preceding Examples including a proximity sensor supported by the housing and separate from the plurality of pole portions.

Example 46: In another exemplary embodiment of the present disclosure, a magnetic coupling device for magnetically coupling to a ferromagnetic workpiece is provided. The magnetic coupling device may comprise: a housing; a switchable magnetic flux source supported by the housing; a plurality of pole portions; a plurality of biasers which bias the plurality of pole portions into an extended position relative to a lower surface of the housing; and a plurality of lock portions which fix the plurality of pole portions relative to the housing when the switchable magnetic flux source is in the at least one of the partial ON state and the ON state. The switchable magnetic flux source may be switchable between at least an OFF state and at least one of a partial ON state and an ON state. Each of the plurality of pole portions may include at least one workpiece interface having a workpiece engagement surface. The plurality of pole portions may include a plurality of north pole portions which form a north pole of the magnetic coupling device when the switchable magnetic flux source is in the at least one of the partial ON state and the ON state and a plurality of south pole portions which form a south pole of the magnetic coupling device when the switchable magnetic flux source is in the at least one of the partial ON state and the ON state. Each of the plurality of pole portions may be translatable relative to the housing along respective axes when the switchable magnetic flux source is in the OFF state and each may include a respective workpiece interface having a respective workpiece engagement surface.

Example 47: The magnetic coupling device of Example 46, may further comprise at least one sensor to provide a characteristic of one or more of the plurality of pole portions.

Example 48: The magnetic coupling device of Example 47, wherein the characteristic may be a position of one or more of the plurality of pole portions.

Example 49: The magnetic coupling device of Example 47 wherein the characteristic may be a magnetic flux associated with one or more of the plurality of pole portions.

Example 50: The magnetic coupling device of Example 47, may further comprise a controller operably coupled to the switchable magnetic flux source and the at least one sensor. Based on the characteristic of one or more of the plurality of pole portions the controller may be configured to determine if the one or more of the plurality of pole portions is spaced apart from the ferromagnetic workpiece and if the one or more of the plurality of pole portions is contacting the ferromagnetic workpiece.

Example 51: The magnetic coupling device of Example 50, wherein the controller may be configured to determine a movement characteristic of the one or more of the plurality of pole portions.

Example 52: The magnetic coupling device of Example 51, wherein the movement characteristic of the one or more of the plurality of pole portions may be a position of the one or more of the plurality of pole portions relative to the housing.

Example 53: The magnetic coupling device of Example 52, wherein the movement characteristic may be when a first pole portion of the one or more of the plurality of pole portions is fully retracted relative to the housing. An end of the first pole portion may remain extended from the housing when fully retracted.

Example 54: The magnetic coupling device of any of Examples 46-53, wherein the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source.

Example 55: The magnetic coupling device of Example 50, wherein the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine if the one or more of the plurality of movable pole portions is spaced apart from the ferromagnetic workpiece.

Example 56: The magnetic coupling device of any one of Examples 50 and 55, wherein the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine if the one or more of the plurality of movable pole portions is contacting the ferromagnetic workpiece.

Example 57: The magnetic coupling device of Example 50, wherein the partial ON state is a first partial ON state wherein each of the one or more of the plurality of pole portions are held relative to the housing when the switchable magnetic flux source is in the first partial ON state and wherein the switchable magnetic flux source is further switchable to a second partial ON state wherein each of the one or more of the plurality of pole portions are moveable relative to the housing, wherein in the second partial ON state the plurality of north pole portions still form the north pole of the magnetic coupling device and the plurality of south pole portions still form the south pole of the magnetic coupling device when the switchable magnetic flux source, wherein the controller monitors a magnetic flux while the switchable magnetic flux source is in the second partial ON state to determine the movement characteristic.

Example 58: A magnetic coupling device for magnetically coupling to a ferromagnetic workpiece is provided. The magnetic coupling device comprises a housing; a switchable magnetic flux source supported by the housing; and a plurality of pole portions movably coupled to the housing. The switchable magnetic flux source may be switchable between at least an OFF state and at least one of a partial ON state and an ON state. Each of the plurality of pole portions may include at least one workpiece interface having a workpiece engagement surface. The plurality of pole portions may include a first pole portion including a first workpiece interface having a first plurality of spaced apart projections which are movable as a group relative to the housing when the switchable magnetic flux source is in the OFF state and are held relative to the housing when the switchable magnetic flux source is in the at least one of the partial ON state and the ON state and a second pole portion including a second workpiece interface having a second plurality of spaced apart projections which are movable as a group relative to the housing when the switchable magnetic flux source is in the OFF state and are held relative to the housing when the switchable magnetic flux source is in the at least one of the partial ON state and the ON state.

Example 59: The magnetic coupling device of Example 58, wherein the first pole portion may be movable relative to a lower surface of the housing in a first direction.

Example 60: The magnetic coupling device of Example 58, wherein the first pole portion may be movable relative to a lower surface of the housing in only a first direction.

Example 61: The magnetic coupling device of any of Examples 59 and 60, wherein the first pole portion may include a plurality of elongated slots having a major axis along the first direction and the magnetic coupling device further comprises a plurality of couplers which may couple the first pole portion to the housing and may cooperate with the plurality of elongated slots to permit movement of the first pole portion in the first direction.

Example 62: The magnetic coupling device of any of Examples 58-61, wherein the first plurality of projections may include a first projection, a second projection, and a third projection. A first spacing between the first projection and the second projection may be equal to a second spacing between the second projection and the third projection.

Example 63: The magnetic coupling device of any of Examples v-61, wherein the first plurality of projections may include a first projection, a second projection, and a third projection. A first spacing between the first projection and the second projection is unequal to a second spacing between the second projection and the third projection.

Example 64: A magnetic coupling device for magnetically coupling to a ferromagnetic workpiece is provided. The magnetic coupling device may comprise: a housing; a switchable magnetic flux source supported by the housing; a plurality of pole portions; and at least one coupler. The switchable magnetic flux source may be switchable between at least an OFF state and at least one of a partial ON state and an ON state. The plurality of pole portions may include a first pole portion being movably coupled to the housing. The first pole portion may include at least one workpiece interface having a workpiece engagement surface. The first pole portion may include at least one elongated slot having a major axis along a first direction. The at least one coupler may couple the first pole portion to the housing and may cooperate with the at least one elongated slot to constrain movement of the first pole portion in the first direction relative to the housing. The first pole portion may be movable relative to the housing when the switchable magnetic flux source is in the OFF state and may be held relative to the housing when the switchable magnetic flux source is in the at least one of the partial ON state and the ON state.

Example 65: The magnetic coupling device of Example 64, wherein the at least one elongated slot of the first pole portion may include a first elongated slot and a second elongated slot. The at least one coupler cooperates with both the first elongated slot and the second elongated slot to constrain movement of the first pole portion in the first direction relative to the housing.

Example 66: The magnetic coupling device of Example 65, wherein the at least one coupler may include a first coupler received in the first elongated slot of the at least one elongated slot and a second coupler received in the second elongated slot of the at least one elongated slot.

Example 67: In still a further exemplary embodiment of the present disclosure, a magnetic coupling device for magnetically coupling to a ferromagnetic workpiece is provided. The magnetic coupling device may comprise: a housing; a switchable magnetic flux source supported by the housing, the switchable magnetic flux source being switchable between an OFF state, at least one of a first partial ON state and an ON state, and a second partial ON state; a plurality of movable pole portions, each including at least one workpiece interface having a workpiece engagement surface, the plurality of moveable pole portions including a first pole portion including a first workpiece interface having a first workpiece engagement surface and a second pole portion including a second workpiece interface having a second workpiece engagement surface, each of the first pole portion and the second pole portion are moveable relative to the housing when the switchable magnetic flux source is in one of the OFF state and the second partial ON state and are held relative to the housing when the switchable magnetic flux source is in the at least one of the partial ON state and the ON state; at least one sensor to provide a characteristic of one or more of the plurality of movable pole portions; and a controller operably coupled to the switchable magnetic flux source and the at least one sensor. Based on the characteristic of one or more of the plurality of movable pole portions the controller may be configured to determine if the one or more of the plurality of movable pole portions is spaced apart from the ferromagnetic workpiece and if the one or more of the plurality of movable pole portions is contacting the ferromagnetic workpiece.

Example 68: The magnetic coupling device of example 67, wherein the characteristic may be a position of one or more of the plurality of movable pole portions.

Example 69: The magnetic coupling device of example 67 wherein the characteristic may be a magnetic flux associated with one or more of the plurality of movable pole portions.

Example 70: The magnetic coupling device of example 67, wherein the controller may be configured to determine a movement characteristic of the one or more of the plurality of movable pole portions.

Example 71: The magnetic coupling device of example 70, wherein the movement characteristic of the one or more of the plurality of movable pole portions may be a position of the one or more of the plurality of movable pole portions relative to the housing.

Example 72: The magnetic coupling device of example 71, wherein the first pole portion may be retractable relative to the housing and the movement characteristic may be when the first pole portion is fully retracted relative to the housing, the workpiece engagement surface of the first pole portion remaining extended from the housing when fully retracted.

Example 73: The magnetic coupling device of any one of examples 70-72, wherein the controller may monitor a magnetic flux while the switchable magnetic flux source is in the second partial ON state to determine the movement characteristic.

Example 74: The magnetic coupling device of any of examples 67-73, wherein the controller may monitor a magnetic flux while the switchable magnetic flux source is in the second partial ON state to determine if the one or more of the plurality of movable pole portions is spaced apart from the ferromagnetic workpiece.

Example 75: The magnetic coupling device of any of examples 67-74, wherein the controller may monitor a magnetic flux while the switchable magnetic flux source is in the second partial ON state to determine if the one or more of the plurality of movable pole portions is contacting the ferromagnetic workpiece.

Example 76: The magnetic coupling device of any one of examples 67-75, wherein the first engagement surface of the first pole portion may maintain a first position relative to the housing when the switchable magnetic flux source is in one of the OFF state and the second partial ON state independent of an orientation of the housing and in the absence of contact with the ferromagnetic workpiece and the second engagement surface of the second pole portion maintains a second position relative to the housing when the switchable magnetic flux source is in one of the OFF state and the second partial ON state independent of the orientation of the housing and in the absence of contact with the ferromagnetic workpiece.

Example 77: The magnetic coupling device of any one of examples 67-76, wherein each of the first pole portion and the second pole portion may be constrained to be movable relative to the housing in a single degree of freedom.

Example 78: The magnetic coupling device of example 77, wherein the first pole portion may be translatable relative to the housing when the switchable magnetic flux source is in one of the OFF state and the second partial ON state.

Example 79: The magnetic coupling device of any one of examples 77 and 78, wherein the second pole portion may be translatable relative to the housing when the switchable magnetic flux source is in one of the OFF state and the second partial ON state.

Example 80: The magnetic coupling device of any one of examples 67-79, may further comprise a first biaser coupled the housing, the first biaser maintains the first engagement surface of the first pole portion in the first position relative to the housing when the switchable magnetic flux source is in one of the OFF state and the second partial ON state independent of the orientation of the housing and in the absence of contact with the ferromagnetic workpiece; and a second biaser coupled the housing, the second biaser maintains the second engagement surface of the second pole portion in the second position relative to the housing when the switchable magnetic flux source is in one of the OFF state and the second partial ON state independent of the orientation of the housing and in the absence of contact with the ferromagnetic workpiece.

Example 81: The magnetic coupling device of example 80, wherein the first biaser is a first spring and the second biaser is a second spring.

Example 82: The magnetic coupling device of any one of examples 67-81, may further comprise a first support coupled to the housing and supporting the first pole portion, the first support including a first lock portion at least partially defining a first channel to receive the first pole portion, the first lock portion being movable relative to the housing between an unlocked position wherein the first pole portion is movable relative to the housing and a locked position wherein the first pole portion is held relative to the housing; and a second support coupled to the housing and supporting the second pole portion, the second support including a second lock portion at least partially defining a second channel to receive the second pole portion, the second lock portion being movable relative to the housing between an unlocked position wherein the second pole portion is movable relative to the housing and a locked position wherein the second pole portion is held relative to the housing.

Example 83: The magnetic coupling device of example 82, wherein the first pole portion may be translatable relative to the housing in a first direction and the first lock portion of the first support may be translatable from the unlocked position to the locked position along a second direction, the second direction being angled relative to the first direction.

Example 84: The magnetic coupling device of any one of examples 67-83, wherein the switchable magnetic flux source may be positioned between the first pole portion and the second pole portion.

Example 85: The magnetic coupling device of any one of examples 67-84, wherein the switchable magnetic flux source may include a plurality of permanent magnets.

Example 86: The magnetic coupling device of example 85, wherein at least first one of the plurality of permanent magnets may be an electro-permanent magnet.

Example 87: The magnetic coupling device of example 85, wherein at least a second one of the plurality of permanent magnets may be a rare earth magnet.

Example 88: The magnetic coupling device of example 87, wherein the plurality of permanent magnets may include a first permanent magnet and a second permanent magnet movable relative to the first permanent magnet.

Example 89: The magnetic coupling device of example 88, wherein the second permanent magnet may be rotatable relative to the first permanent magnet.

Example 90: The magnetic coupling device of any one of examples 88 and 89, wherein in the ON state of the switchable magnetic flux source a north pole of the second permanent magnet may be generally aligned with a north pole of the first permanent magnet and in the OFF state of the switchable magnetic flux source a south pole of the second permanent magnet is generally aligned with the north pole of the first permanent magnet.

Example 91: The magnetic coupling device of any one of examples 67-90, wherein the first pole portion may be a first cylindrical pin having a first rounded end and the second pole portion may be a second cylindrical pin having a second rounded end.

Example 92. In yet another still exemplary embodiment of the present disclosure, a method of coupling a magnetic coupling device to a ferromagnetic workpiece is provided. The method may comprise providing a housing of the magnetic coupling device, a switchable magnetic flux source supported by the housing and being switchable between an OFF state, at least one of a first partial ON state and an ON state, and a second partial ON state, and a plurality of pole portions. Each of the plurality of pole portions may include at least one workpiece interface having a workpiece engagement surface. The plurality of pole portions may include a first pole portion including a first workpiece interface having a first workpiece engagement surface and a second pole portion including a second workpiece interface having a second workpiece engagement surface. Each of the first pole portion and the second pole portion may be moveable relative to the housing when the switchable magnetic flux source is in one of the OFF state and the second partial ON state and may be held relative to the housing when the switchable magnetic flux source is in the at least one of the partial ON state and the ON state. The method may further comprise while the magnetic coupling device is spaced apart from the ferromagnetic workpiece configuring the switchable magnetic flux source in the second partial ON state; determining when at least one of the plurality of moveable pole portions contacts the ferromagnetic workpiece; subsequent to determining when at least one of the plurality of moveable pole portions contacts the ferromagnetic workpiece configuring the switchable magnetic flux source in one the first partial ON state and the ON state; and lifting the ferromagnetic workpiece with the magnetic coupling device.

Example 93. The method of example 92, wherein the step of configuring the switchable magnetic flux source in one the first partial ON state and the ON state includes the step of configuring the switchable magnetic flux source in the first partial ON state. The method may further comprise the step of subsequent to lifting the ferromagnetic workpiece with the magnetic coupling device configuring the switchable magnetic coupling device in one of a third partial ON state and an ON state. The third partial ON state increasing the magnetic flux through the ferromagnetic workpiece relative to the first partial ON state and the second partial ON state.

Example 94: A method of coupling a magnetic coupling device to a ferromagnetic workpiece is provided. The method may comprise monitoring a position of at least one moveable pole portion of the magnetic coupling device relative to a housing of the magnetic coupling device; and when the movable pole portion moves from a first position to a second position securing the moveable pole portion relative to the housing and magnetically coupling magnetic coupling device to the ferromagnetic workpiece with a magnetic circuit sufficient to lift the ferromagnetic workpiece with the magnetic coupling device.

Example 95: A method of coupling a magnetic coupling device to a ferromagnetic workpiece is provided. The method may comprise: moving the magnetic coupling device towards the ferromagnetic workpiece at a speed above a first speed, the magnetic coupling device having a plurality of moveable pole portions relative to a housing; detecting a closest one of a plurality of moveable pole portions of the magnetic coupling device is at a first separation from the ferromagnetic workpiece; and slowing the speed of the magnetic coupling device towards the ferromagnetic workpiece to a second speed, the second speed being the first speed or less.

Example 96: The method of Example 95 may further comprise the steps of: detecting when the plurality of moveable pole portions are contacting the ferromagnetic workpiece; securing the moveable pole portion relative to a housing; and magnetically the coupling magnetic coupling device to the ferromagnetic workpiece with a magnetic circuit sufficient to lift the ferromagnetic workpiece with the magnetic coupling device.

Example 97: A magnetic coupling device for magnetically coupling to a ferromagnetic workpiece is provided. The magnetic coupling device comprising: a housing; a switchable magnetic flux source supported by the housing; a plurality of pole portions; at least one sensor supported by the housing; and a controller operably coupled to the switchable magnetic flux source and the at least one sensor. The switchable magnetic flux source being switchable between an OFF state, at least one of a first partial ON state and an ON state, and a second partial ON state. Each of the plurality of pole portions including at least one workpiece interface having a workpiece engagement surface. The plurality of pole portions including a first pole portion including a first workpiece interface having a first workpiece engagement surface and a second pole portion including a second workpiece interface having a second workpiece engagement surface. Each of the first pole portion and the second pole portion are moveable relative to the housing when the switchable magnetic flux source is in one of the OFF state and the second partial ON state and are held relative to the housing when the switchable magnetic flux source is in the at least one of the partial ON state and the ON state. Based on the at least one sensor the controller is configured to determine a separation of the plurality of movable pole portions relative to the ferromagnetic workpiece.

Example 98: A robotic system is provided. The robotic system including a robotic arm having a magnetic coupling device according to any one of Examples 1-91 attached to an end of the robotic arm.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A magnetic coupling device for magnetically coupling to a ferromagnetic workpiece, comprising:

a housing;

a switchable magnetic flux source supported by the housing, the switchable magnetic flux source being switchable between an OFF state, at least one of a first partial ON state and an ON state, and a second partial ON state;

a plurality of pole portions, each including at least one workpiece interface having a workpiece engagement surface, the plurality of pole portions including a first pole portion including a first workpiece interface having a first workpiece engagement surface and a second pole portion including a second workpiece interface having a second workpiece engagement surface, each of the first pole portion and the second pole portion are moveable relative to the housing when the switchable magnetic flux source is in one of the OFF state and the second partial ON state and are held relative to the housing when the switchable magnetic flux source is in the at least one of the first partial ON state and the ON state;

at least one sensor to provide a characteristic of one or more of the plurality of movable pole portions; and a controller operably coupled to the switchable magnetic flux source and the at least one sensor, wherein based on the characteristic of one or more of the plurality of movable pole portions the controller is configured to determine if the one or more of the plurality of movable pole portions is spaced apart from the ferromagnetic workpiece and if the one or more of the plurality of movable pole portions is contacting the ferromagnetic workpiece.

2. The magnetic coupling device of claim 1, wherein the characteristic is a position of one or more of the plurality of movable pole portions.

3. The magnetic coupling device of claim 1 wherein the characteristic is a magnetic flux associated with one or more of the plurality of movable pole portions.

4. The magnetic coupling device of claim 1, wherein the controller is configured to determine a movement characteristic of the one or more of the plurality of movable pole portions.

5. The magnetic coupling device of claim 4, wherein the movement characteristic of the one or more of the plurality of movable pole portions is a position of the one or more of the plurality of movable pole portions relative to the housing.

6. The magnetic coupling device of claim 5, wherein the first pole portion is retractable relative to the housing and the movement characteristic is when the first pole portion is fully retracted relative to the housing, the workpiece engagement surface of the first pole portion remaining extended from the housing when fully retracted.

7. The magnetic coupling device of claim 4, wherein the controller monitors a magnetic flux while the switchable magnetic flux source is in the second partial ON state to determine the movement characteristic.

8. The magnetic coupling device of claim 1, wherein the controller monitors a magnetic flux while the switchable magnetic flux source is in the second partial ON state to determine if the one or more of the plurality of movable pole portions is spaced apart from the ferromagnetic workpiece.

9. The magnetic coupling device of claim 1, wherein the controller monitors a magnetic flux while the switchable magnetic flux source is in the second partial ON state to determine if the one or more of the plurality of movable pole portions is contacting the ferromagnetic workpiece.

10. The magnetic coupling device of claim 1, wherein the first engagement surface of the first pole portion maintains a first position relative to the housing when the switchable magnetic flux source is in one of the OFF state and the second partial ON state independent of an orientation of the housing and in the absence of contact with the ferromagnetic workpiece and the second engagement surface of the second pole portion maintains a second position relative to the housing when the switchable magnetic flux source is in one of the OFF state and the second partial ON state independent of the orientation of the housing and in the absence of contact with the ferromagnetic workpiece.

11. The magnetic coupling device of claim 1, wherein each of the first pole portion and the second pole portion are constrained to be movable relative to the housing in a single degree of freedom.

12. The magnetic coupling device of claim 11, wherein the first pole portion is translatable relative to the housing when the switchable magnetic flux source is in one of the OFF state and the second partial ON state.

13. The magnetic coupling device of claim 11, wherein the second pole portion is translatable relative to the housing when the switchable magnetic flux source is in one of the OFF state and the second partial ON state.

14. The magnetic coupling device of claim 1, further comprising:

a first biaser coupled the housing, the first biaser maintains the first engagement surface of the first pole portion in the first position relative to the housing when the switchable magnetic flux source is in one of the OFF state and the second partial ON state independent of the orientation of the housing and in the absence of contact with the ferromagnetic workpiece; and a second biaser coupled the housing, the second biaser maintains the second engagement surface of the second pole portion in the second position relative to the housing when the switchable magnetic flux source is in one of the OFF state and the second partial ON state independent of the orientation of the housing and in the absence of contact with the ferromagnetic workpiece.

15. The magnetic coupling device of claim 14, wherein the first biaser is a first spring and the second biaser is a second spring.

16. The magnetic coupling device of claim 1, further comprising:

a first support coupled to the housing and supporting the first pole portion, the first support including a first lock portion at least partially defining a first channel to receive the first pole portion, the first lock portion being movable relative to the housing between an unlocked position wherein the first pole portion is movable relative to the housing and a locked position wherein the first pole portion is held relative to the housing; and a second support coupled to the housing and supporting the second pole portion, the second support including a second lock portion at least partially defining a second channel to receive the second pole portion, the second lock portion being movable relative to the housing between an unlocked position wherein the second pole portion is movable relative to the housing and a locked position wherein the second pole portion is held relative to the housing.

17. The magnetic coupling device of claim 16, wherein the first pole portion is translatable relative to the housing in a first direction and the first lock portion of the first support is translatable from the unlocked position to the locked position along a second direction, the second direction being angled relative to the first direction.

18. The magnetic coupling device of claim 1, wherein the switchable magnetic flux source is positioned between the first pole portion and the second pole portion.

19. The magnetic coupling device of claim 1, wherein the switchable magnetic flux source includes a plurality of permanent magnets.

20. The magnetic coupling device of claim 19, wherein at least first one of the plurality of permanent magnets is an electro-permanent magnet.

21. The magnetic coupling device of claim 19, wherein at least a second one of the plurality of permanent magnets is a rare earth magnet.

22. The magnetic coupling device of claim 21, wherein the plurality of permanent magnets including a first permanent magnet and a second permanent magnet movable relative to the first permanent magnet.

23. The magnetic coupling device of claim 22, wherein the second permanent magnet is rotatable relative to the first permanent magnet.

24. The magnetic coupling device of claim 22, wherein in the ON state of the switchable magnetic flux source a north pole of the second permanent magnet is generally aligned with a north pole of the first permanent magnet and in the OFF state of the switchable magnetic flux source a south pole of the second permanent magnet is generally aligned with the north pole of the first permanent magnet.

25. The magnetic coupling device of claim 1, wherein the first pole portion is a first cylindrical pin having a first rounded end and the second pole portion is a second cylindrical pin having a second rounded end.

26. A robotic system, including a robotic arm having a magnetic coupling device according to claim 1 attached to an end of the robotic arm.

27. A magnetic coupling device for magnetically coupling to a ferromagnetic workpiece, comprising:

a housing;

a switchable magnetic flux source supported by the housing, the switchable magnetic flux source being switchable between a plurality of states;

a plurality of movable pole portions, each including at least one workpiece interface having a workpiece engagement surface, the plurality of movable pole portions including a first subset of north pole portions and a second subset of south pole portions, each of the plurality of movable pole portions are moveable relative to the housing;

at least one sensor to provide a characteristic of one or more of the plurality of movable pole portions; and a controller operably coupled to the switchable magnetic flux source and the at least one sensor, wherein based on the characteristic of one or more of the plurality of movable pole portions the controller is configured to determine a position of each of the first subset of north pole portions of the plurality of movable pole portions and each of the second subset of south pole portions of the plurality of movable pole portions and based on the position of each of the first subset of north pole portions of the plurality of movable pole portions and each of the second subset of south pole portions of the plurality of movable pole portions and a known shape of the ferromagnetic workpiece determine a location of the magnetic coupling device on ferromagnetic workpiece.

28. A robotic system, including a robotic arm and the magnetic coupling device according to claim 27 attached to an end of the robotic arm.

29. The robotic system of claim 28, wherein the robotic system is configured to be actuated to position the ferromagnetic workpiece in a desired position based on the determined location of the magnetic coupling device on the ferromagnetic workpiece.

30. A robotic system for magnetically coupling to a ferromagnetic workpiece, comprising:

a base;

a robotic arm having a plurality of movable arm segments;

a magnetic coupling device coupled to an end of the robotic arm, the magnetic coupling device including a housing, a plurality of pole portions including a plurality of workpiece interfaces and a switchable magnetic flux source having a first state wherein a first magnetic flux at the plurality of workpiece interfaces is insufficient to lift the ferromagnetic workpiece and a second state wherein a second magnetic flux at the plurality of workpiece interfaces is sufficient to lift the ferromagnetic workpiece, and a first pole portion of the plurality of portions includes a first workpiece interface of the plurality of workpiece interfaces and a second pole portion of the plurality of pole portions includes a second workpiece interface of the plurality of workpiece interfaces and the first pole portion and the second pole portion are each independently movable relative to the housing;

a plurality of sensors moveable by the robotic arm; and a controller operably coupled to the switchable magnetic flux source and the plurality of sensors, wherein based on the plurality of sensors and a known shape of the ferromagnetic workpiece the controller is configured to determine a position of the magnetic coupling device on the ferromagnetic workpiece and actuate the robotic arm to position the ferromagnetic workpiece with the robotic arm in a desired orientation based on the determined position of the magnetic coupling device on the ferromagnetic workpiece.

31. The robotic system of claim 30, wherein the first pole portion is a north pole portion and the second pole portion is a south pole portion, the switchable magnetic flux source being positioned between the first pole portion and the second pole portion.

32. A magnetic coupling device for magnetically coupling to a ferromagnetic workpiece, comprising:

a housing;

a plurality of pole portions supported by the housing, the plurality of pole portions including a plurality of workpiece interfaces, and the plurality of pole portions comprising a first pole portion including a first workpiece interface of the plurality of workpiece interfaces and a second pole portion including a second workpiece interface of the plurality of workpiece interfaces, and each of the first pole portion and the second pole portion are independently movable relative to the housing;

a switchable magnetic flux source carried by the housing, the switchable magnetic flux source having a first state wherein a first magnetic flux at the plurality of workpiece interfaces is insufficient to lift the ferromagnetic workpiece and a second state wherein a second magnetic flux at the plurality of workpiece interfaces is sufficient to lift the ferromagnetic workpiece;

a plurality of sensors carried by the housing; and a controller operably coupled to the switchable magnetic flux source and the plurality of sensors, wherein based on the plurality of sensors and a known shape of the ferromagnetic workpiece the controller is configured to determine a position of the magnetic coupling device on the ferromagnetic workpiece.

33. The robotic system of claim 32, wherein the first pole portion is a north pole portion and the second pole portion is a south pole portion, the switchable magnetic flux source being positioned between the first pole portion and the second pole portion.

* * * * *